United States Patent
Kumar et al.

(10) Patent No.: US 8,776,180 B2
(45) Date of Patent: Jul. 8, 2014

(54) SYSTEMS AND METHODS FOR USING REPUTATION SCORES IN NETWORK SERVICES AND TRANSACTIONS TO CALCULATE SECURITY RISKS TO COMPUTER SYSTEMS AND PLATFORMS

(75) Inventors: Srinivas Kumar, Cupertino, CA (US); Dennis Pollutro, Clymer, NY (US)

(73) Assignee: Taasera, Inc., Erie, PA (US)

( * ) Notice: Subject to any disclaimer, the term of this patent is extended or adjusted under 35 U.S.C. 154(b) by 26 days.

(21) Appl. No.: 13/559,692

(22) Filed: Jul. 27, 2012

(65) Prior Publication Data
US 2013/0298192 A1 Nov. 7, 2013

Related U.S. Application Data

(60) Provisional application No. 61/641,007, filed on May 1, 2012.

(51) Int. Cl.
*H04L 29/00* (2006.01)

(52) U.S. Cl.
USPC ............... 726/3; 713/155; 713/156; 713/157; 713/158; 713/159

(58) Field of Classification Search
USPC ................................. 713/155–159
See application file for complete search history.

(56) References Cited

U.S. PATENT DOCUMENTS

| | | | |
|---|---|---|---|
| 6,091,835 A | 7/2000 | Smithies et al. |
| 6,507,904 B1 | 1/2003 | Ellison et al. |
| 6,742,128 B1 | 5/2004 | Joiner |
| 6,760,441 B1 | 7/2004 | Ellison et al. |
| 6,990,579 B1 | 1/2006 | Herbert et al. |
| 6,996,710 B1 | 2/2006 | Ellison et al. |
| 7,013,481 B1 | 3/2006 | Ellison et al. |
| 7,174,566 B2 | 2/2007 | Yadav |
| 7,194,759 B1 | 3/2007 | Chess et al. |
| 7,370,359 B2 | 5/2008 | Hrabik et al. |
| 7,587,607 B2 | 9/2009 | Brickell et al. |

(Continued)

FOREIGN PATENT DOCUMENTS

KR 20110027386 A 3/2011

OTHER PUBLICATIONS

Norton Antivirus Product Manual Copyright 2011 Symantec Corporation, 334 pp.

(Continued)

*Primary Examiner* — Ghazal Shehni
(74) *Attorney, Agent, or Firm* — Buchanan Ingersoll & Rooney PC

(57) ABSTRACT

Instrumented networks, computer systems and platforms having target subjects (devices, transactions, services, users, organizations) are disclosed. A security orchestration service generates runtime operational integrity profiles representing and identifying a level of threat or contextual trustworthiness, at near real time, of subjects and applications on the instrumented target platform. Methods and systems are disclosed for calculating security risks by determining subject reputation scores. In an embodiment, a system receives a query for a reputation score of a subject, initiates directed queries to external information management systems to interrogate attributes associated with the subject, and analyzes responses. The system receives a hierarchical subject reputation score based on a calculus of risk and returns a reputation token. In another embodiment, a method provides real time attestation of a subject's reputation to a service provider using an endpoint trust agent, and a trust orchestrator comprising a reputation broker and a trust broker.

24 Claims, 29 Drawing Sheets

(56) References Cited

U.S. PATENT DOCUMENTS

| | | |
|---|---|---|
| 7,797,544 B2 | 9/2010 | Dillaway et al. |
| 7,882,221 B2 | 2/2011 | Sailer et al. |
| 7,979,696 B2 | 7/2011 | Kim et al. |
| 7,984,304 B1 | 7/2011 | Waldspurger et al. |
| 8,010,469 B2 | 8/2011 | Kapoor et al. |
| 8,108,536 B1 | 1/2012 | Hernacki et al. |
| 8,214,497 B2 | 7/2012 | Alperovitch et al. |
| 8,429,454 B2 | 4/2013 | Yuan et al. |
| 2005/0033987 A1 | 2/2005 | Yan et al. |
| 2005/0132031 A1 | 6/2005 | Sailer et al. |
| 2005/0132202 A1 | 6/2005 | Dillaway et al. |
| 2005/0138384 A1 | 6/2005 | Brickell et al. |
| 2005/0204404 A1 | 9/2005 | Hrabik et al. |
| 2005/0221766 A1 | 10/2005 | Brizek et al. |
| 2005/0283660 A1 | 12/2005 | McKeen et al. |
| 2005/0289072 A1 | 12/2005 | Sabharwal |
| 2006/0005009 A1 | 1/2006 | Ball et al. |
| 2006/0015942 A1 | 1/2006 | Judge et al. |
| 2006/0200680 A1 | 9/2006 | Ellison et al. |
| 2007/0005992 A1 | 1/2007 | Schluessler et al. |
| 2007/0143474 A1 | 6/2007 | Sheng et al. |
| 2007/0174406 A1 | 7/2007 | Morris et al. |
| 2007/0185856 A1 | 8/2007 | Mittal et al. |
| 2008/0015808 A1 | 1/2008 | Wilson et al. |
| 2008/0083039 A1 | 4/2008 | Choi et al. |
| 2008/0141027 A1 | 6/2008 | Kim et al. |
| 2008/0235372 A1 | 9/2008 | Sailer et al. |
| 2008/0244748 A1 | 10/2008 | Neystadt et al. |
| 2008/0276317 A1 | 11/2008 | Chandola et al. |
| 2008/0289028 A1 | 11/2008 | Jansen et al. |
| 2009/0094584 A1 | 4/2009 | Dheap et al. |
| 2009/0133110 A1 | 5/2009 | Kumar et al. |
| 2009/0138939 A1 | 5/2009 | Kumar et al. |
| 2009/0144818 A1 | 6/2009 | Kumar et al. |
| 2009/0172814 A1 | 7/2009 | Khosravi et al. |
| 2009/0178138 A1 | 7/2009 | Weiss et al. |
| 2009/0187988 A1* | 7/2009 | Hulten et al. ............ 726/22 |
| 2009/0204806 A1 | 8/2009 | Kanemura et al. |
| 2009/0204964 A1 | 8/2009 | Foley et al. |
| 2009/0241170 A1 | 9/2009 | Kumar et al. |
| 2009/0276204 A1 | 11/2009 | Kumar et al. |
| 2009/0328186 A1 | 12/2009 | Pollutro et al. |
| 2009/0328222 A1* | 12/2009 | Helman et al. ............ 726/25 |
| 2010/0281273 A1 | 11/2010 | Lee et al. |
| 2011/0035577 A1 | 2/2011 | Lin et al. |
| 2011/0072506 A1 | 3/2011 | Law et al. |
| 2011/0154500 A1 | 6/2011 | Sahita et al. |
| 2011/0162073 A1 | 6/2011 | Jeschke et al. |
| 2011/0173643 A1 | 7/2011 | Nicolson et al. |
| 2011/0179477 A1 | 7/2011 | Starnes et al. |
| 2011/0185423 A1 | 7/2011 | Sallam |
| 2011/0276468 A1 | 11/2011 | Lewis et al. |
| 2012/0011590 A1 | 1/2012 | Donovan |
| 2012/0072968 A1 | 3/2012 | Wysopal et al. |
| 2012/0084850 A1 | 4/2012 | Novak et al. |
| 2012/0102458 A1 | 4/2012 | Meijer et al. |
| 2012/0110174 A1 | 5/2012 | Wootton et al. |
| 2012/0131334 A1 | 5/2012 | Haikney et al. |
| 2012/0137375 A1 | 5/2012 | Ramachandran et al. |
| 2012/0216244 A1 | 8/2012 | Kumar et al. |
| 2012/0260342 A1 | 10/2012 | Dube et al. |
| 2012/0284282 A9* | 11/2012 | Ghosh et al. ............ 707/748 |

OTHER PUBLICATIONS

J. Andrew Schafer "Windows Management Instrumentation: Create WMI Providers to Notify Applications of System Events", msdn magazine, http://msdn.microsoft.com/en-us/magazine/cc301317.aspx, Sep. 2001, 5 pp.

Aubrey-Derrick Schmidt et al. "Static Analysis of Executables for Collaborative Malware Detection on Android" ICC'09 Proceedings of the 2009 IEEE International Conference on Communications, 5 pp.

International Search Report and Written Opinion dated Aug. 27, 2013, issued in corresponding International Application No. PCT/US2013/039033, 16 pp.

Office Action issued in copending U.S. Appl. No. 13/559,732, mailed Jun. 20, 2013, 32 pp.

Office Action issued in copending U.S. Appl. No. 13/559,766, mailed Jul. 18, 2013, 39 pp.

Dec. 5, 2013 Office Action issued in U.S. Appl. No. 13/559,665.

Dec. 10, 2013 Office Action issued in U.S. Appl. No. 13/559,732.

Jan. 17, 2014 Office Action issued in U.S. Appl. No. 13/559,766.

Event Tracker ver 7.0 Enterprise Users Guide. Event Tracker ver 7.0 Enterprise User's; Guide. Prism Microsystems, Jul. 28, 2010. Web. Nov. 29, 2013 <http://www.eventtracker.com/wp-content/uploads/EventTracker-v7.0-Enterprise-User-Guide.pdf>.

Statement of FIPS 140-2 Compliance. Statement of FIPS 140-2 Compliance. Prism Microsystems, Oct. 6, 2010. Web Nov. 29, 2010. ,http://www.eventtracker.com/wp-content/uploads/2013/01/Event-Tracker_v7.0_FIPS_Compliance.pdf>.

Trend Micro, Inc.. "OfficeScan 10 Administrator/s Guide." docs.trendmicro.com/all/ent/officescan/v10.0/en-us/osce_10.0_ag.pdf. N.p. Apr. 20, 2009. Web. Nov. 27, 2013 http://docs.trendmicro.com/all/ent/officescan/v10.0/en-us/osce_10.0_ag.pdf.

Aug. 27, 2012 International Search Report issued in PCT/US2012/025551.

Aug. 27, 2012 Written Opinion issued in PCT/US2012/025551.

Aug. 21, 2013 International Preliminary Report on Patentability issued in PCT/US2012/025551.

* cited by examiner

FIG. 7B

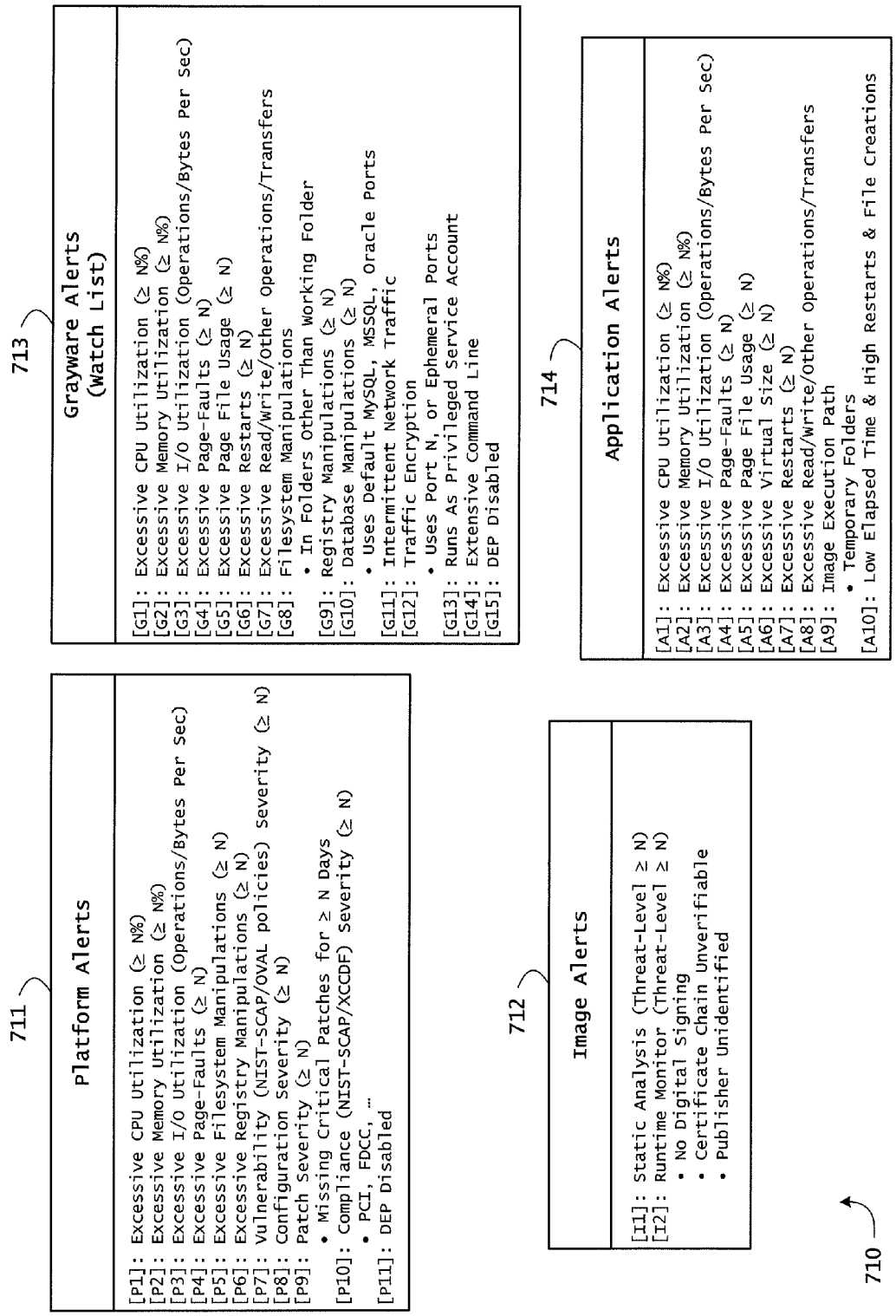

Platform Alerts (711)

[P1]: Excessive CPU Utilization (≥ N%)
[P2]: Excessive Memory Utilization (≥ N%)
[P3]: Excessive I/O Utilization (Operations/Bytes Per Sec)
[P4]: Excessive Page-Faults (≥ N)
[P5]: Excessive Filesystem Manipulations (≥ N)
[P6]: Excessive Registry Manipulations (≥ N)
[P7]: Vulnerability (NIST-SCAP/OVAL policies) Severity (≥ N)
[P8]: Configuration Severity (≥ N)
[P9]: Patch Severity (≥ N)
  • Missing Critical Patches for ≥ N Days
[P10]: Compliance (NIST-SCAP/XCCDF) Severity (≥ N)
  • PCI, FDCC, ...
[P11]: DEP Disabled

Image Alerts (712)

[I1]: Static Analysis (Threat-Level ≥ N)
[I2]: Runtime Monitor (Threat-Level ≥ N)
  • No Digital Signing
  • Certificate Chain Unverifiable
  • Publisher Unidentified

Grayware Alerts (Watch List) (713)

[G1]: Excessive CPU Utilization (≥ N%)
[G2]: Excessive Memory Utilization (≥ N%)
[G3]: Excessive I/O Utilization (Operations/Bytes Per Sec)
[G4]: Excessive Page-Faults (≥ N)
[G5]: Excessive Page File Usage (≥ N)
[G6]: Excessive Restarts (≥ N)
[G7]: Excessive Read/write/Other Operations/Transfers
[G8]: Filesystem Manipulations
  • In Folders Other Than Working Folder
[G9]: Registry Manipulations (≥ N)
[G10]: Database Manipulations (≥ N)
  • Uses Default MySQL, MSSQL, Oracle Ports
[G11]: Intermittent Network Traffic
[G12]: Traffic Encryption
[G13]: Uses Port N, or Ephemeral Ports
[G14]: Runs As Privileged Service Account
[G15]: Extensive Command Line
[G16]: DEP Disabled

Application Alerts (714)

[A1]: Excessive CPU Utilization (≥ N%)
[A2]: Excessive Memory Utilization (≥ N%)
[A3]: Excessive I/O Utilization (Operations/Bytes Per Sec)
[A4]: Excessive Page-Faults (≥ N)
[A5]: Excessive Page File Usage (≥ N)
[A6]: Excessive Virtual Size (≥ N)
[A7]: Excessive Restarts (≥ N)
[A8]: Excessive Read/write/Other Operations/Transfers
[A9]: Image Execution Path
  • Temporary Folders
[A10]: Low Elapsed Time & High Restarts & File Creations

710

SYSTEMS AND METHODS FOR USING REPUTATION SCORES IN NETWORK SERVICES AND TRANSACTIONS TO CALCULATE SECURITY RISKS TO COMPUTER SYSTEMS AND PLATFORMS

CROSS-REFERENCE TO RELATED APPLICATIONS

The present application claims the benefit of U.S. Provisional Appl. No. 61/641,007 entitled "System and Method for Operational Integrity Attestation," filed May 1, 2012, incorporated by reference herein in its entirety.

BACKGROUND OF THE DISCLOSURE

1. Field of the Disclosure

The present disclosure relates to the field of data center virtualization and, more particularly, to systems and methods for providing dynamic operational integrity attestation of application security and a user reputation at runtime.

2. Description of the Related Art

One recent trend in computing is the trend towards virtualization and cloud computing in which, for example, enterprise software is no longer owned by the customer, but instead the enterprise's Information Technology (IT) infrastructure can be provided by a third party and enterprise software applications are sold as service offerings.

Traditional legacy and currently available security technologies, such as next-generation anti-virus software, network firewalls, and intrusion detection/prevention systems, operate based on signatures, protocol anomalies or virtual execution in a sandbox to monitor threats and attacks. However, once a target of an attack or threat (i.e., a 'target system' or 'target platform') becomes infected or compromised, many of these technologies have been proven relatively ineffective in protecting systems and preventing data breaches or service disruptions. Emerging threats and attacks can exhibit a low and slow mode of operation and can be signature-less in order to evade traditional detection and defense technologies. Further, these technologies are often agnostic to the runtime operational integrity of computer workloads on the target (victim) systems and therefore often do not offer any level of remediation to service the affected target systems. As such, many traditional security technologies merely provide coarse-grained access controls limited to a simple allow or deny decision logic.

Many enterprises and organizations are moving there IT infrastructures to cloud computing environments (from self-managed on-premise data centers to service-provider managed outsourced virtual data centers), wherein which third parties may provide shared computing resources and applications running on those resources. They are being offered as services to a plurality of customers. The move by companies to cloud computing environments are increasing for various reasons, including the need for increased computing power, increased storage capacity, and/or increased network bandwidth, among others. Enterprise applications and mission critical applications may be executed in the cloud. Without adequate device, system, and application security, the cloud can compromise these applications, potentially causing large financial losses. Data confidentiality, data integrity and data availability can be maintained in the cloud computing environment even when such applications may be controlled by these third parties. The cloud may enable traditional information technology devices, systems and applications to transparently execute from these service-providers managed outsourced virtual data centers. As newer technologies emerge, the cloud infrastructure may evolve transparent to and scalable with enterprise operations. Security in such environments may be an emerging challenge. For example, virtualized, cloud computing on-demand, and elastic models require dynamic security orchestration at both the device and network level that is lacking in traditional security approaches and technologies.

A significant metric that relates to the lack of remediation controls in current security controls is the high rate of false positives and negatives in the detection of threats. False positives are unproductive and reduce operating capacity in data centers. False negatives lead to the bypass of security controls and compromise of the target systems and services. Existing signature-based approaches to security control are vulnerable to improvised attacks staged at targeted systems.

The proliferation of applications (business, social networking and gaming software) in Enterprise and cloud computing ecosystems has significantly increased the attack surface and window of exposure. Application runtime operational integrity is a critical factor in building end-to-end trust from device to service. The proliferation of unmanaged devices such as mobile computing devices (i.e., tablets and smart phones) and Bring Your Own Device (BYOD) policies in Enterprise network environments has increased the risk of advanced coordinated threats.

The current predominant security paradigm is based on a hard edge and soft core architecture. Security appliances such as network firewalls and intrusion detection/prevention systems deploy at the edge (perimeter). Antivirus and network based integrity measurement and verification services scan and audit the soft-core that comprises business critical systems, services and high value data silos. Once the edge is breached, defensive methods are largely ineffective in protecting vulnerable or compromised systems. In this paradigm, the hard edge does not generally provide any level of assurance of the runtime operational integrity of the soft core.

The heavy reliance on extensive application whitelists/blacklists (based on file hash digests and/or configuration), Internet Protocol (IP) address reputation lists, signatures, protocol anomalies and virtual execution in a sandbox, provides targeted and coordinated attacks a large staging surface to maneuver around with meticulously engineered evasion methods exploiting the gaps. Irrespective of the method of break-in, the post-infection behaviors during the window of exposure on a victim machine or environment are difficult to conceal, but may be obscured from timely detection and diagnosis by security administrators and virtual execution (sandbox) environments through evasion techniques. Various exemplary embodiments include an early warning system for threat identification and diagnosis with high forensic confidence and infection summaries for manual and/or automated intervention.

Current identity management (IdM) approaches are typically aimed at domain level authentication of users for the use of a security token in a transaction or business process wherein the issuance of the token is strictly based on proof of possession of credentials and not the reputation of the user. While the industry has adopted multi-factor authentication technologies for increased protection from malicious users whose intent is to steal credentials for the purpose of impersonation or delegation, these security controls do not provide a means for incorporating attribution of an authenticated user's risk posture, independent of provisioned entitlements (i.e., user account privileges and roles). Thus, existing security controls do not incorporate a complete view of a user's risk posture as a component of an access policy, based on correlation of location and device agnostic global threat intelligence about the user. Accordingly, what is needed are systems and methods for runtime operational integrity monitoring of applications by providing dynamic operational integrity attestation of application security and user reputation at runtime that take into account a subject's (such as a device, application, or user) risk posture. What is further needed are systems and methods for performing post infection diagnoses, threat identification via signature-less anomalous behavior recognition using non-intrusive platform instrumentation without requiring 'hooks' into an operating system (OS) Kernel by security vendors that leverages OS vendor application programming interfaces (APIs).

The emerging cloud based application-hosting model requires a higher level of scrutiny of device and user security posture. Threats can be posed by both external and internal users, and therefore it has become harder to determine whether an authenticated user is a trustworthy operative. Application and network layer entitlements are largely static in nature. While role based access control (RBAC) systems are positioned to offer dynamic policies, these are not based on any form of aggregation of external threat intelligence in the context of the user in the transaction.

Tokenization of identities by Security Token Services (STS) intended to facilitate in Identity Federation and Single Sign On (SSO) for web and Enterprise applications have only aggravated the threat vectors by expanding the scope of resources that an authenticated user may access implicitly without granular context. Along with the coarse access policies offered by traditional security controls, such as firewalls and intrusion prevention systems, this increases the attack surface for application exploits by malicious users leveraging the excessive privileges granted by default to most users (and groups) today, in the absence of strict Separation of Duties (SoD) and Principle of Least Privilege (PoLP) enforcement.

Several studies have uncovered conclusive evidence that the largest risk, associated with malicious activities resulting in theft of confidential data, intellectual property or financial losses for enterprises and consumers, arises from insider rather than outsider or man-in-the-middle attacks. Threat assessment systems have been predominantly focused on the means and methods rather than the adversary or operator (i.e., a user). There has been no emphasis on the reputation score of a user in the transaction or business process as a real time integrity metric for integration with access policy decision logic. Accordingly, what is further needed are systems and methods that employ a user reputation score that can serve either as a punitive or corrective method of intervention for the proactive prevention of exploits and data breaches.

One goal of trusted computing is to provide a resource owner or service provider with reliable knowledge about a target system. Current attestation systems are components of computer systems that permit reliable statements of evidence about those systems to be conveyed to remote parties, including other computers. Through evaluation of the identity and integrity of components of a system (i.e., a target system being evaluated), evidence is produced that the target system will not engage in defined classes of misbehaviors. As the users accessing a system and the requirements of applications running on a system generally cannot be known a priori, attestation systems and measurement systems alike must be flexible, providing for privacy, completeness of measurement, and trust in the basic collection and reporting mechanisms.

Existing attestation systems are often narrowly focused and generally aimed at specific use-cases limited to system components such as hardware and applications and therefore typically lack flexibility to dynamically address more general attestation problems. Further, existing definitions of attestation focus primarily on describing specific, narrow, and particular properties desirable in specific use-cases. Additionally, current attestation systems are created to work with one particular measurement system targeting one particular system of interest without considering the reputations of users or operators of the system of interest.

Accordingly, what the present inventors have identified as desirable are technology based attestation architectures, systems, and methods that perform a calculus of risk to determine a level of trust of systems that are not necessarily monolithic and can be made up of diverse hardware and software platforms and can be accessed by users with varying credentials and reputations. Accordingly, what the inventors have identified as being desirable are attestation architectures, systems, and methods that can be flexible enough to accommodate varying concepts of attestation, including taking the reputation of users that access targeted systems into account. What the present inventors also see as desirable are attestation systems and architectures that can dynamically handle complex attestation scenarios and provide more complete runtime attestation than is currently achievable. What the present inventors additionally see as desirable are methods and systems for performing evidence based automated application binary analysis.

SUMMARY OF THE DISCLOSURE

Exemplary methods and systems are disclosed for continuously monitoring one or more systems and/or to correlate events and behavior of systems on an instrumented target platform at runtime using or based on a plurality of assertions (or statements).

In exemplary embodiments, methods, apparatus, systems and computer readable media perform infection diagnosis based on reconnaissance based intelligence correlation and a threat life cycle model of advanced low-and-slow attacks wherein malware may operate through a series of benign actions at an endpoint device.

In other exemplary embodiments, methods, apparatuses, systems and computer readable media comprise a plurality of services that enable visibility, control, and/or compliance in a cloud computing environment with a runtime dashboard to capable of displaying operational integrity metrics of systems based on a plurality of threat vectors.

In yet other exemplary embodiments, methods, apparatuses, systems and computer readable media establish device-to-network flows based on dynamic attestation of device integrity, and/or security controls provisioned based on integrity and context aware business logic instead of, for example, topology based coordinates associated with encapsulation headers in network packets.

Exemplary systems and methods for dynamic attestation of application integrity are described in U.S. Non-Provisional patent application Ser. No. 13/399,065 entitled "System and Method for Application Attestation," filed Feb. 16, 2012, and U.S. Provisional Patent Application No. 61/443,854 entitled "System and Method for Application Attestation," filed Feb. 17, 2011, both of which are incorporated herein by reference in their entireties.

According to exemplary embodiments, methods, apparatuses, systems and computer readable media authorize user-to-application transactions and/or data exchange in an established connection, during the authentication phase based on dynamic attestation of devices.

In accordance with further exemplary embodiments, methods, apparatuses, systems, and computer readable media determine a calculus of risk based on a plurality of sensory inputs from network and endpoint sensors to correlate network activity, system configuration, resource utilization and application integrity.

According to an exemplary embodiment, the network and endpoint sensors may be configured to measure runtime operational integrity and/or detect anomalous deviations in behavior from baseline based on rule sets to generate tiered alerts.

In accordance with exemplary embodiments, methods, apparatuses, systems and computer readable media comprise an event and behavior correlation engine configured to receive alerts, calculate risks and generate warnings.

In other exemplary embodiments, methods, apparatuses, systems and computer readable media remediate systems that are deviated, vulnerable, in duress or compromised based on a calculus of risk.

In accordance with yet other exemplary embodiments, methods, apparatuses, systems and computer readable media include: (1) a correlation engine configured to receive scan reports from vulnerability, configuration, compliance, and patch scan services; (2) a risk correlation matrix configured to store elements of the scan reports that are used to analyze the elements; and (3) a module configured to generate an integrity profile of systems.

The presently disclosed exemplary technical solutions also may be embodied as methods, apparatuses, systems and computer readable media comprising: (1) event correlation logic that correlates temporal system events based on multiple predicate scores; (2) logic to determine a predicate score based upon a deviation from a prescribed value constraint per attribute (or metric, i.e., an attribute constraint); (3) logic for calculating a score that is inversely proportional to the deviation; (4) logic for determining a sample rate needed to achieve a required measurement frequency; (5) logic for determining a recurrence of successive deviations; (6) logic for identifying a weight for the attribute constraint; (7) logic for determining an integrity confidence for the system or process (or application) entity as a weighted average of predicate scores; and (8) logic for determining identifying outliers as exceptions (across multiple systems or processes).

The exemplary methods, apparatuses, architectures, systems and computer readable media disclosed herein may also use threat identification categories including, but not limited to:

(1) static image analysis (i.e., static analysis of binary files, intermediate code, and/or scripts);

(2) dynamic image (binary, intermediate code, or script) analysis with process, platform and network monitors;

(3) malware analysis for evasion techniques (multiple packing, obfuscated application programming interfaces (APIs), anti-debugging, anti-memory, anti-tracing, virtual machine monitor/manager (VMM) or hypervisor/emulator detection;

(4) dynamic system analysis of performance metrics harvested through native machine instrumentation, registry, and file system monitors; and (5) temporal system analysis with consolidated integrity measurement and verification assessments and scan reports.

The presently disclosed exemplary technical solutions may be embodied as a method, apparatus and/or system for integrity confidence measurement including: (1) a weighted average of system (or platform) predicate scores; (2) system (or platform) outliers; (3) weighted average of process (or application package) predicate scores; (4) process outliers.

The presently disclosed exemplary technical solutions also may be embodied methods, apparatuses, architectures, systems and computer readable media for generating user reputation scores for a plurality of users based on one or more of: (1) threat vectors modeled by actions of the plurality of users; (2) risk correlation with aggregation of intelligence related to accessed object (resource) attribution, subject roles, globally unique subject identifiers, security information and event management analytics, and geo-location services.

BRIEF DESCRIPTION OF THE DRAWING FIGURES

The presently disclosed exemplary technical solutions are best understood from the following detailed description when read in connection with the accompanying drawings, to which the claimed invention is not limited. According to common practice, various features/elements of the drawings may not be drawn to scale. Common numerical references represent like features/elements. The following figures are included in the drawings:

FIG. 7B depicts exemplary endpoint alerts that can be generated by the systems and methods disclosed herein;

Figure 13:
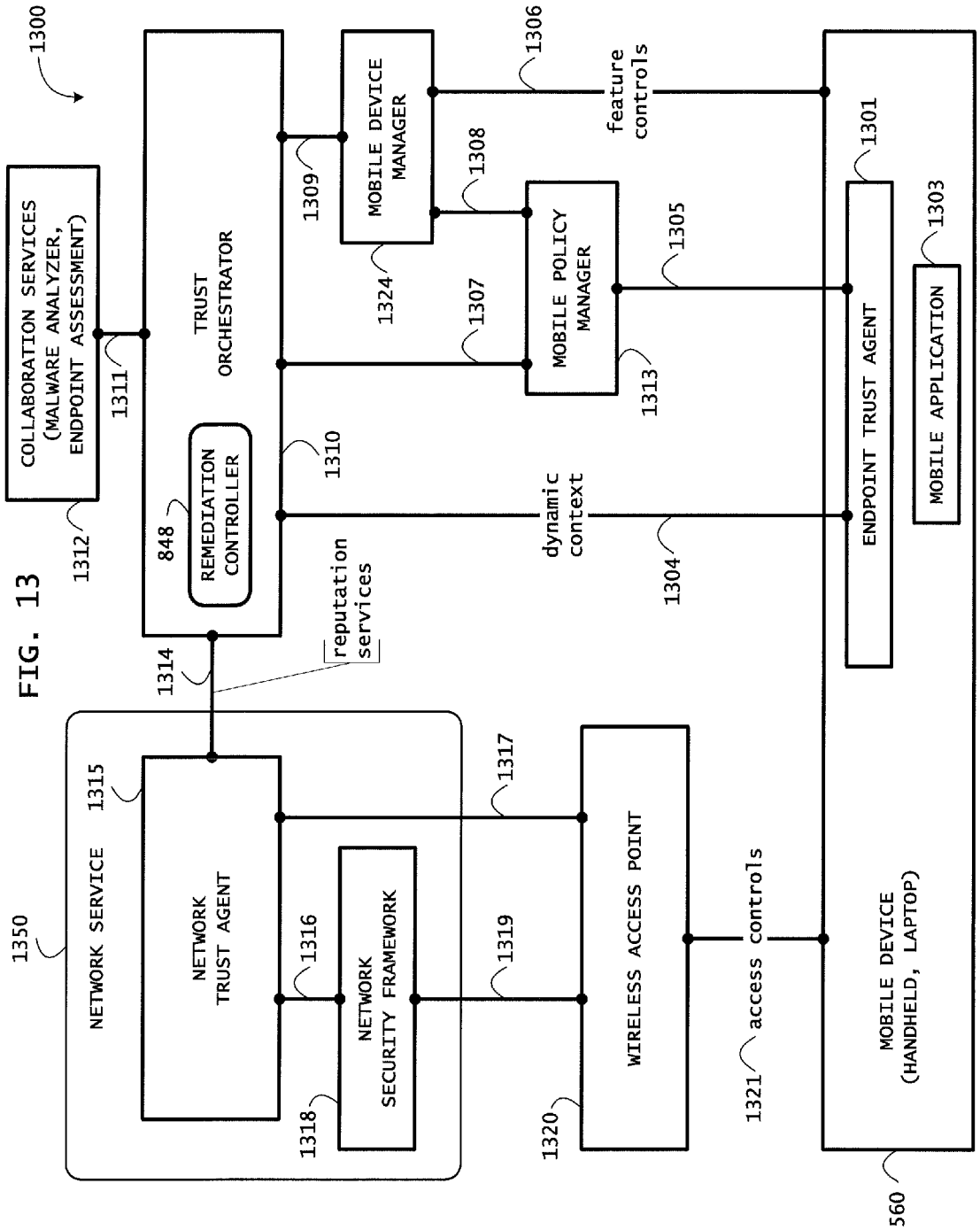
Figure 23:
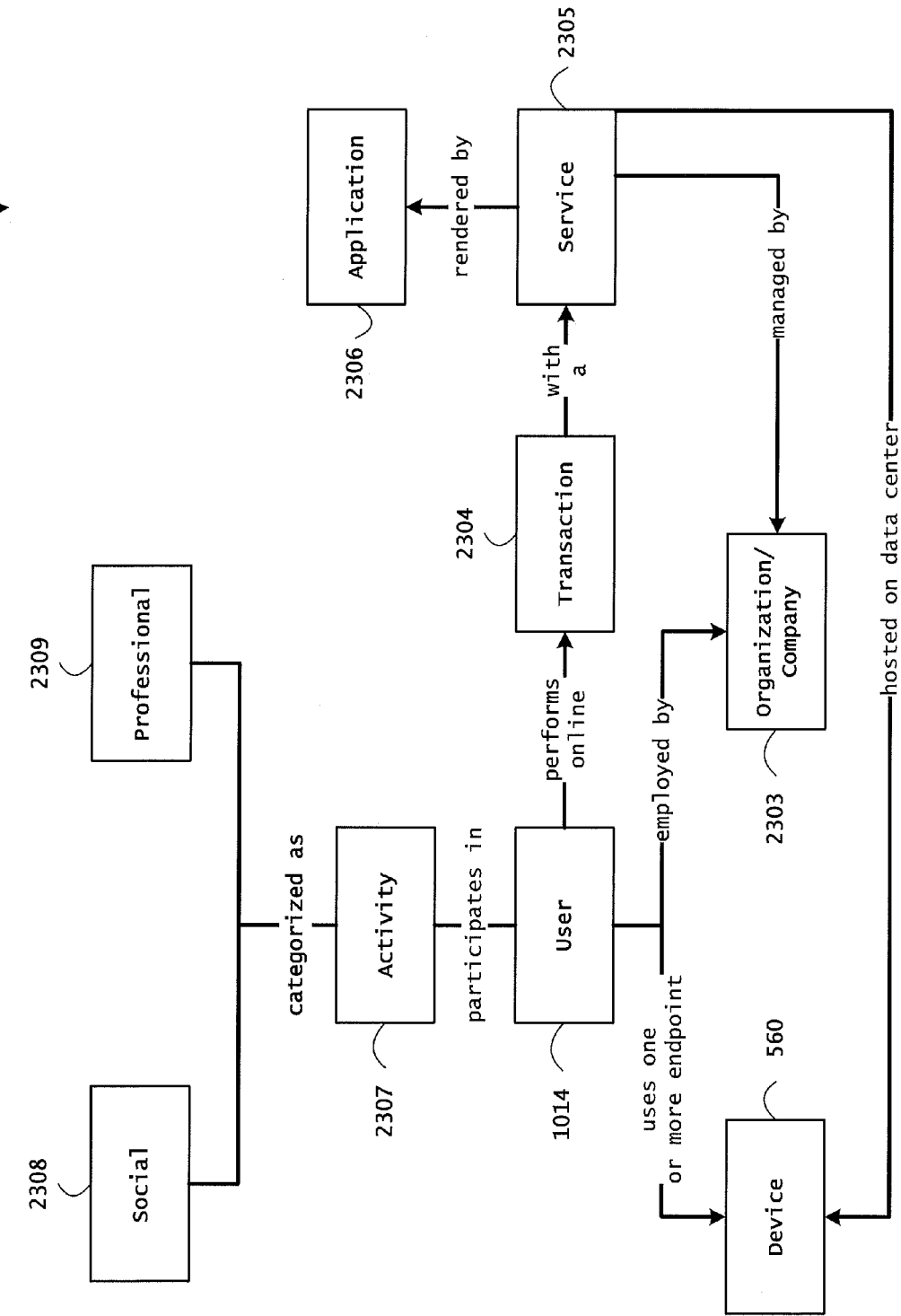
Figure 24:
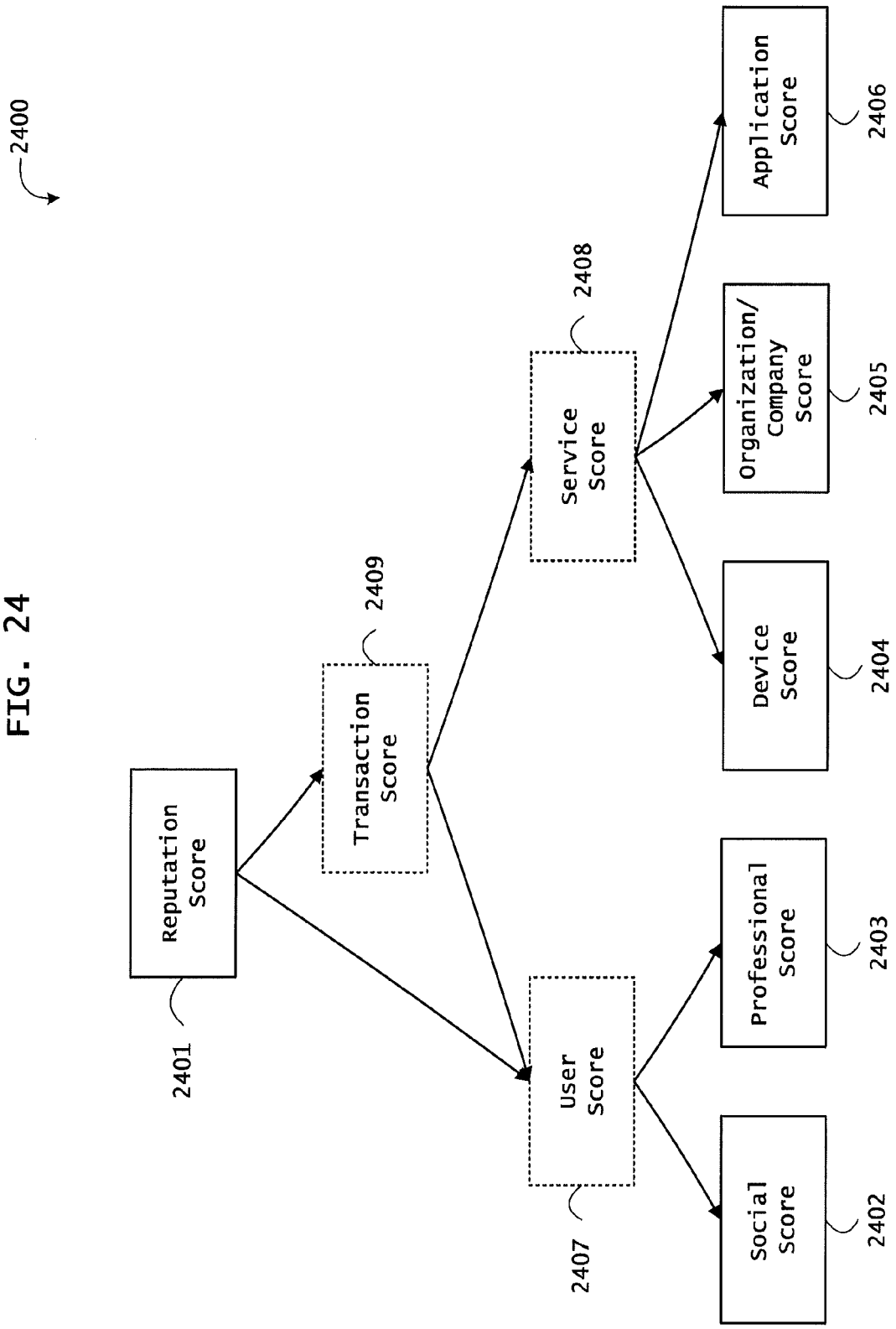
Figure 25:
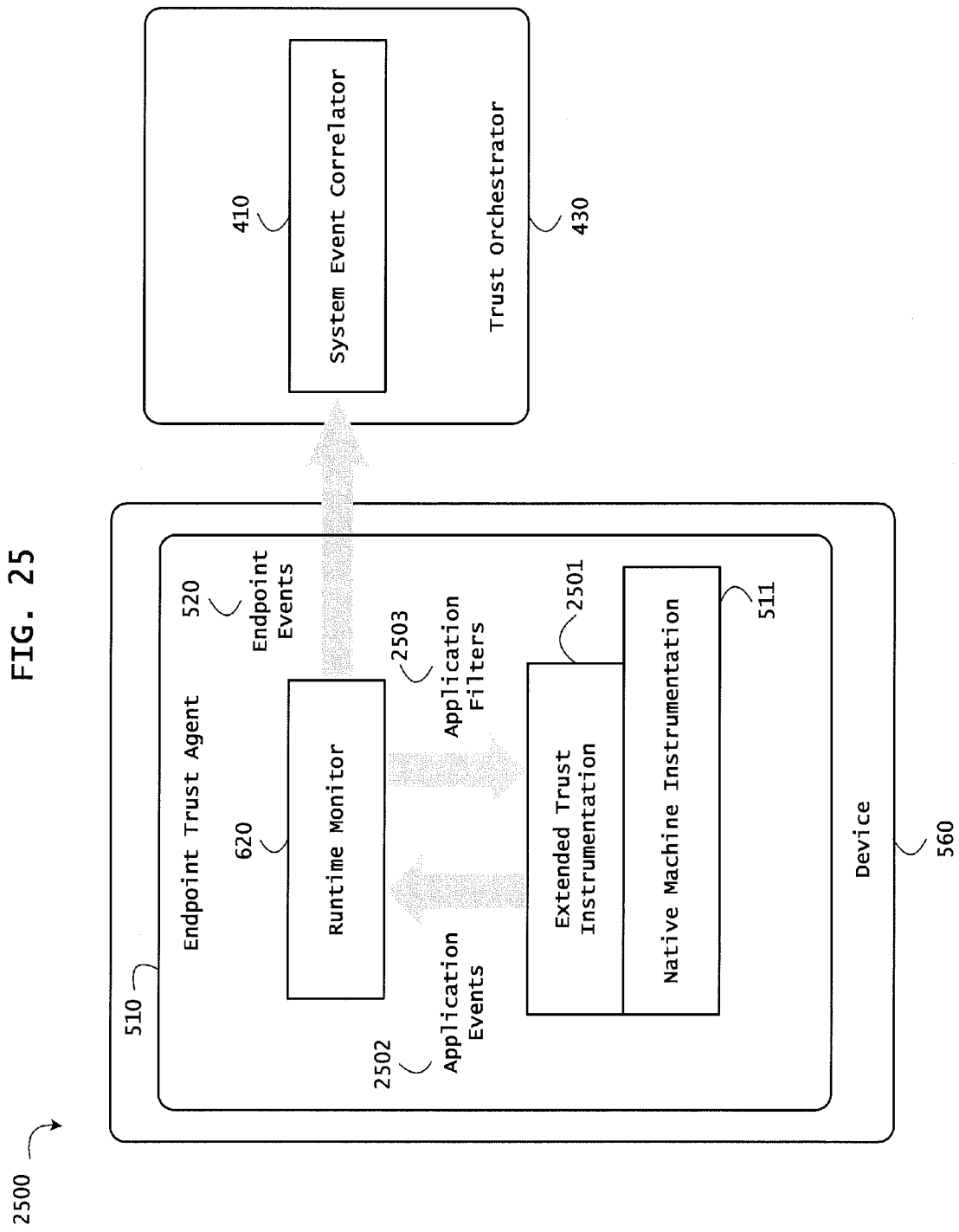
Figure 26:
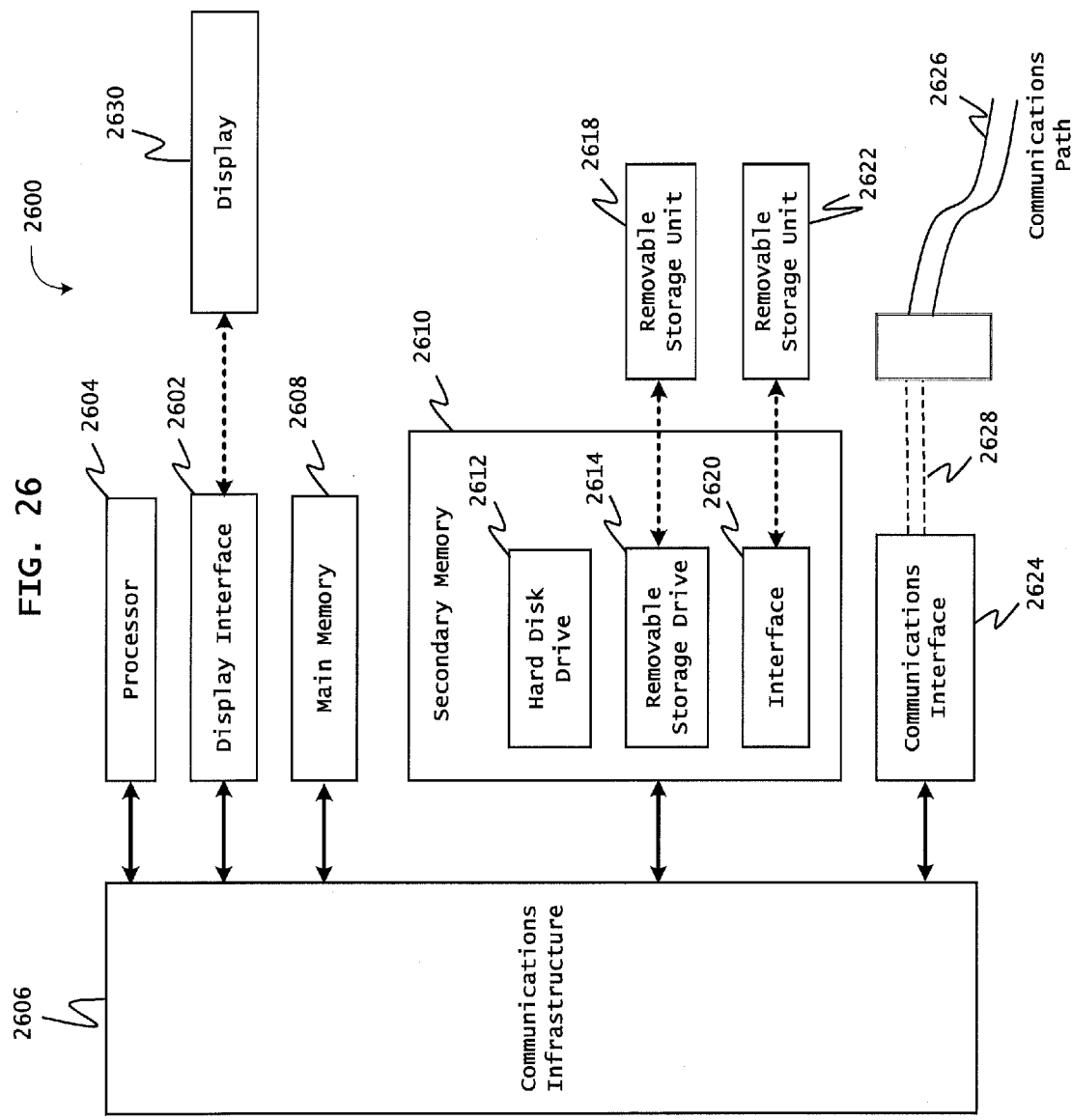

FIG. 13 a block diagram illustrating of a system for providing mobile security by remediating mobile devices and wireless network flows based on a calculus of risk, according to an exemplary embodiment of the present disclosure;

FIGS. 14-18 depict a graphical user interface (GUI) for an exemplary trust management console including dashboards for operational runtime integrity, system configuration, resource, application integrity, and network activity, in accordance with various exemplary embodiments;

FIGS. 19-22 are flowcharts illustrating methods for threat identification and remediation, providing a user reputation service, and providing network flow level remediation in accordance with various exemplary embodiments of the presently disclosed technology;

FIG. 23 is an entity-relationship diagram (ERD) illustrating relationships between entities of a reputation scoring system, according to an embodiment of the present disclosure;

FIG. 24 illustrates a hierarchical representation of a subject reputation score, according to an embodiment of the present disclosure;

FIG. 25 is a block diagram of an architecture for monitoring application events with extensions to native machine instrumentation, according to an exemplary embodiment of the present disclosure; and FIG. 26 is a diagram of an example computer system in which embodiments can be implemented.

DETAILED DESCRIPTION

Although the invention is illustrated and described herein with reference to certain exemplary embodiments, the invention is not intended to be limited thereto. Rather, various modifications may be made that are within the scope and range of equivalents of the claims and without departing from the invention. Various features, attributes and advantages described herein may or may not be present in various embodiments of the claimed invention.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In certain exemplary embodiments, behavior deviations from a baseline healthy operational state to a vulnerable or compromised state may be detected, and the infection identified, before there is further propagation of the threat across interconnected systems, or information is exfiltrated resulting in data loss or theft.

The proliferation of unmanaged smart phones and Bring Your Own Device (BYOD) initiatives in the Enterprise ecosystem has increased the ability of advanced malware to evade traditional network and endpoint security controls and propagate to connected systems over standard protocols. Various exemplary embodiments include determination of the operational integrity of the device and/or the user in a transaction with an on-premise or off-premise service, based on the calculus of risk from a plurality of sensory inputs, for transaction and/or flow level remediation of infected devices.

Network for Monitoring and Dynamic Analysis of Events and Activities

Figure 1:
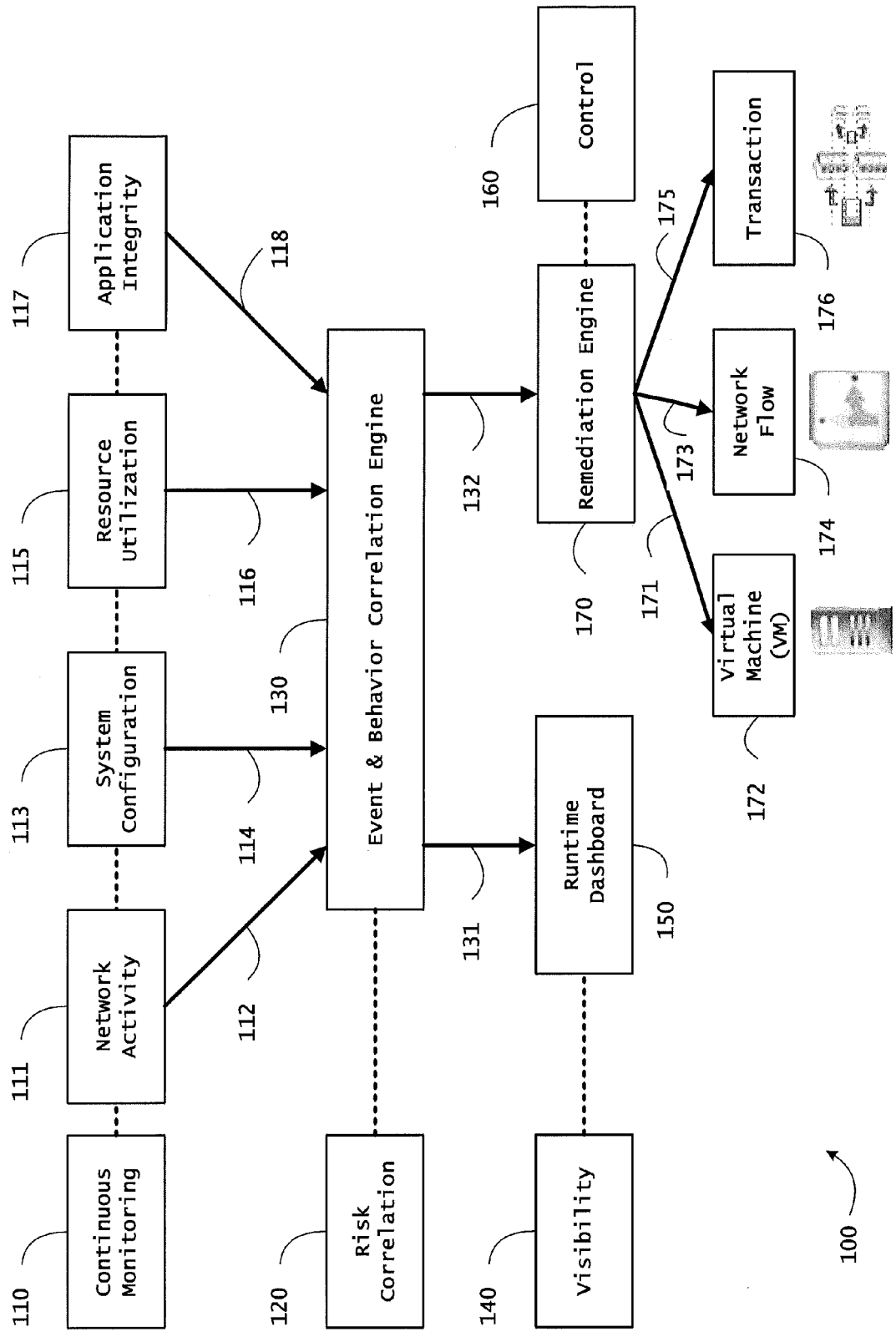
FIG. 1 is an architecture diagram of an exemplary system for providing operational integrity attestation of application security and user reputation, according to an embodiment of the present disclosure.

FIG. 1 is an architecture diagram for an exemplary network 100 configured to continuously monitor and dynamically analyze events and network activity to ascertain the integrity of a monitored system (i.e., a target system).

Referring to the exemplary embodiment provided in FIG. 1, the network 100 includes an event and behavior correlation engine 130 configured to perform risk correlation 120 based on continuous monitoring 110 using a plurality of sensory inputs. In the embodiment of FIG. 1, the sensory inputs can include, but are not limited to, one or more of: network activity 111; system configuration 113; resource utilization 115; and application integrity 117. The network 100 also comprises a runtime dashboard 150 configured to receive real time status indications 131 for visibility of operational integrity of systems and a remediation engine 170 configured to receive real time directives 132 for control of infected systems.

The event and behavior correlation engine 130 is configured to receive network events and infection profiles 112 from a network activity sensor 111, integrity measurement and verification reports 114 of scans performed by a system configuration sensor 113. According to an embodiment, the scans are performed by the configuration sensor 113 according to a schedule. In embodiments, the scans can be scheduled to run daily, weekly, bi-weekly, monthly, or at other time increments as needed.

As shown in FIG. 1, the event and behavior correlation engine 130 is also configured to receive endpoint events 116 of computing, network and storage resource consumption from a resource utilization sensor 115, and endpoint events of image profiles and local execution context 118 from an application integrity sensor 117. Details of exemplary implementations of the system configuration sensor 113, the resource utilization sensor 115, the application integrity sensor 117, and the endpoint events 116, 118 are described below with reference to FIGS. 4-7.

The remediation engine 170 may perform actions 171 on a virtual machine (VM) 172, actions 173 on a network flow controller 174, or actions 175 on a transaction 176 based on configured trigger controls.

Figure 2:
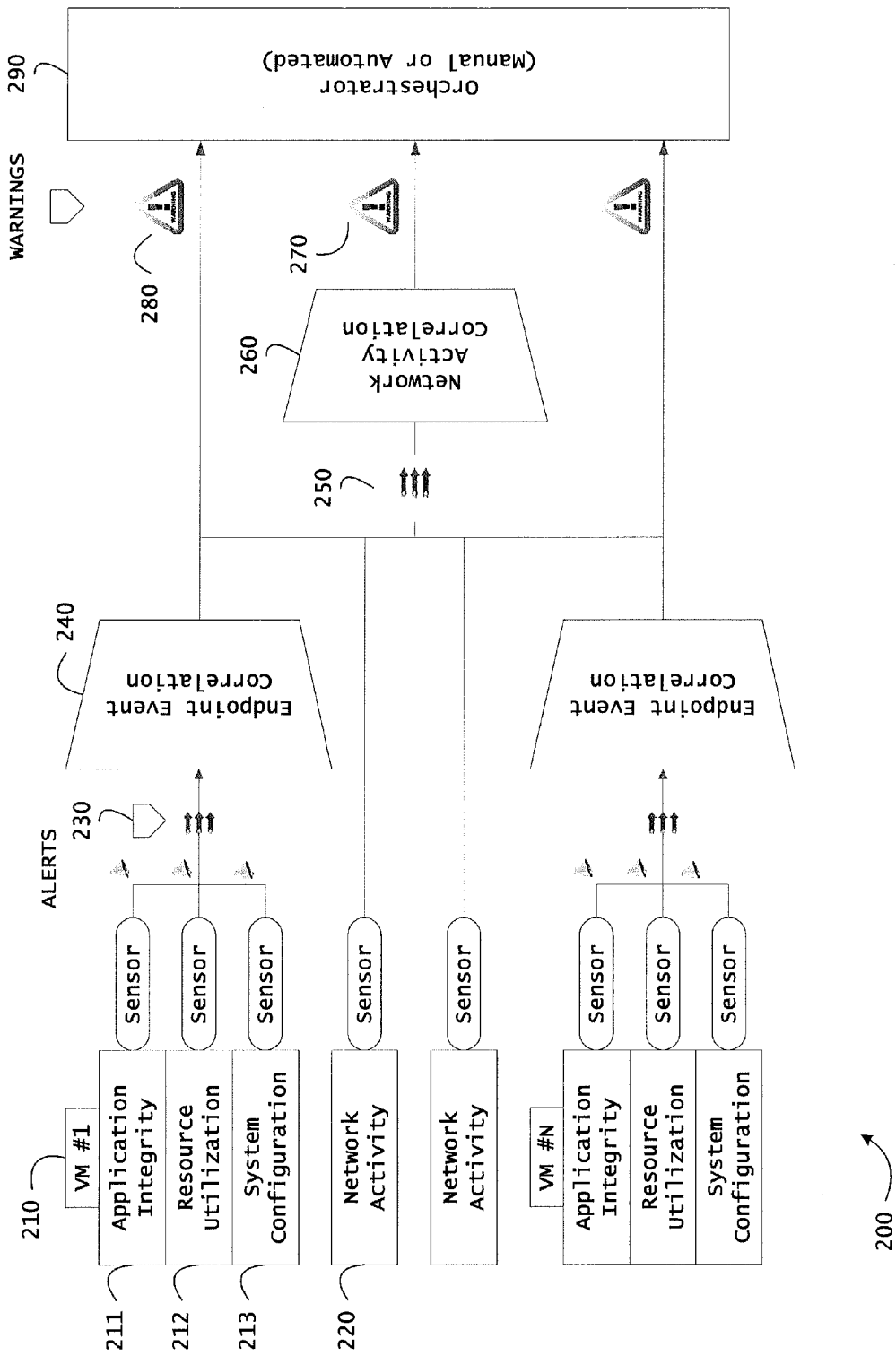
FIG. 2 is a schematic diagram illustrating an exemplary system for endpoint and network activity correlation, according to an exemplary embodiment of the present disclosure.

As will be appreciated by persons skilled in the relevant art(s), a VM is a software implementation of a machine such as a server, personal computer, mobile computing device, or other computing device that supports the execution of an operating system (OS) and executes applications as a physical machine running that OS would. A VM is a software implementation that duplicates the functionality of a physical machine implemented in hardware and software. Software applications and the OS running on a VM are limited to the resources and abstractions provided by the VM. Virtual machines (VMs) can be viewable within an overall virtual infrastructure. As will be appreciated by those skilled in the relevant art, a VMM or hypervisor can be used to start up, monitor, and manage VMs. Such hypervisors can be, but are not limited to VMMs such as the VMWARE™ Player, MICROSOFT™ VirtualPC, SUN™ VirtualBox, VMWARE™ ESX/ESXi, MICROSOFT™ Hyper-V, CITRIX™ XENServer, PARALLELS™ and others. As it would be apparent to one of skill in the art, other hypervisors and VMs/virtualization solutions can be used for VM 172 in network 100 as well.

Example System and Method for Endpoint and Network Activity Correlation FIG. 2 is a schematic diagram illustrating an exemplary system 200 for endpoint and network activity correlation. In particular, the system 200 shown in FIG. 2 is configured to receive inputs for endpoint events, correlate the events, and generate outputs such as, but not limited to, warnings and reports.

As shown in FIG. 2, the exemplary system 200 may include an endpoint event correlation module 240 configured to receive endpoint alerts 230 from an instrumented system 210 with a plurality of sensors configured to detect endpoint events related to one or more of application integrity 211, resource utilization 212, and system configuration 213. The system 200 also comprises a network activity correlation module 260 configured to receive network alerts 250 from a network activity sensor 220.

With continued reference to FIG. 2, the network activity correlation module 260 is further configured to produce network warnings 270 resulting from the network activity correlation and output the network warnings 270 to an orchestrator 290. The orchestrator 290 is configured to receive network warnings 270 from network activity correlation module 260 and endpoint warnings 280 from the endpoint event correlation module 240. According to embodiments depicted in FIG. 2, the received network warnings 270 and endpoint warnings 280 can be used by orchestrator 290 to coordinate manual or automated actions on infected systems.

With continued reference to FIG. 2, the orchestrator 290 can similarly receive warnings produced by one or more additional instrumented systems (see, e.g., VM #N) with respective pluralities of sensors and endpoint event correlation modules.

As shown in FIG. 2, the instrumented systems can include multiple virtual machines (VMs, i.e., VM 1 . . . VM #N) with respective pluralities of sensors configured to detect endpoint events related to one or more of application integrity 211, resource utilization 212, and system configuration 213.

Figure 3A:
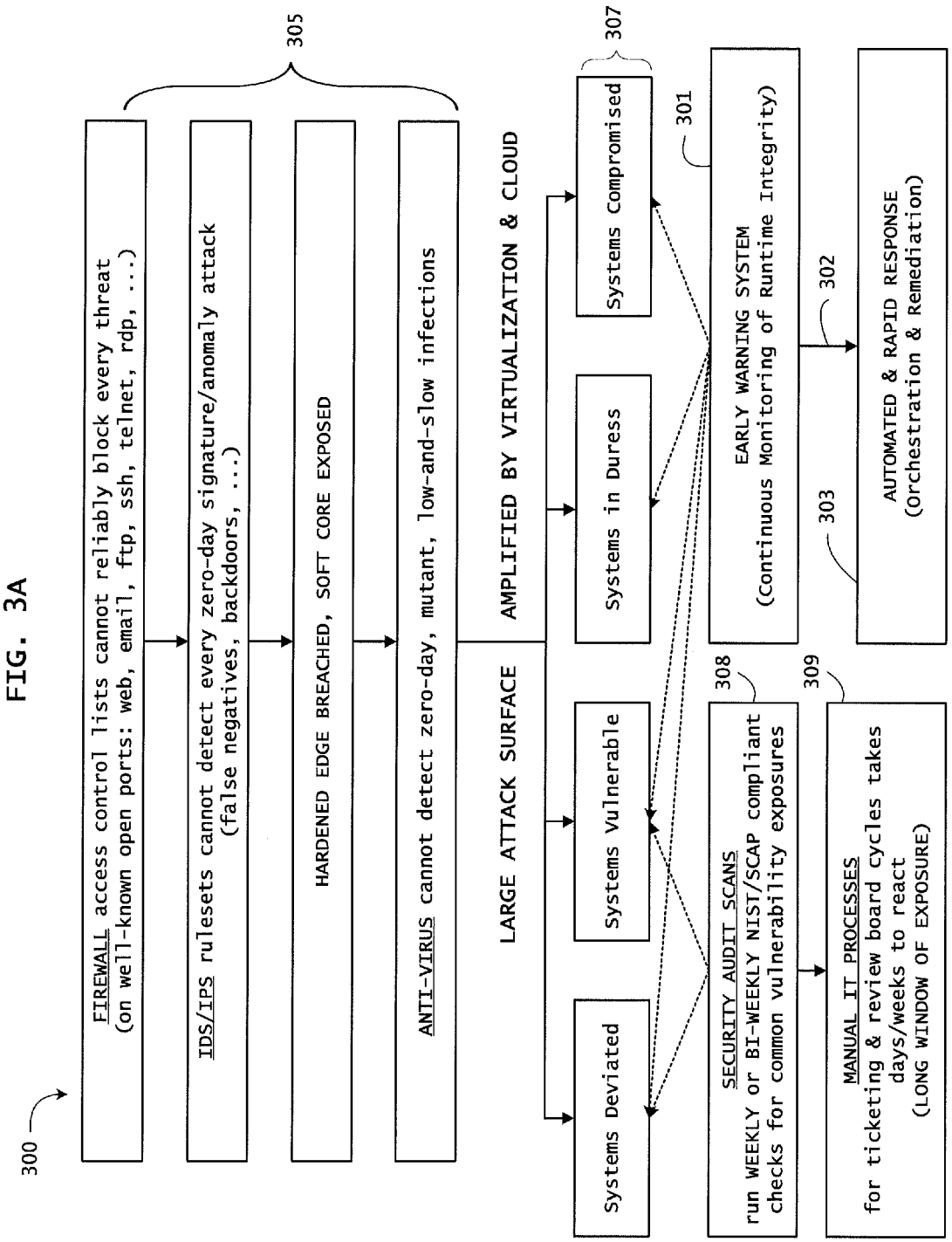
FIG. 3A is a flowchart illustrating steps by which early warning and response automation is performed through monitoring, orchestration and remediation, according to an exemplary embodiment of the present disclosure.

FIG. 3A is a flowchart illustrating steps by which early warning and response automation is performed using monitoring, orchestration and remediation, in accordance with an exemplary method.

As shown in FIG. 3A, an exemplary method 300 comprises receiving communications from an early warning system 301 configured to continuously monitor the runtime integrity of systems. This continuous monitoring enables near-real time determinations and detections of deviated, vulnerable, in duress, and compromised systems 307.

The method 300 can operate in conjunction with legacy security technologies 305 to fill in the security holes or gaps inherent in traditional security solutions. As illustrated in FIG. 3A, such legacy security technologies 305 can include anti-virus software, network firewalls, and intrusion detection/prevention systems (IDS/IPS). Unlike the early warning system 301 and the automated and rapid response 303, the legacy security technologies 305 are limited to using signatures, detecting protocol anomalies or virtual execution in a sandbox to monitor threats and attacks. As shown in FIG. 3A once a target of an attack or threat (i.e., a 'target system' or vulnerable system 307) becomes infected or compromised, these technologies 305 can be ineffective in protecting the compromised/infected systems 307 and preventing data breaches or service disruptions.

Example limitations of legacy security technologies 305 are shown in FIG. 3A. For example, as depicted in FIG. 3A, a traditional network firewall technology 305 using access control lists (ACLS) cannot reliably block every threat. This is because firewalls are typically limited to monitoring well-known, default open ports used as listening ports for web protocols such as the Transmission Control Protocol/Internet Protocol (TCP/IP), email protocols such as the Simple Mail Transfer Protocol (SMTP) and the Post Office Protocol (POP), and other protocols such as the File Transfer Protocol (FTP), the Secret File Transfer Protocol (SSH), Secure FTP (SFTP), telnet, and the Remote Desktop Protocol (RDP). IDS and IDP technologies using rulesets cannot detect every zero-day signature/anomaly attack and have issues with regarding false negatives and leaving platforms/systems vulnerable to backdoor attacks. Similarly, anti-virus software cannot detect zero-day, mutant, and low-and-slow infections.

The method 300 can also supplement security audit scans 308 and manual IT process that may be in place. For example, an organization may periodically run security audit scans (i.e., on a weekly or bi-weekly basis). Such security audit scans may be National Institute of Standards and Technology (NIST)/Security Content Automation Protocol (SCAP) compliant checks for common vulnerability exposures to identify deviated and vulnerable systems 307. The results from these scans may be used as part of manual IT processes for ticketing (i.e., creating 'trouble tickets' for deviated/vulnerable systems 307) and security/compliance review boards. However, as shown in FIG. 3A these manual processes triggered by merely periodic scans can takes days or weeks to react to threats, thus leaving target systems open to a long window of exposure.

The method 300 improves upon the legacy technologies 305, periodic audit scans 308, and manual IT processes 309 and makes up for their above-noted shortcomings by carrying out an automated and rapid response 303 for orchestration and remediation of infected systems 307. In an embodiment, automated and rapid response 303 can be performed by monitoring and orchestration systems (not shown). In the example of FIG. 3, a protocol 302 is used for data exchange between the early warning system 301 and monitoring and orchestration systems.

In an embodiment, the early warning system 301 monitors instrumented systems to measure and evaluate runtime operational integrity to determine whether a system 307 has deviated, become vulnerable, is in duress or has been compromised. Once this determination has been made, the system 307 is marked by the early warning system 301 as one or more of a deviated system, a vulnerable system, an in duress system, or a compromised/infected system. The early warning system 301 can then issue warnings regarding the system 307 via the protocol 302 so that an automated and rapid response 303 can be carried out by monitoring and orchestration systems.

Figure 3B:
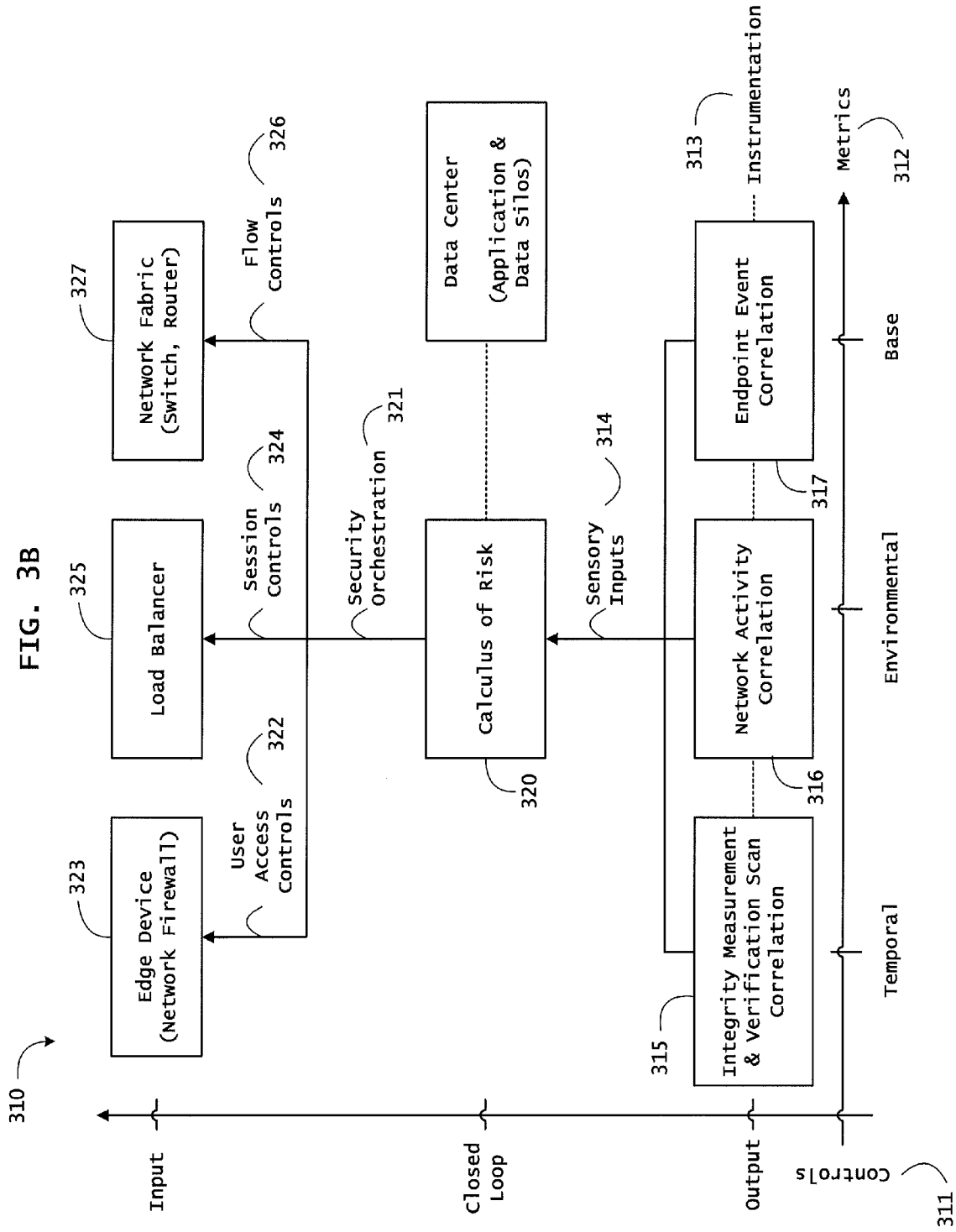
FIG. 3B is a data flow diagram for intersystem risk assessment and remediation, according to an exemplary embodiment of the present disclosure.

FIG. 3B is a schematic diagram illustrating an exemplary method 310 for determining a calculus of risk, in accordance with exemplary embodiments.

Referring to FIG. 3B, the exemplary method 310 may include determining or performing a calculus of risk 320 for the data center application and data silos, that receives sensory inputs 314 from instrumentation 313 including integrity measurement and verification scan correlation 315, network activity correlation 316 and endpoint event correlation 317, and may generate integrity metrics for security orchestration 321, and may dispatch directives to an edge device 323 (for example, network firewall) for user access controls 322, to a load balancer 325 for session controls 324, or to a network fabric element 327 (for example, a switch or router) for flow controls 326.

With continued reference to FIG. 3B, the security orchestration 321 may include user access controls 322 as a remediation or mitigation means to block the infected device or malicious user from accessing protected data center centers, session controls 324 to divert users from infected systems or infected devices from protected systems, flow controls 326 to quarantine infected systems, divert traffic away from protected systems, or redirect traffic from attackers to pure, high-interaction or low-interaction honeypots.

Figure 4:
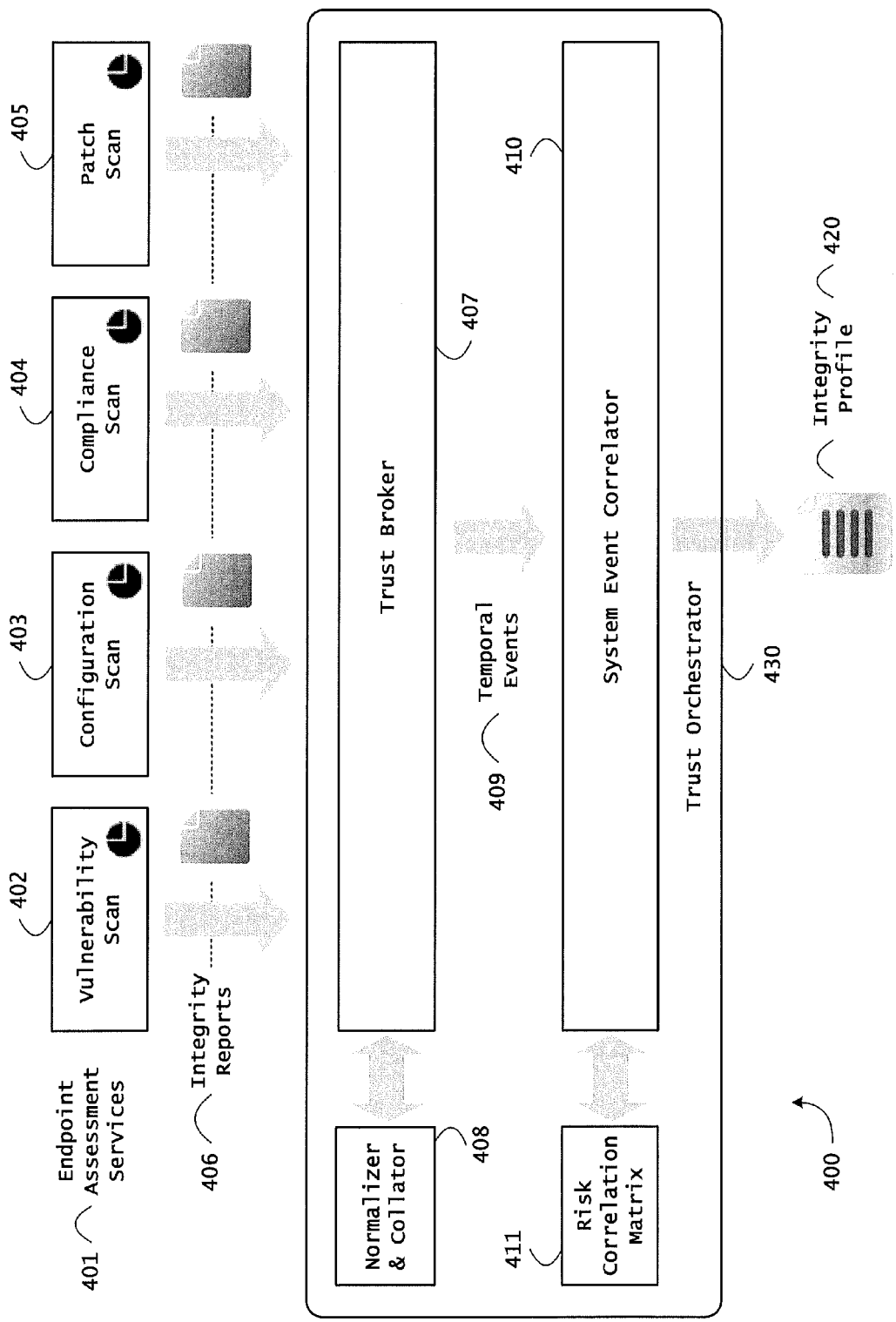
FIG. 4 is a data flow diagram for configuring an attestation system by consolidating and normalizing network endpoint assessments, according to an exemplary embodiment of the present disclosure.

FIG. 4 illustrates data flows used to configure an attestation system. In particular, FIG. 4 depicts a data flow for consolidating and normalizing network endpoint assessments as part of a configuration for an exemplary attestation system 400.

Referring to FIG. 4, the exemplary attestation system 400 includes a trust orchestrator 430, a trust broker 407 configured to receive integrity reports 406 published by endpoint assessment services 401.

Trust Broker and Integrity Report

With continued reference to FIG. 4, the trust broker 407 can be configured to receive sensory data feeds that represent the configuration state of the system based on a remotely administered scan of a device, such as device 560 described with reference to FIG. 5 below, by endpoint assessment services 401. These scans provide a snapshot in time of the state of the system and are agnostic to runtime aspects of the system including applications thereon.

In an embodiment, the sensory data is represented in a markup language such as, but not limited to, Extensible Markup Language (XML). An integrity report 406 includes this sensory data. In embodiments, the integrity report 406 is generated by third party endpoint assessment services at platform- and application-level granularities. According to embodiments, the integrity report 406 may be received by the trust broker 407 either: (a) programmatically through outbound application programming interfaces (APIs) provided by respective application vendors; or (b) manually through importing the integrity report 406 as a file provided by an administrator through a dashboard of an administrative console user interface (UI) in a specified file format. Examples of an administrative console UI are discussed below with reference to FIGS. 14-18.

The trust broker 407 can also be configured to parse, normalize and collate received integrity reports 406. In accordance with embodiments, the parsing, normalizing, and/or collating can be based on one or more object identifiers. Exemplary object identifiers can include, but are not limited to, machine hostnames, IP addresses, application names, and package names. This parsing, normalization, and collation (collectively, processing) generates temporal events 409 that annotate the state of the endpoints (devices) at scan time. Additional embodiments of the trust broker are described with reference to FIGS. 5, 9, and 11 below.

Temporal Events

According to embodiments, the temporal events 409 can be expressed as assertions about operational parameters (e.g., vulnerabilities, compliance, patch level, etc.) based on enterprise policies established for a baseline configuration. The trust broker 407 serves as a moderator that aggregates endpoint operational state measurements for situation awareness and threat identification by the trust orchestrator 430.

With continued reference to FIG. 4, the temporal events 409 can be an annotation (e.g., an XML representation) of the configuration state of the system (including device, application and package) and include trust and severity scores as generated by third party security vendors based on integrity measurement and verification, in accordance with standards established by organizations. These organizations can include NIST, the MITRE Corporation, and the United States Computer Emergency Readiness Team (US-CERT). The temporal events can be assertions about operational parameters expressed in the Open Vulnerability and Assessment Language (OVAL) to convey system details representing configuration information and a system/machine state including vulnerability, configuration, patch level, etc. Alternatively, the system details can be conveyed using the SCAP protocol. According to embodiments, the state representation includes schema attributes to measure configuration, vulnerability (exposures), compliance, and patch level based on severity. Compliance can be expressed in terms of the Extensible Configuration Checklist Description Format (XCCDF) using XCCDF checklists for devices attached to a system's Peripheral Component Interconnect (PCI) bus, and data security/system integrity compliance with the Health Insurance Portability and Accountability Act (HIPAA), Sarbanes-Oxley Act (SOX), and/or the Gramm-Leach-Bliley Act (GLBA).

As shown in FIG. 4, the integrity reports 406 can be generated by performing one or more scans, including, but not limited to, a vulnerability scan 402, a configuration scan 403, a compliance scan 404, and a patch scan 405 of networked endpoints. In an embodiment, the trust broker 407 can be implemented as the Trust-as-a-Service (TaaS) Broker from TAASERA, Inc. In one exemplary embodiment, the trust orchestrator 430 can be implemented as the TaaS Orchestrator from TAASERA, Inc.

With continued reference to FIG. 4, the attestation system 400 further comprises a normalizer and collator 408 and a system event correlator 410 configured to receive temporal events 409 associated with an endpoint and use a risk correlation matrix 411 to correlate and generate an integrity profile 420 for an endpoint. According to embodiments, the system event correlator 410 shown in FIG. 4 can be configured to receive temporal events 409 generated by the trust broker 407 that measure the integrity of the system at last scan. Additional exemplary features of the system event correlator 410 are described below with reference to FIG. 5.

Integrity Profile

Figure 5:
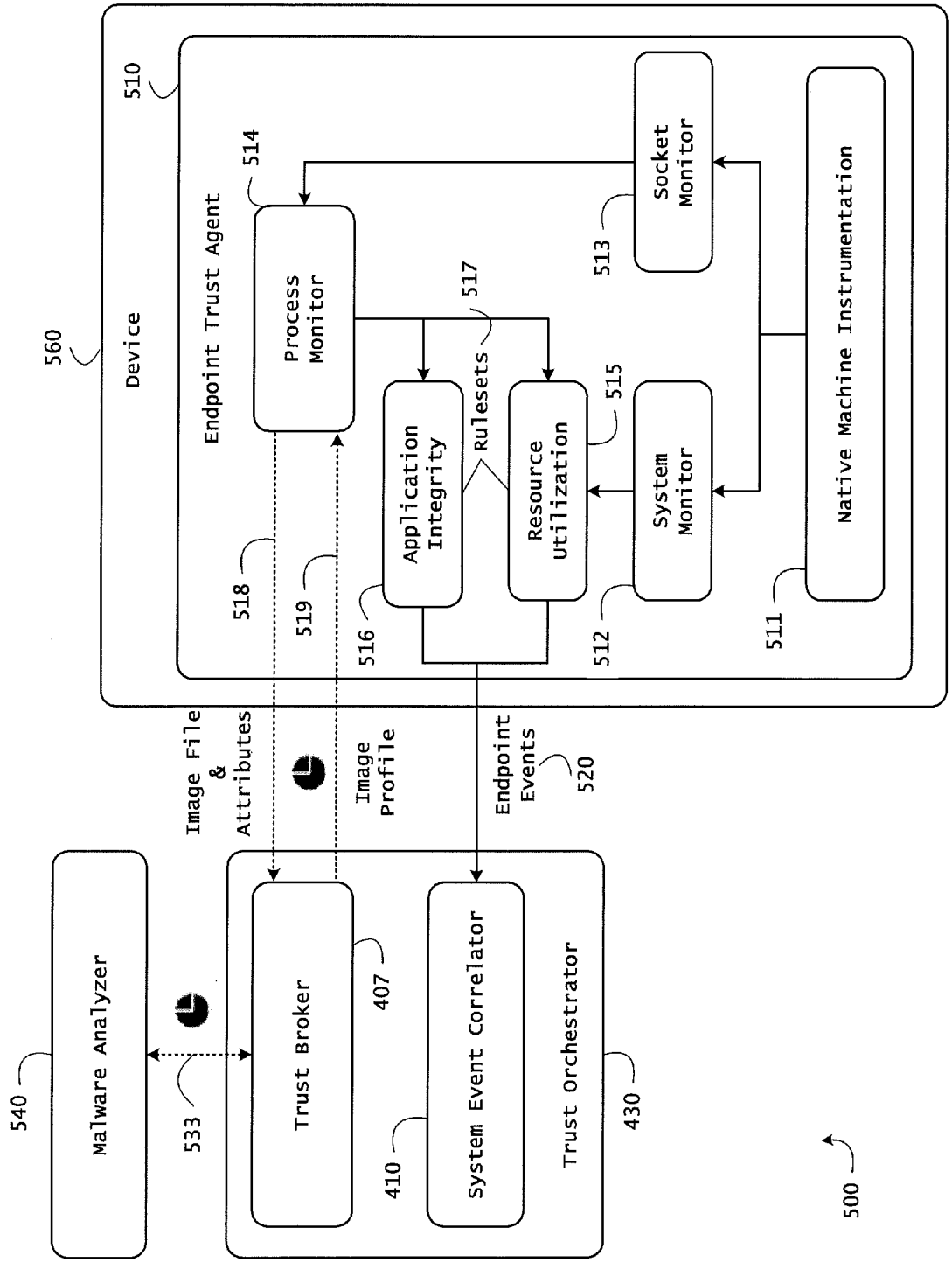
FIG. 5 illustrates communications between components of a system for measuring and evaluating application operational integrity, according to an exemplary embodiment of the present disclosure.
Figure 6:
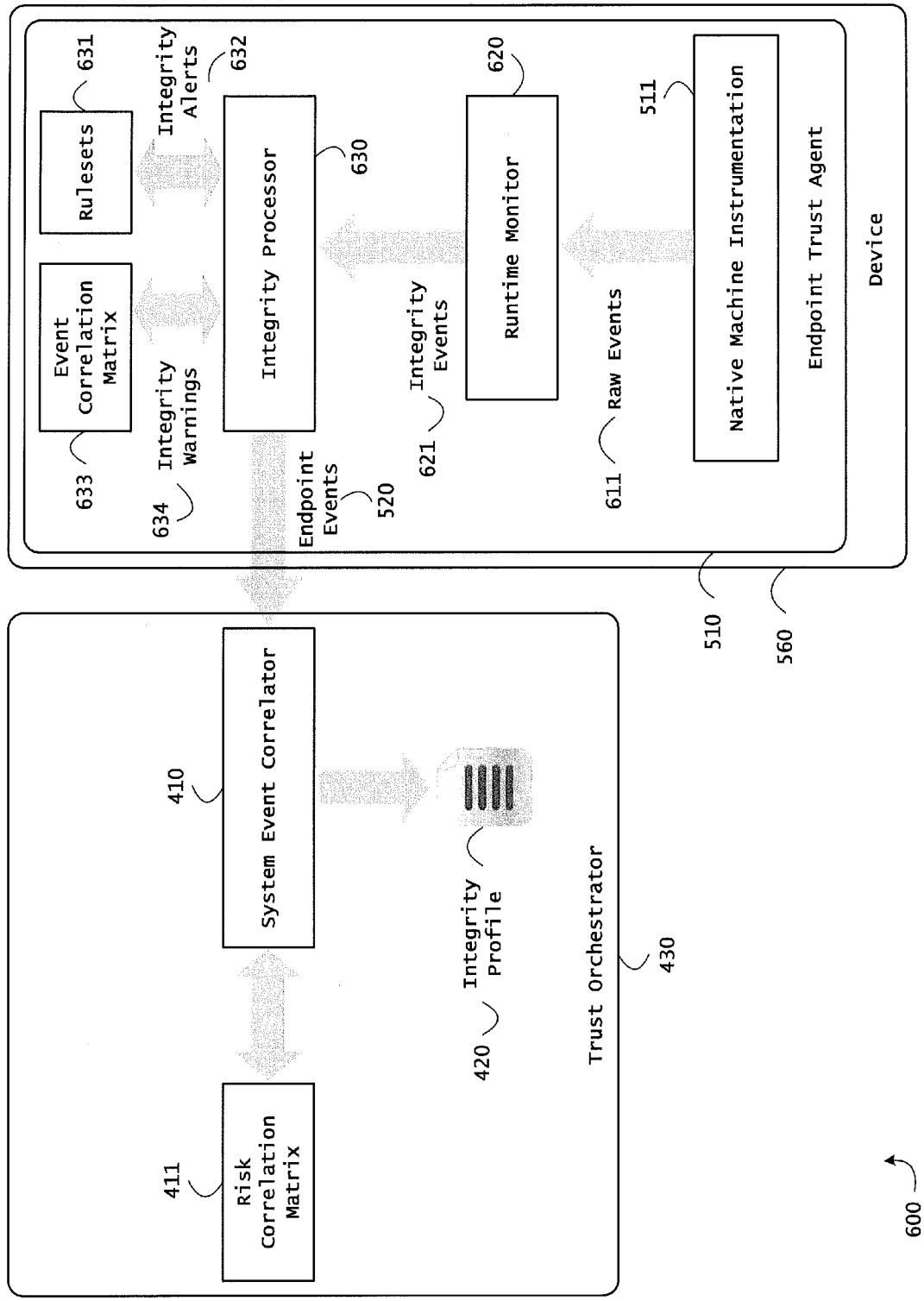
FIG. 6 is a block diagram illustrating data flows for instrumenting and measuring network endpoint risk, according to an exemplary embodiment of the present disclosure.

In the embodiments of FIGS. 4-6, the integrity profile 420 represents an aggregation of system warnings (threats such as malware) identified based on the received temporal 409 and endpoint 520 events. In one embodiment, the format (schema) of the integrity profile 420 is a standard Extensible Markup Language (XML) notation.

Risk Correlation Matrix

In embodiments, the risk correlation matrix 411 depicted in FIGS. 4-6 and the risk correlation matrix 721 described with reference to 7A-7C are embodied as grids that represent an exemplary dynamic model of measurement and identification based on clustering and classification of independent endpoint events (alerts) to generate system warnings that may be mapped to warning categories or classes. Additional details of the risk correlation matrices 411 and 721 are provided below with reference to FIGS. 6, 7B, and 7C.

System for Evaluating Operational Integrity of Applications

FIG. 5 illustrates communications between components of a system 500 for measuring and evaluating application operational integrity. In particular, FIG. 5 depicts communications between components of the application operational integrity system 500 used to evaluate application integrity based upon executable image profiles and process monitoring, and evaluate resource utilization based upon process and system monitoring. In embodiments, image profiles are generated for executable images such as, but not limited to, binary images, intermediate images, or scripts. FIG. 5 is described with continued reference to the embodiment illustrated in FIG. 4. However, FIG. 5 is not limited to that embodiment.

As shown in FIG. 5, the exemplary application operational integrity system 500 includes an endpoint trust agent 510 on a device 560 comprising a process monitor 514 configured to observe local execution context of applications and services. The endpoint trust agent 510 further comprises a socket monitor 513 configured to observe network activities of applications and services and a system monitor 512 configured to observe system and platform resources consumed by applications and services. In the example embodiment provided in FIG. 5, the trust agent 510 also comprises an application integrity module 516 and a resource utilization module 515 configured to assess operational integrity based on rulesets. The trust agent 510 can also comprise native machine instrumentation 511 for a computing device being monitored by the application operational integrity system 500.

Device

In embodiments, the device 560 depicted in FIG. 5 may be a desktop, server, laptop, a mobile computing device such as a smart phone or tablet, or other types of mobile computing platforms that comprise (a) an operating system (OS); (b) a user operating the device to access a service or another device 560 over a network; and (c) application packages, applications or application components that may be downloaded and installed either with or without user intervention for later execution. Non-limiting examples of the device 560 include a personal computer, server, laptop, or tablet device running a MICROSOFT™ WINDOWS® operating system (OS), a personal computer, server, or laptop running an OSX OS from Apple Inc., a personal computer, server, or laptop running a UNIX or Linux OS, a personal digital assistant (PDA), an iPhone™, an iPod™ touch, or iPad™ tablet device running an iOS from Apple Inc., a device operating the Android OS from Google Inc., device running the MICROSOFT™ WINDOWS® Mobile or Phone OS, a device running a Symbian OS, a device running a PALM OS®, a BLACKBERRY® device running a Blackberry OS from Research In Motion ("RIM"), a mobile phone, a portable game device, a gaming console, a hand held computer, a netbook computer, a palmtop computer, an ultra-mobile PC, or another similar type of computing device capable of processing instructions and receiving and transmitting data to and from users and other computing devices.

Native Machine Instrumentation

In embodiments, the native machine instrumentation 511 can represent any event subscription, callback, notification mechanism provided by the supported operating system (OS) on the device 560 (e.g., MICROSOFT™ WINDOWS® Machine Instrumentation (WMI), Transport Filter Drivers, Application Layer Enforcement Callout Drivers, Linux/Unix Network Filter Drivers, etc.). The native machine instrumentation 511 can generate raw events, as described below with reference to the illustrative example in FIG. 7A, that may appear insignificant as an isolated occurrence, but may include notable data points as forensic evidence of behavior anomalies or malicious activity to the event and risk correlation system.

Referring to FIG. 5, the trust broker 407 can be configured to receive one or more state attributes pertaining to applications running on a device 560 and components from the endpoint trust agent 510. The trust broker 407 serves as an arbitrator configured to dispatch a request for image analysis to one or more third party malware analyzers 540. In one embodiment, the dispatch mechanism uses trigger filter expressions that specify the set of criteria that warrant initiation of image analysis (e.g., frequency and volume of requests for analysis associated with the image across deployed endpoint trust agents), and parameters configured for each available connector to a third party malware analyzer 540. According to an embodiment, the parameters include cost, latency, and platform specific analysis capabilities. Such platform specific analysis capabilities can include static and dynamic analysis of applications on mobile platforms such as, but not limited to, devices 560 running an Android operating system (OS) from Google Inc., a PALM OS®, a MICROSOFT™ WINDOWS® Mobile or Phone OS, a Symbian OS, a Blackberry OS from Research In Motion (i.e., a BLACKBERRY® device 560), or an iOS (i.e., iPhone™, an iPod™ touch, or iPad™ devices 560).

The third party malware analyzers 540 perform static and dynamic analysis of the application images based on policies specified by the trust broker. The result of the malware analysis is a set of threats identified based on the analysis. The trust broker caches the results of the analysis indexed by a unique identifier for the image. The trust broker generates and returns an image profile 519 to the endpoint trust agent 510 which comprises assertions of malicious capabilities of the image that must be monitored at runtime for subsequent generation of endpoint events 520 by the endpoint trust agent 510.

Endpoint Events

In the embodiment shown in FIG. 5, the endpoint events 520 are generated by a component of the endpoint trust agent 510, and represent alerts based an endpoint sensor resident on the device 560. The alerts are mapped to a cell in the risk correlation matrix 411 grid by the system event correlator 410. In one embodiment, the format (schema) of the endpoint events 520 is a standard Extensible Markup Language (XML) notation. Additional features of the endpoint events 520 are described below with reference to FIG. 6

With continued reference to FIG. 5, the application operational integrity system 500 can include a trust orchestrator 430 comprising a system event correlator 410 and a trust broker 407. The application operational integrity system 500 can further include a malware analyzer 540. In an embodiment, the trust orchestrator 430 can be implemented as the TaaS Orchestrator from TAASERA, Inc.

According to the exemplary embodiment depicted in FIG. 5, the system event correlator 410 can be configured to receive endpoint events 520 from the endpoint trust agent 510 as sensory inputs to a calculus of risk. The trust broker 407 is configured to receive an image file and image attributes 518 and then send the received image file to the malware analyzer 540 for diagnosis. The trust broker can also receive an asynchronous prognosis 533 and forward an asynchronous image profile 519 to the process monitor 514 to include in ruleset processing for diagnosis at the application integrity module 516.

System Event Correlator

According to embodiments, the system event correlator 410 shown in FIG. 5 can be configured to receive temporal events 409 generated by the trust broker 407 that measure the integrity of the system at last scan, and endpoint events 520 from the endpoint trust agent 510 that measure the runtime execution state of applications. The system event correlator 410 can be further configured to map the events to a cell in the risk correlation matrix 411 grid and processes the triggered system warnings to evaluate threats by category (or vectors). In one embodiment, the categories include at least resource utilization, system configuration, and application integrity. Each category is assigned a metric that is an indicator of the level of runtime operational integrity that may be asserted based on the system warnings and threat classification produced by the risk correlation matrix 411. The system event correlator 410 can also be configured to generate an integrity profile 420 for the device 560 that describes the security risks and threats posed by the measured execution state of running applications on the device 560.

FIG. 6 depicts data flows between components of an exemplary system for correlating endpoint events. In particular, FIG. 6 illustrates data flows between components and modules of a system event correlation system 600. FIG. 6 is described with continued reference to the embodiments illustrated in FIGS. 4 and 5. However, FIG. 6 is not limited to those embodiments.

Referring to FIG. 6, the exemplary correlation system 600 includes an endpoint trust agent 510 on a device 560 that comprises runtime monitor 620 configured to register for and receive a plurality of raw events 611 from native machine instrumentation 511 on the device 560. The runtime monitor 620 is further configured to raise integrity events 621 to an integrity processor 630 that may apply rulesets 631 to generate integrity alerts 632 and generate or populate an event correlation matrix 633 that maps integrity warnings 634 to endpoint events 520 for dispatch to a trust orchestrator 430.

In the embodiments shown in FIGS. 6 and 7A-7C, the endpoint events 520 are generated by the integrity processor 630, which is a component of the endpoint trust agent 510, and represent alerts based an endpoint sensor resident on the device 560. As described above with reference to FIG. 5, the alerts can then be mapped to a cell in the risk correlation matrix 411 grid by the system event correlator 410, which can be configured to read endpoint events 520 expressed in XML notation.

With continued reference to the exemplary embodiment provided in FIG. 6, the trust orchestrator 430 comprises a system event correlator 410 configured to use a risk correlation matrix 411 to generate an integrity profile 420 for the monitored system (i.e., the target system). In one embodiment, the system event correlator 410 can be implemented as a correlation engine. In another embodiment, the trust orchestrator 430 can be implemented as the TaaS Orchestrator from TAASERA, Inc.

For the risk correlation matrix 411 shown in FIG. 6, each cell in the grid is a set of alerts triggered through an event correlation matrix 633 and rulesets 631 (rule expressions) by the endpoint trust agent 510.

In certain exemplary embodiments, the application integrity module 516 and the resource utilization module 515 described above with reference to FIG. 5 may be included as a subcomponent or module of the integrity processor 630 depicted in FIG. 6.

In certain exemplary embodiments, the process monitor 514, system monitor 512 and socket monitor 513 depicted in FIG. 5 and described above may be included as subcomponents or modules of the runtime monitor 620.

Figure 7A:
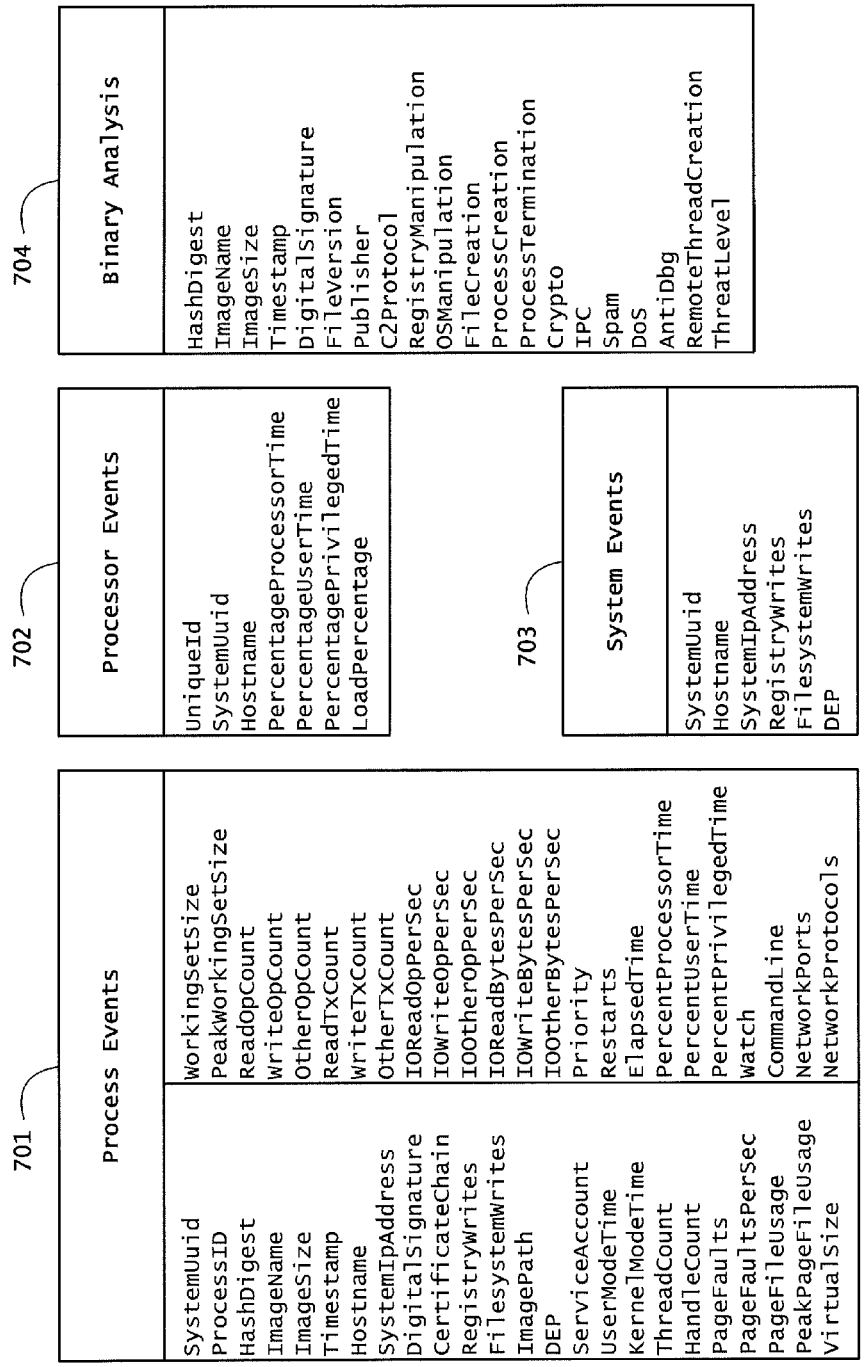
FIG. 7A depicts exemplary endpoint events that can be monitored by the systems and methods disclosed herein.

FIG. 7A is a diagram indicating groupings of exemplary endpoint events 700 that can be monitored and analyzed by the presently disclosed methods and systems to determine a system integrity profile. In particular, the endpoint events 700 shown in FIG. 7A can be used to determine what an attestation system can assert about the integrity of a monitored system (i.e., a target system). FIG. 7A is described with continued reference to the embodiments illustrated in FIGS. 1, 4, 5, and 6. However, FIG. 7A is not limited to those embodiments.

By continuously monitoring for the endpoint events 700 and performing dynamic analysis of detected endpoint events 700, assertions about the integrity of a target system can be made. For example, the endpoint events 700 can be included in the endpoint events 116, 118 received by the event and behavior correlation engine 130 in the network 100 described above with reference to FIG. 1.

In one embodiment, one or more of the endpoint events 700 can be included in the endpoint events 520 used by the attestation system 500, described above with reference to FIG. 5. In other embodiments, the endpoint events 700 can be included in the endpoint events 520 used by the system event correlator 410 of the correlation system 600 depicted in FIG. 6.

Referring to FIG. 7A, the exemplary endpoint events 700 may include per process events 701, per processor events 702, system events 703, and per image binary analysis events 704. According to an embodiment, the events 701-704 can include, but are not limited to, all events available through native machine instrumentation and extensible on the platform with provider plug-ins.

FIG. 7B is a block diagram 710 illustrating exemplary alerts that can be generated by the methods and systems discussed herein.

As shown in FIG. 7B, in embodiments, alerts may include platform alerts 711, per image alerts 712, grayware alerts 713 (i.e., for a watch list), and per application alerts 714. The alerts are configurable and extensible, and not limited to the alerts illustrated in FIG. 7B.

Figure 7C:
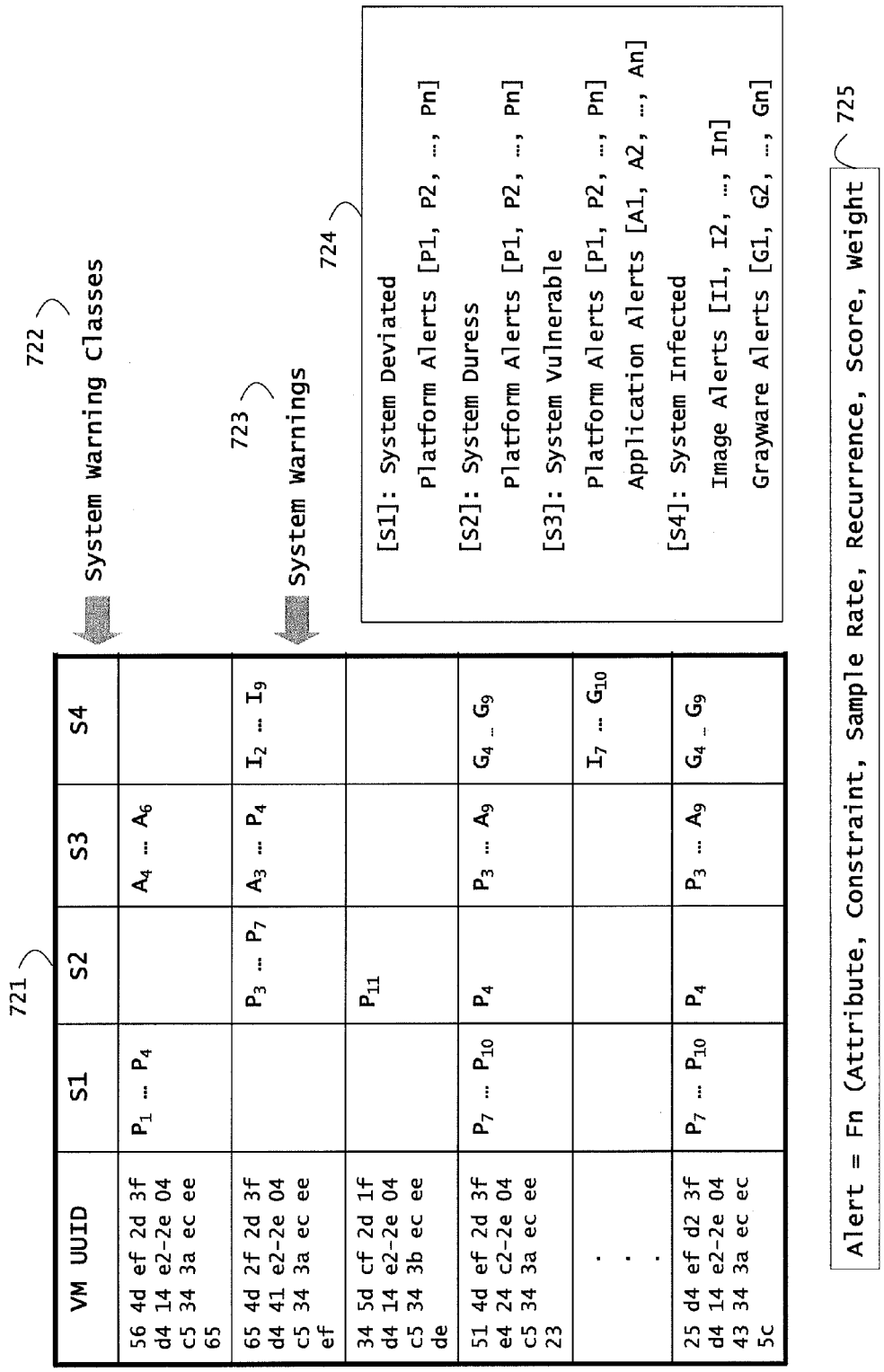
FIG. 7C is a block diagram illustrating a method for correlating endpoint alerts and generating endpoint warnings, according to an exemplary embodiment of the present disclosure.

FIG. 7C is a block diagram illustrating an exemplary method 720 for correlating endpoint alerts and generating endpoint warnings using a correlation matrix. FIG. 7C is described with continued reference to the embodiments illustrated in FIGS. 4-6. However, FIG. 7C is not limited to those embodiments.

Referring to FIG. 7C, the method 720 populates a risk correlation matrix 721 based upon one or more of system warning classes 722, system warnings 723, and integrity warnings 724. As shown in FIG. 7C, an alert expression can be expressed as a function 725 of at least an attribute, an attribute value constraint, a sample rate, a recurrence, a score and a weight. The function may be specified in any programming language or construct, as compiled, intermediate or interpreted code.

The risk correlation matrix 721 can comprise a universally unique identifier (UUID) for the system, system warnings 723 mapped to at least one system warning class 722, and at least a system warning class 722 to diagnose system deviations (i.e., system deviated integrity warnings 724), system duress, system vulnerable and system infections (i.e., system infected integrity warnings 724).

In the embodiment of FIG. 7C, each alert for the risk correlation matrix 721 is generated by a program function 725 that evaluates expressions that are specific for each attribute of the device 560. Based on the occurrence of a qualifying set of alerts in each cell, the corresponding system warning is triggered. In FIG. 7C, the exemplary risk correlation matrix 721 illustrates that for each device 560 (or application) uniquely identified by a machine identifier (e.g., a virtual machine universally unique identifier (UUID), IP address) or application instance identifier (application UUID), a different set of alerts may trigger different system warnings that map to a common system warning class. By mapping alerts to a behavior model (or cluster), unknown (such as emerging or polymorphic) threats may be classified and identified without requiring image or wire level signatures. The alerts may be grouped as illustrated in FIG. 7B to represent a category of alerts (e.g., platform, application, grayware—that includes applications that are placed on a watch list based on reports generated by third party malware analyzers, image—that are weighted by threat level based on inspections performed by the endpoint trust agent 510 or malware analyzers 540). In an embodiment, the program function 725 can be configured to use conditional expressions (operators) to generate an alert based on value constraints, sample rate for the measurement, recurrence of measured values, an assigned score and weight for the attribute. According to embodiments, the score and weight can be predefined or customizable through a graphical user interface GUI or dashboard, such as the GUIs described below with reference to FIGS. 14-18.

In accordance with embodiments, a plurality of timers may be associated in the evaluation of system warnings and system warning classes, the calculus of risk, and generation of an integrity profile for the system.

According to embodiments, the integrity profile 420 comprises at least the endpoint address and one or more of system warning class, forensic confidence of the declared warning, and the full evidence chain.

Integrity Processor

With reference to FIGS. 6 and 7A-7C, the integrity processor 630 is a functional component of the endpoint trust agent 510. The integrity processor 630 can be configured to receive integrity events 621 from the runtime monitor 620 that describes process, processor, system and binary analysis events illustrated in FIG. 7A. Applying qualifying rule expressions (illustrated in FIG. 7B) in the rulesets 631, integrity alerts 632 are generated and mapped to a cell in an event correlation matrix grid 633 (analogous to the risk correlation matrix 411 of FIG. 4 and grid 721 of FIG. 7C) to generate system level integrity warnings 634. The rows in the event correlation matrix 633 represent an application instance on the device 560 (analogous to rows in the risk correlation matrix 411 that represent a device by machine identifier). The integrity warnings 634 can be formatted as endpoint events 520 for dispatch to the system event correlator 410 of the trust orchestrator 430 for threat classification and identification and subsequent remediation.

In accordance with embodiments, a plurality of alerts 711-714 in a variety of user configurable combinations (for example, as editable settings in an XML or text format configuration file, or through a graphical administrative dashboard or user interface) constitute a system warning, and a system warning maps to a system warning class.

In accordance with embodiments, a plurality of system warning classes can be included in the integrity profiles 420 of the attestation system 400 and correlation system 600 depicted in FIGS. 4 and 6 respectively.

Example Trust Orchestration Architecture

Figure 8:
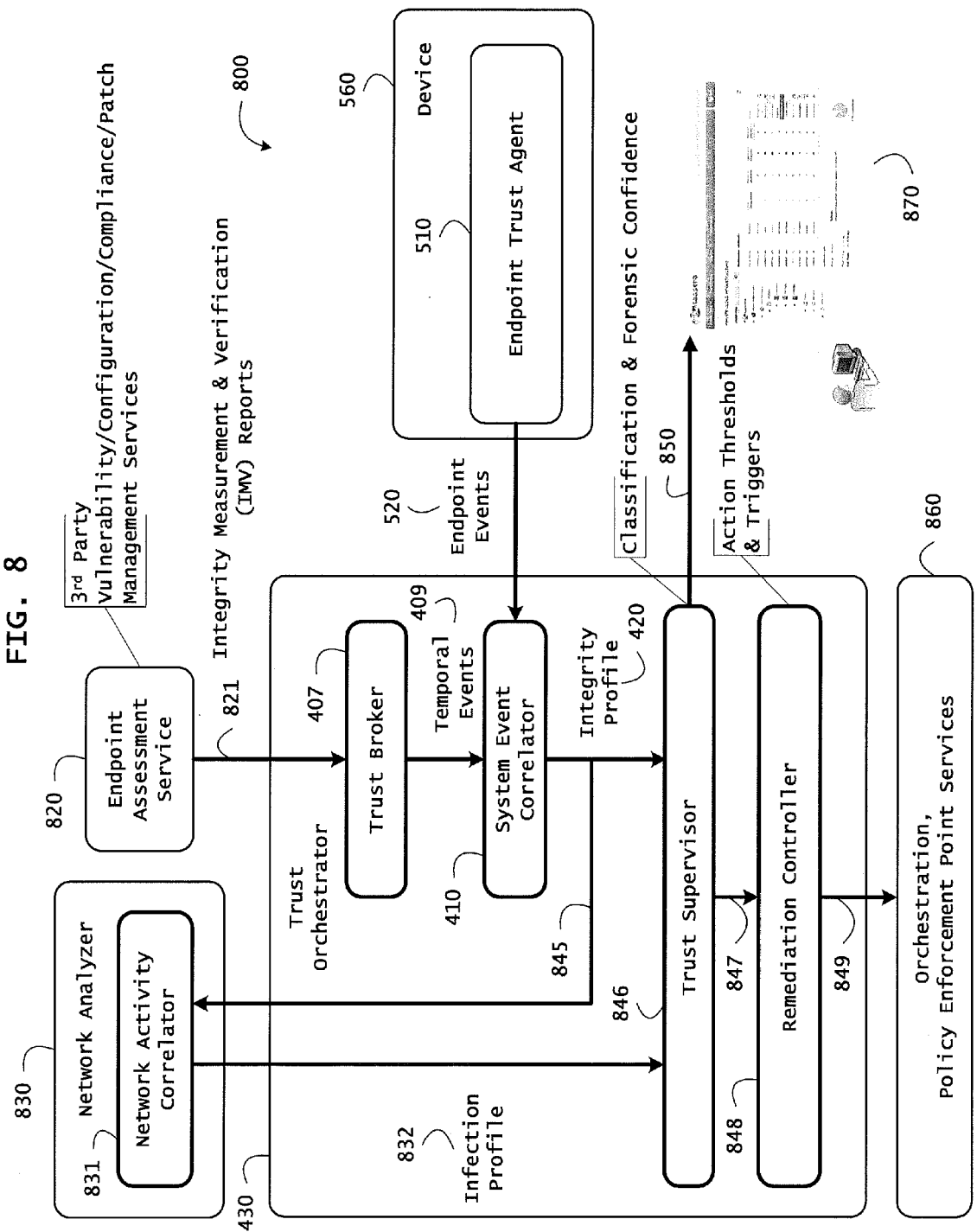
FIG. 8 is a block diagram of a trust orchestration architecture for correlating a plurality of events for determining operational integrity of a system, according to an exemplary embodiment of the present disclosure.

FIG. 8 is a block diagram of an exemplary architecture 800 for trust orchestration including a trust orchestrator 430, a network analyzer 830, and a device 560. The architecture 800 can be used to correlate a plurality of events for determining runtime operational integrity of a system. FIG. 8 is described with continued reference to the embodiments illustrated in FIGS. 4, 5, and 7C and with reference to FIGS. 12 and 13. However, FIG. 8 is not limited to those embodiments.

As shown in FIG. 8, the trust orchestration architecture 800 may include an endpoint trust agent 510 on a device 560, a network analyzer 830 that may include a network activity correlator 831, an endpoint assessment service 820, a service provider for orchestration and/or policy enforcement point services 860, and a trust orchestrator 430 that may include a trust broker 407, a system event correlator 410, a trust supervisor 846, and a remediation controller 848.

Trust Orchestrator

According to the embodiments of FIGS. 4 and 8, the trust orchestrator 430 is an aggregation that includes functional components such as the trust broker 407, system event correlator 410, the trust supervisor 846, and remediation controller 848. In embodiments, the trust orchestrator 430 is configured to receive sensory threat intelligence from network analyzers 830, endpoint assessment services 820 and endpoint trust agents 510 on devices 560. Through a sequence of normalization, collation and risk correlation of events, directives 849 in the form of directives are dispatched to orchestration services to initiate remediation actions to deal with identified threats on devices 560. The directives are specific to the orchestration service and can include the use of vendor APIs. Examples of such vendor APIs include VMWARE™ vCloud APIs, BMC Atrium™ APIs for accessing a BMC Atrium™ configuration management database (CMDB) from BMC Software, Inc., Hewlett Packard Software Operations Orchestration (HP-OO) APIs, and standard protocols such as Open Flow.

In certain exemplary embodiments, the system event correlator 410 receives endpoint events 520 from the endpoint trust agent 510, temporal events 409 from the trust broker 407, correlates and sends an integrity profile for a network endpoint to the trust supervisor 846 and the network activity correlator 831.

In certain exemplary embodiments, the trust supervisor 848 receives an infection profile 832 for a network endpoint from the network activity correlator 831, an integrity profile 420 for a network endpoint from the system event correlator 410, analyzes and classifies threats along with a forensic confidence score, sends real time actions 847 to the remediation controller 848, and real time status indications 850 to a dashboard controller 870. The remediation controller 848 sends directives 849 to orchestration and/or policy enforcement point services 860 for machine, flow or transaction level remediation.

Remediation Controller

In embodiments, the remediation controller 848 can be configured to receive action requests 847 from the trust supervisor 846. The remediation controller 848 can also be configured to process the received requests and perform appropriate operations on orchestration services. According to embodiments, upon processing a received action request the remediation controller 848 may perform (a) a flow level operation on a network element 1216 (e.g., a physical or virtual switch or a firewall) or wireless access point 1320; (b) a machine level operation on a device 560 (e.g., a web or database server); (c) a transaction level operation to restrict access to a service or device 560; and/or (d) an update notification to a network trust agent (see, e.g., network trust agents 1209 and 1315 depicted in FIGS. 12 and 13, respectively) to indicate a revised reputation score for a device 560.

In embodiments, the infection profile 832 comprises at least the victim endpoint address and one or more of a forensic confidence of the declared infection, the attacker source, the command and control source, the full evidence chain, and the infection time range (onset, duration).

According to embodiments, the integrity profile 420 comprises at least the endpoint address and one or more of system warning class, forensic confidence of the declared warning, and the full evidence chain.

In accordance with embodiments, the risk correlation matrices 411 and 721 of FIGS. 4 and 7C, respectively, may be included in the trust supervisor 846 to consolidate and correlate integrity profile 420 and infection profile 832 of FIG. 8.

Example Threat Detection and Mitigation Scenario

An exemplary flow of a threat detection and mitigation sequence is described below with reference to FIGS. 3A, 4-6, 7B, 8, 10, 12, 13, and 23. In the example scenario below, the exemplary threat is a user device infected with malware. The paragraphs below detail how exemplary embodiments described herein with reference to FIGS. 4-6, 7B, 8, 10, 12 and 13 can handle such 'real world' threat vectors. The multi-dimensional event and risk correlation model described in the following paragraphs illustrates an exemplary method of detecting low and slow signature-less threats that are characteristic of emerging malware and advanced persistent threats.

A user's (1014) device D (560) may become infected with a form of an advanced persistent threat (e.g., malware $M_{(benign)}$) while the device D is still connected to an enterprise network of an organization 2303. The connection of the device D to the enterprise network can occur through user activity, for example, when the user 1014 connects a plug-and-play portable universal serial bus (USB) device with the malware $M_{(benign)}$ to the device D while it is connected to the enterprise network, as the result of the user 1014 opening an email attachment infected with the malware $M_{(benign)}$, when the user 1014 accesses a social network application from the device D, or when the user 1014 unwittingly transfers a file with the malware $M_{(benign)}$ to device D while accessing a file sharing service.

The device D can also become infected with malware $M_{(benign)}$ while the device D is disconnected from the enterprise network of the organization 2303. For example, the device D can become infected as a result of user activity on a home network, or external wireless or wired network not managed by an enterprise IT administrator of the organization 2303, such as a mobile network or the Internet.

Once the device D is infected, an egg download (i.e., download of an .egg compressed archive file) that evaded traditional network edge protections (e.g., legacy security technologies 305 such as firewalls and network IPS/IDS systems) has occurred. At this stage of infection, legacy security technologies 305 such as traditional antivirus programs installed on the device D are unlikely to detect the targeted malware $M_{(benign)}$ because no signature or blacklist already exists for this threat. The malware $M_{(benign)}$ may then perform discrete (and apparently benign) surveillance operations on the device D, such as periodic process restarts, executable file property modifications (i.e., changes to file name and/or size attributes) to introduce entropy and evade detection. The malware $M_{(benign)}$ may also make registry modifications, perform keyboard/input device monitoring, screen level monitoring, memory dumps, disk navigation to inspect files without excessive resource (CPU) utilization on the device D.

At this post-infection stage, the endpoint trust agent 510 monitors the executing malware process $P_{(benign)}$, performs file and component (e.g., dynamic link library (DLL)) level integrity checks including checking a file hash digest, digital signature, and certificate chain verification by leveraging collaboration services, such as the collaboration services 1207 and 1312, described below with reference to FIGS. 12 and 13, respectively, to access intelligent whitelisting services. These collaboration services are accessed through the trust orchestrator 430. Failure of one or more of these checks immediately places process $P_{(benign)}$ on a grayware alert 713 (i.e., a watch list).

Assuming no checks fail at this stage, the process $P_{(benign)}$ is continuously monitored by the integrity processor 630 for explicit rule violations. In an embodiment, violations of a rule in a ruleset 631 are continuously monitored for and detected. These rules detect anomalous behaviors in benign processes.

Once a rule trigger criteria is reached, the endpoint trust agent 410 initiates an image integrity check and leverages a remote malware analyzer 540 through the trust orchestrator 430. The purpose of this check is to avoid complete reliance on supply chain provenance and locally available evidence. The image profile 519 generated from malware binary analysis provides the integrity processor additional local events to monitor for process $P_{(suspect)}$.

At this point, the malware analyzer 540 reports capabilities detected (present in reverse engineered code) through static and dynamic analysis of the image. Such image analysis can look for code obfuscation techniques in the reverse engineered code such as anti-debug, anti-trace, anti-memory, and anti-emulation, use of network communication protocols like SMTP, FTP or HTTP, use of embedded uniform resource locators (URLs) or IP addresses, use of encryption methods such as use of the secure sockets layer (SSL) protocol, listening on local ports, remote ports accessed, file system operations, registry operations, operations in temporary, system or non-program folders, memory peek or poke operations, and remote thread creation.

The integrity processor 630 then monitors process $P_{(suspect)}$ for related warnings 721 and triggers endpoint events such as alerts 711-714 to the system event correlator 410. Multiple endpoint assessment services 820 may be deployed in the enterprise network to perform scheduled policy based scans to detect known exposures (vulnerability, configuration, compliance and patch level exploits). The respective integrity reports 821 may contain indications of exposures on the device D. However, these reports do not affirm positive presence of a threat or an infection on the device D and may be unaware of the existence and runtime activities of process $P_{(suspect)}$. The trust broker 407 generates temporal events 409 that inform the system event correlator 410 of the damage potential (severity) on the device D should any malicious program be active on the device (e.g., a personally identifiable information (PII) violation on a database server, a buffer overflow attack on an application server, a structured query language (SQL) injection attack on a database server, a keystroke or screen element capture, a microphone or camera hijack, etc.) based on authoritative state (snapshot) information and scan policies applied in the assessment of device D.

Based on risk analysis triggered by endpoint and temporal events, an integrity profile is generated by the system event correlator 410 for the device D. The network activity correlator 831 concurrently monitors all network traffic and activities of device D and dispatches infection profiles 832 based on forensic evidence of malicious network dialogs indicative of an infected victim (device D). The evidence may be indicative of malicious activities such as peer-to-peer propagation, command and control communications, or data exfiltration to an attacker. The trust supervisor 846 classifies the forensic evidence based on the integrity and infection profiles generated independently by the endpoint, network, and scan based assessment sensors to determine the threat risk level of the device D with high forensic confidence to warrant an immediate manual or automated remediation action to mitigate the detected infection.

System for Integrity Profile Generation

Figure 9:
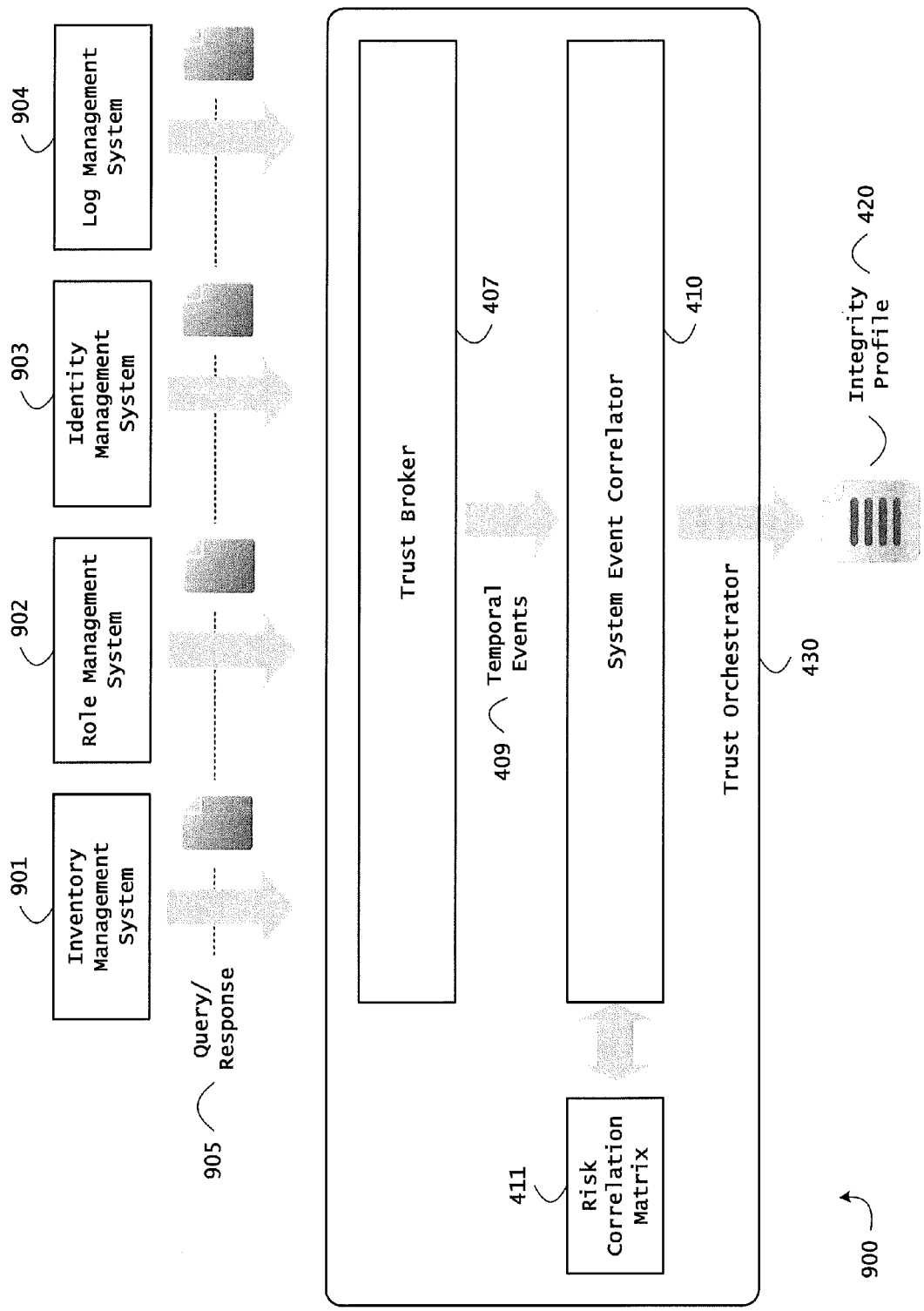
FIG. 9 is a block diagram of a system for consolidating and correlating a plurality of identity, inventory and log management systems for determining a reputation of a user, according to an exemplary embodiment of the present disclosure.

FIG. 9 is block diagram illustrating an exemplary system for generating a subject integrity profile. The system 900 shown in FIG. 9 can be used to consolidate and correlate a plurality of identity, inventory and log management systems in order to determine a reputation of a subject (e.g., a user, device, transaction, service, or organization/company). FIG.

9 is described with continued reference to the embodiments illustrated in FIGS. 4 and 5. However, FIG. 9 is not limited to those embodiments.

Referring to FIG. 9, the exemplary subject integrity profile system 900 includes a trust orchestrator 430, a trust broker 407 that can be configured to query and receive an associated response 905 from a plurality of management systems.

With continued reference to FIG. 9, the integrity profile system 900 can include a plurality of subsystems, including an inventory management system 901 configured to provide resource object attributes, a role management system 902 configured to provide subject (or user) attributes (e.g., roles and entitlements), an identity management system 903 configured to provide aggregated subject attributes, a log management system 904 configured to provide information and events categorized by subject, a system event correlator 410 that receives temporal events 409 categorized by subject, and a risk correlation matrix to generate an integrity profile 420 for a subject that comprises a unique subject identifier and a reputation score.

Within the context of the subject integrity profile system 900, the trust broker 407 is configured to query and receive responses from third party management systems regarding inventory, role, identity and logs.

Inventory Management System

The inventory management system 901 shown in FIG. 9 is configured to provide information pertinent to devices 560 (e.g., mobile devices 560, mobile applications, enterprise desktops, servers, etc.). Examples of inventory management systems 901 include commercial products available from the IBM and Oracle Corporations used for managing an inventory of Enterprise IT managed assets.

Role Management System

According to embodiments, the role management systems 902 shown in FIG. 9 can be configured to provide information pertinent to a user's organizational roles, resource level privileges, application level entitlements, and extended group memberships (i.e., project level privileges and roles). Examples of role management systems include commercial products available from Oracle, Computer Associates, IBM, and SAP for role based access controls to database objects, files, servers, directories/folders, web servers, applications, network domains/subdomains, printers, and other resources. In some of these systems, users are assigned one or more roles that aggregate a set of privileges and permissions. For example, roles in an Oracle or IBM relational database environment represent different tiers or levels of access to database objects. For example, a user account with a 'database administrator' (DBA) role may have privileges and permissions needed to delete (i.e., drop), create, and alter database objects such as tables, views, synonyms, stored procedures, triggers, user accounts, entire databases, and other roles. In contrast user accounts with lesser roles, such as a developer or user role may only be able to insert and update data in database tables and views and revise existing stored procedure and trigger code. Yet other roles may be restricted to 'read only' access to select records from database tables and views as needed to generate reports and run queries.

Identity Management System

In accordance with embodiments, the identity management systems 903 shown in FIG. 9 can be configured to provide information pertinent to a user's organizational domain accounts and group level memberships (e.g., MICROSOFT™ Active Directory, Oracle Internet Identity).

Log Management System

In embodiments, the log management systems 904 shown in FIG. 9 can be configured provide information pertinent to a user's activities at the endpoint device and at the network level of operations based on logs generated by endpoint and network elements and reported through standard system information and event management protocols (e.g., SYSLOG) and formats such as the WebTrends Enhanced Log file Format (WELF) or the Common Event Format (CEF) used for network security applications.

Systems for Determining Calculus of Risk and Subject Reputation Scores

Figure 10:
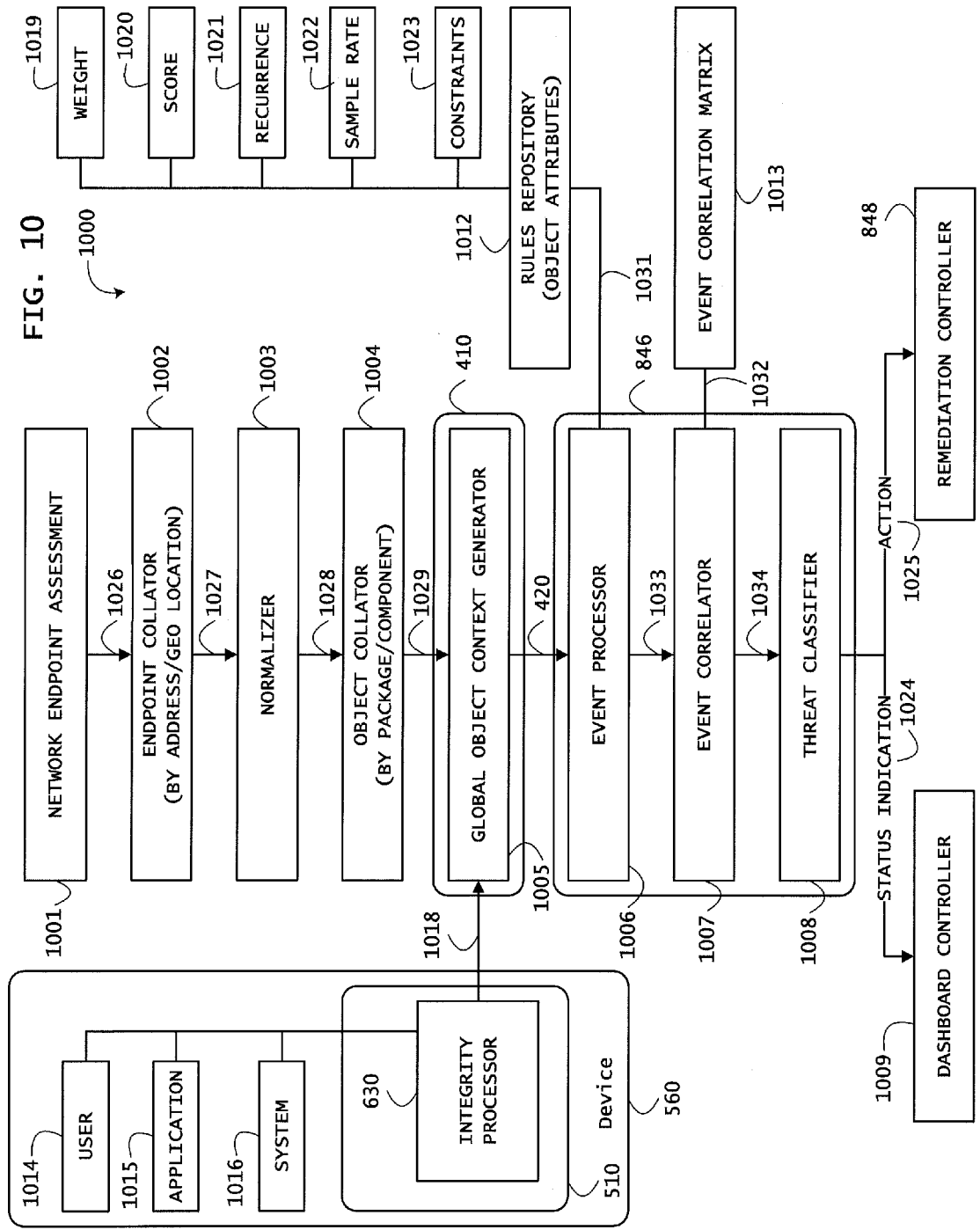
FIG. 10 is a block diagram of a system for determining a calculus of risk, according to an exemplary embodiment of the present disclosure.

FIG. 10 is a block diagram illustrating an exemplary system for determining a calculus of risk. FIG. 10 is described with continued reference to the embodiments illustrated in FIGS. 4, 5 and 8. However, FIG. 10 is not limited to those embodiments.

Referring to FIG. 10, the exemplary calculus of risk system 1000 includes a network endpoint assessment 1001 configured to generate a network security scan report 1025, an endpoint collator 1002 to parse a plurality of received reports for categorization by address or geo-location, a normalizer 1003 for report consolidation, an object collator 1004 for categorization by package and component, an integrity processor 630 on a device 560, for runtime system 1016, application 1015 and user 1014 context, an endpoint trust agent 510, a global object context generator 1005 for aggregation of context, an event processor 1006 for evaluation of context, a rules repository 1012 of object attributes configured to include at least constraints 1023, a sample rate 1022, a recurrence 1021, a score 1020 and a weight 1019 for integrity assessments, an event correlator 1007, an event correlation matrix 1013, a threat classifier 1008, a dashboard controller 1009, and a remediation controller 848.

Trust Supervisor

According to the exemplary embodiments of FIG. 8 and FIG. 10, the trust supervisor 846 can be configured to receive infection profiles 832 from the network analyzers 830 and integrity profiles 420 from the system event correlator 410. The trust supervisor 846 uses an event processor 1006, an event correlator 1007, a threat classifier 1008, an event correlation matrix 1013 and a rules repository 1012 to correlate events associated to a device 560 for the classification and identification of threats based on the forensic confidence of leading indicators.

In an embodiment, the network endpoint assessment 1001 comprises performing a security scan of network endpoints for vulnerability, configuration, compliance, and patch management and use the results of these scans to generate a security assessment report 1026. As shown in FIG. 10, an endpoint collator 1002 is configured to receive the generated security assessment report 1026. In embodiments depicted in FIG. 10, at this point, the endpoint collator 1002 can then sort the security assessment report 1026 by endpoint address and/or geo-location to produce categorized reports 1027.

A normalizer 1003 is configured to receive the categorized reports 1027 and then normalize the elements therein to produce normalized reports 1028.

An object collator 1004 is configured to receive the normalized reports 1028 and then sort the elements therein by object package and component to produce temporal events 1029 for the global object context generator 1005.

In certain exemplary embodiments, the global object context generator 1005 receives endpoint events 1018 that may include the local runtime object execution context from the integrity processor 630 on a device 1017, and temporal events 1029 that may include endpoint security context from the object collator 1004.

In exemplary embodiments, the event processor 1006 receives endpoint integrity profiles 420 from the global object context generator 1005, retrieves associated endpoint rules 1031 from the rules repository 1012, generates and sends endpoint alerts 1033 to the event correlator 1007.

According to exemplary embodiments, the event correlator 1007 receives endpoint events 1033 from the event correlator 1007, maps the alerts 1032 using the event correlation matrix 1013, generates and sends endpoint warnings 1034 to the threat classifier 1008.

In accordance with exemplary embodiments, the threat classifier 1008 may categorize threats, send status indications 1024 to the dashboard controller 1009 for real time visibility of endpoint integrity, and send action requests 1025 to the remediation controller 848.

In certain exemplary embodiments, the endpoint collator 1002, normalizer 1003 and object collator 1004 may be included in the trust broker 407 as described above with reference to FIG. 4.

In certain exemplary embodiments, the global object context generator 1005 may be included in the system event correlator 410 described in FIG. 4.

In certain exemplary embodiments, the event processor 1006, event correlator 1007 and threat classifier 1008 may be included in the trust supervisor 846 as described in FIG. 8.

Figure 11:
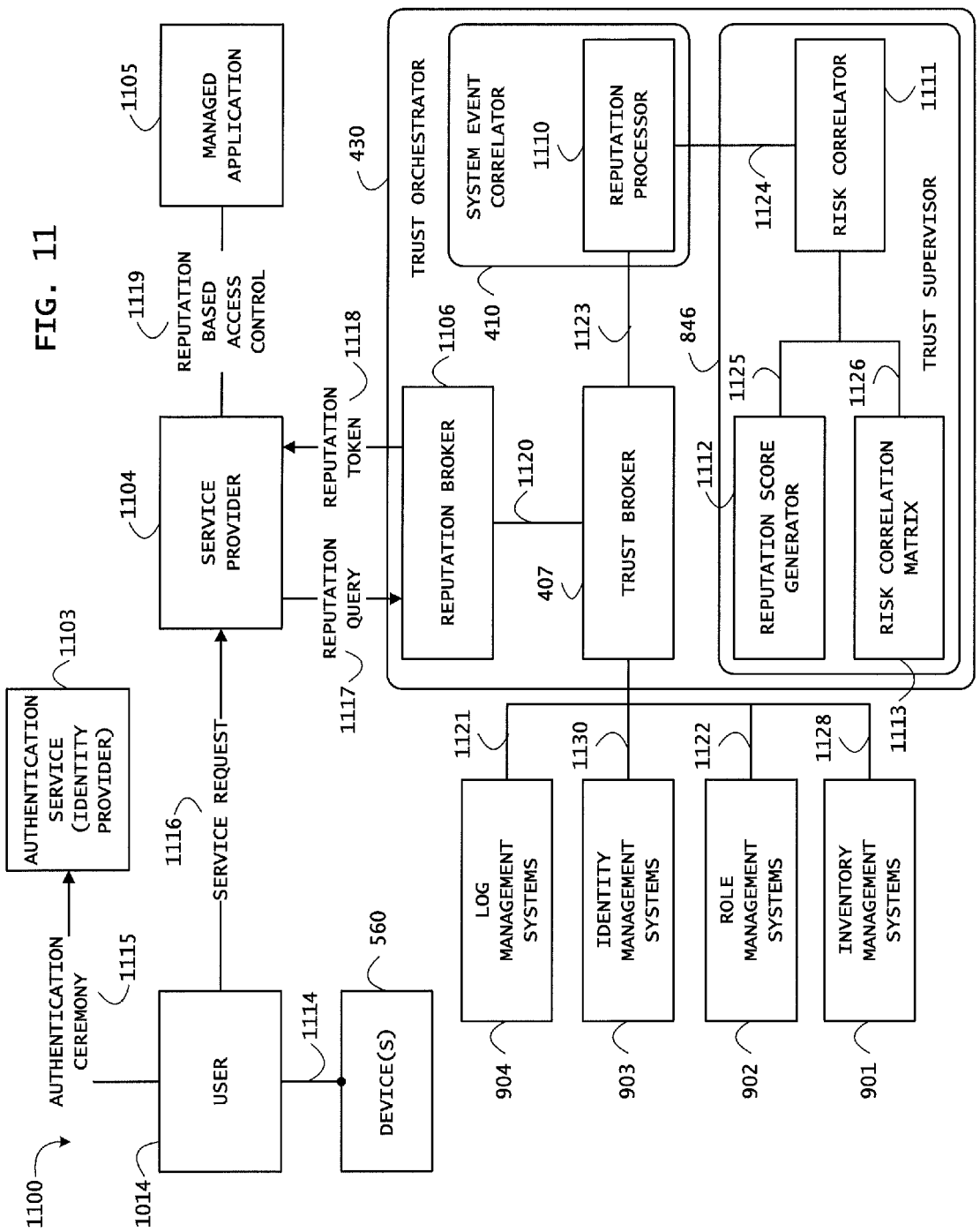
FIG. 11 is block diagram of a of a system for generating subject reputation scores based on a calculus of risk, according to an exemplary embodiment of the present disclosure.

FIG. 11 is a block diagram illustrating an exemplary system for determining a subject reputation. FIG. 11 is described with continued reference to the embodiments illustrated in FIGS. 4, 5, 7C, and 8-10. However, FIG. 11 is not limited to those embodiments. For example, the system 1100 can be used to generate subject reputation scores based on a calculus of risk, such as the calculus of risk determined by system 1000 described above with reference to FIG. 10.

Referring to FIG. 11, the exemplary subject reputation system 1100 includes a user 1014 authenticated on a device 560 through an authentication process/ceremony 1115 with an authentication service 1103, a service provider 1104 configured to receive a service request, a managed application 1105 that may be the target service, a reputation broker 1106, a trust broker 407, a log management system 904, a role management system 902 and an identity management system 903.

Unless specifically stated differently, a user is interchangeably used herein to identify a human user, a software agent, or a group of users and/or software agents. Besides a human user who needs use devices 560 and the attestation systems described herein, a software application or agent sometimes needs to run applications, access services or social networks, conduct online transactions, review, update, or analyze security data, and process events, alerts and warnings. Accordingly, unless specifically stated, the term "user" as used herein does not necessarily pertain to a human being.

With continued reference to FIG. 11, the exemplary subject reputation system 1100 also includes an inventory management system 901, a reputation processor 1110, a risk correlator 1111, a risk correlation matrix 1113, and a reputation score generator 1112.

In an embodiment, the reputation processor 1110 is a component of the system event correlator 410 configured to receive subject events 1123 from the trust broker 407 and includes user alerts 1124 that are analogous to integrity profiles 420 of a user 1101.

As shown in FIG. 11, the risk correlator 1111 can be configured to receive subject alerts 1124 such as alerts for a user 1014 or a device 560, and map the subject alerts 1124 to a cell in the risk correlation matrix 1113 grid analogous to the risk correlation matrix 721 in FIG. 7C. The subject warnings 1126 (i.e., user 1014 or device 560 warnings) triggered can then be processed by the reputation score generator 1112 to determine the user's 1014 reputation score 1125.

Subject Events

In embodiments, the subject events 1123 shown in FIG. 11 can be assertions about provisioned attributes, endpoint and network level activities associated with a subject, received as a response to a directed query from the respective management systems. The subject can be a user 1014, a device 560, a transaction, or an organization such as a company.

In certain exemplary embodiments, a device 560 sends a service request 1116 on behalf of a user 1014 to a service provider 1104 to access a managed application 1105. The service provider 1104 sends a reputation query 1117 to the reputation broker 1106, receives a reputation token 1118 that may include at least a reputation score for the user 1014 or device 560, and enforces a reputation-based access control 1119 to permit or deny the service request 1116 to access the managed application 1105.

Within the context of the subject reputation system 1100, the trust broker 407 is configured to process received subject attributes (e.g., entitlements, memberships of users 1014, roles for users 1014, activity information), to generate and dispatch subject events to the reputation processor 1110. The subject events represent assertions about the subject that may determine a level of security risk in a transaction (e.g., static and dynamic separation of duties, principle of least privilege, observed resource usage patterns, observed activities on the internal and external networks, etc.). In one embodiment, the queries 1121, 1130, 1122, 1128 issued by the trust broker 407 are preconfigured, but can be customized by the administrator from a graphical user interface (GUI) or dashboard, such as the exemplary GUI described below with reference to FIGS. 14-18. In embodiments, the management systems may include information systems hosted by social networking vendors such as FACEBOOK® operated by Facebook, Inc., Twitter operated by Twitter, Inc., and LinkedIn.

According to exemplary embodiments, the trust broker 407 receives a query 1120 for a reputation score for a subject (i.e., a user, device, transaction, service, or organization), sends a subject activity query 1121 to log management systems 904, sends a subject attribute query to role management systems 902 and identity management systems 903, sends a device attribute query to inventory management systems 1128, generates and sends subject events 1123 to the reputation processor 1110.

In the context of the subject reputation system 1100, the inventory management system 901 shown in FIG. 9 can be configured to provide information pertinent to subjects that are devices 560, including mobile devices 560, mobile applications, enterprise desktops, servers, etc.

With continued reference to FIG. 11, in an embodiment, associated device attributes include at least a device 560 geo-location, a device provisioned state, enabled/disabled device 560 functions, and an owner registration (i.e., a user 1014 registration or an organization registration).

In accordance with embodiments, the risk correlator 1111 is configured to receive subject alerts 1124, use the risk correlation matrix 1113 to map the subject alerts 1124 to subject warnings 1126, and invoke the reputation score generator 1112 to establish a subject reputation score 1125, which can be included in the reputation token 1118 by the reputation broker 1106.

In the exemplary embodiment of FIG. 11, the subject alerts 1124 can be user 1014 alerts (i.e., user 1014 integrity profiles), device 560 alerts, or application alerts for an application executing on the device 560. In certain exemplary embodiments, the reputation processor 1110 may be included in the system event correlator 410 described in FIG. 4.

According to exemplary embodiments, the risk correlator 1111, the risk correlation matrix 1113 and the reputation score generator 1112, may be included in the trust supervisor 846 described in FIG. 8.

Systems for Providing Network Flow Remediation and Mobile Security

Figure 12:
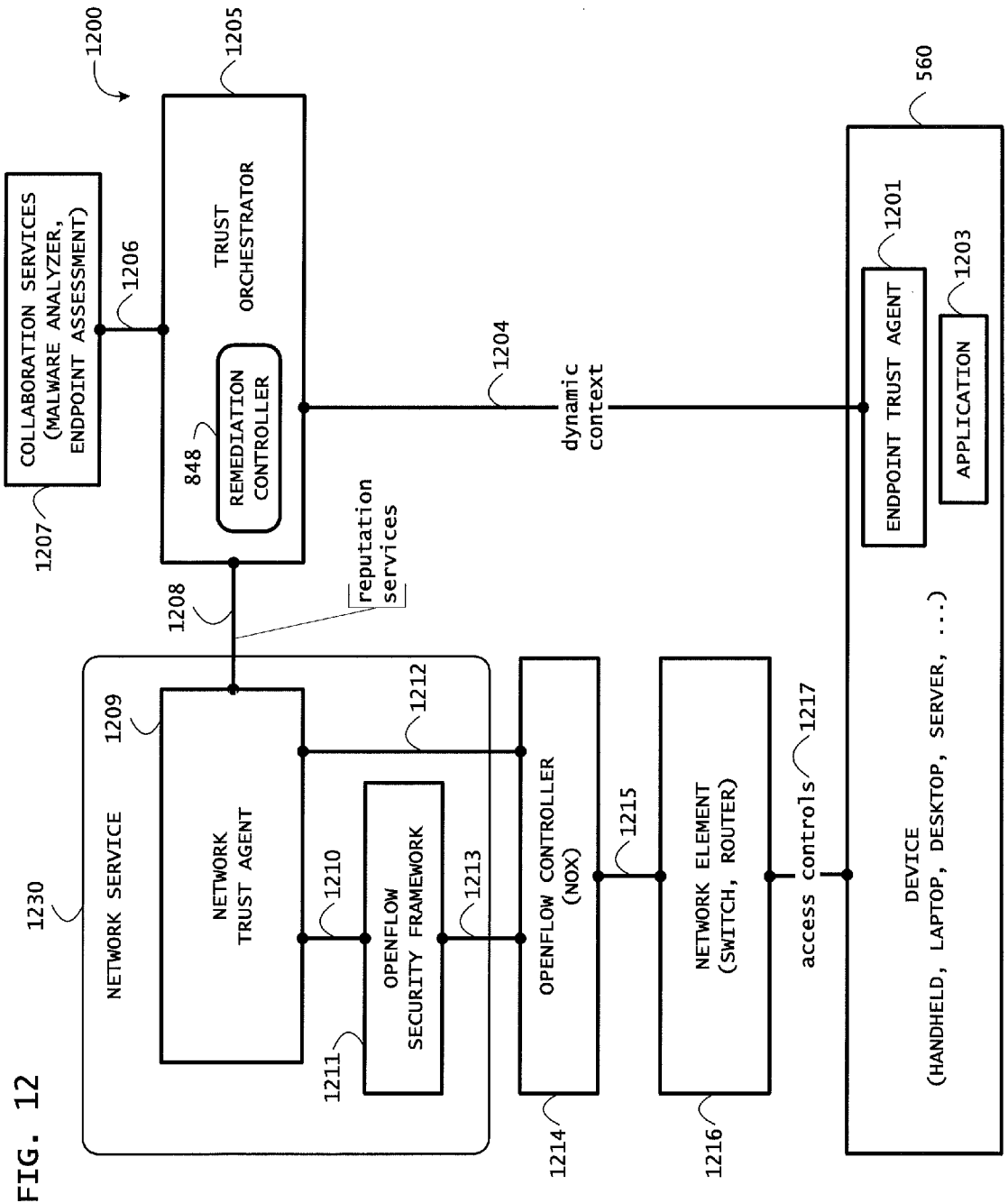
FIG. 12 is a block diagram of a system for network flow remediation based on a calculus of risk, according to an exemplary embodiment of the present disclosure.

FIG. 12 is a block diagram illustrating an exemplary system for network flow remediation. FIG. 12 is described with continued reference to the embodiment illustrated in FIG. 5. However, FIG. 12 is not limited to that embodiment. The system 1200 can perform network flow remediation based on a calculus of risk.

Referring to FIG. 12, the exemplary network flow remediation system 1200 may include an endpoint trust agent 1201 on a device 560 that may execute an application 1203, a trust orchestrator 1205, a plurality of collaboration services 1207 that may include malware analyzers, network endpoint assessment services, and reputation services, a network service 1230 that may include a network trust agent 1209 and an Open Flow security framework 1211, an Open Flow controller 1214, and an Open Flow enabled network element 1216 (for example, a switch or router).

In certain exemplary embodiments, the endpoint trust agent 1201 sends a dynamic context 1204 that may include the local runtime execution context of an application 1203 to the trust orchestrator 1205 that may perform a calculus of risk on a global security context, that may include endpoint assessment reports 1206 received from collaboration services 1207, and sends a system warning 1208 (endpoint threat intelligence) as a subscription based reputation service to a network trust agent 1209 for network flow remediation.

In certain exemplary embodiments, the network trust agent 1209 sends messages 1210 to the OpenFlow security framework 1211 middleware to send directives 1213 to an OpenFlow controller 1214, or send directives 1212 to an OpenFlow controller 1214, to notify by means of a protocol 1215 an OpenFlow enabled network element 1216 to apply access controls 1217 to block or divert traffic flows.

FIG. 13 is a block diagram illustrating an exemplary system for providing mobile security. FIG. 13 is described with continued reference to the embodiments illustrated in FIGS. 4-6. However, FIG. 13 is not limited to those embodiments. System 1300 can provide mobile security by remediating mobile devices and wireless network flows based on a calculus of risk.

Referring to FIG. 13, the exemplary mobile security system 1300 includes an endpoint trust agent 1301 on a mobile device 560 that may execute a mobile application 1303, a trust orchestrator 1310, a plurality of collaboration services 1312 that may include malware analyzers, network endpoint assessment services, and reputation services, a network service 1350 that may include a network trust agent 1315 and an network security framework 1318, a network element 1320 (for example, a switch or router), a wireless access point 1322, a mobile policy manager 1313 and a mobile device manager 1324.

Endpoint Trust Agent

Referring to FIGS. 5, 6 and 13, in an embodiment, the endpoint trust agent 510 resides on a device 560. The endpoint trust agent 510 can be configured to monitor all operations performed on the device 560 at runtime, including running applications and device functions (e.g., microphone, camera, keyboard, or display functions), and dispatches endpoint events 520 and security service requests 518 to the trust orchestrator 430. The runtime monitor 620, a functional component of the endpoint trust agent 510, includes a system monitor 512, a socket monitor 513, and a process monitor 514 that receive raw events 611 from native machine instrumentation 511 using a notification mechanism (e.g., MICROSOFT™ WINDOWS® Management Instrumentation (WMI) or the Android Application Manager). In certain exemplary embodiments, the endpoint trust agent 520 may also receive and process messages from a mobile device manager 1324 or mobile policy manager 1313 to control device operations and/or settings. The endpoint trust agent 510 is risk and threat agnostic and merely generates events based on the evaluation of rulesets 631 and assessment of runtime behavior based on the threat correlation matrix 633. The assessment of risk, and classification and identification of threats can be delegated to the trust orchestrator 430.

In certain exemplary embodiments, the endpoint trust agent 1301 sends a dynamic context 1304 that may include the local runtime execution context of a mobile application 1303 to the trust orchestrator 1310 that may perform a calculus of risk on a global security context, that may include endpoint assessment reports 1311 received from collaboration services 1312, and sends threat intelligence as a subscription based reputation service 1314 to a network trust agent 1315 for network flow remediation.

In certain exemplary embodiments, the network trust agent 1315 sends messages 1316 to the network security framework 1318 middleware to send policies 1319 to a wireless access point 1320, or send policies 1317 to a wireless access point 1320, to apply access controls 1321 to block or divert traffic flows.

In certain exemplary embodiments, the trust orchestrator 1310 sends messages 1307 to the mobile policy manager 1313 to send directives 1308 to the mobile device manager 1324 to set feature controls 1306 on the mobile device 560 or send directives 1305 to the endpoint trust agent 1301 for the integrity processor 630 and runtime monitor 620 of FIG. 6.

In certain exemplary embodiments, the trust orchestrator 1310 is configured to send messages 1309 to the mobile device manager 1324 to set feature controls 1306 on the mobile device 560.

Example User Interface Dashboards for an Administration Console

FIGS. 14-18 illustrate exemplary graphical user interfaces (GUIs) according to embodiments of the present disclosure. The GUIs depicted in FIGS. 14-18 are described with reference to the embodiments of FIGS. 1-13. However, the GUIs are not limited to those example embodiments. FIGS. 14-18 illustrate an exemplary data center administration console interface comprising various dashboards for displaying data related to operational integrity, resource utilization, application integrity, and network activity, in accordance with embodiments of the invention.

The terms "console display," "display," "display screen," and "screen" are used interchangeably herein to refer broadly and inclusively to any type of display device or screen coupled to or integrated with a computing device for displaying content viewable by a user of the computing device, such as administrators for the systems describe herein or a user 1014 of a device 560. In an embodiment, the device 560 is a mobile computing device 560. Such a display screen can include, for example and without limitation, a touch-screen liquid crystal display (LCD). In embodiments of the invention, the GUIs of a mobile device 560 is viewed on a display. In other embodiments, the GUIs shown in FIGS. 14-18 are viewed on a display of a server (i.e., a server console), a desktop computer (i.e., a PC monitor), or a laptop display.

In the example GUIs shown in FIGS. 14-18, the console interface and dashboards are rendered in a dedicated, native interface. In alternative embodiments, the console interface can be web based and rendered within a web browser. In other embodiments, the console interface and dashboards illustrated in FIGS. 14-18 can be displayed on server or workstation displays having a touch sensitive (i.e., touch screen) display. For ease of explanation, the operation of the console interface is discussed in the context of a computing device platform with an input device such as a mouse or pointing device (including a touch-screen), but is not intended to be limited thereto. Examples of such computing device platforms include, but are not limited to, OSX server and workstation operating systems (OSs) from Apple, Inc.; WINDOWS® server and workstation OSs from the MICROSOFT™ Corporation; UNIX-based OSs, and Linux OSs, such as, but not limited to, Linux from RedHat™ Inc.

In alternative embodiments, the GUIs of FIGS. 14-18 can be rendered on a display of a mobile computing device such as, but not limited to a personal digital assistant (PDA), an iPhone™, an iPod™ touch, or iPad™ tablet device, a device operating the Android operating system (OS) from Google Inc., a device running a MICROSOFT™ WINDOWS® Mobile or Phone OS, a device running a Symbian OS, a device running a PALM OS®, a BLACKBERRY® device running a Blackberry OS from Research In Motion ("RIM"), a smart phone, a hand held computer, a netbook computer, a palmtop computer, a laptop computer, an ultra-mobile PC, or another similar type of mobile device capable of processing instructions and receiving and transmitting data to and from users and other computing devices.

It is to be understood that the console interface and dashboards illustrated in the exemplary embodiments of FIGS. 14-18 can be readily adapted to execute on a display of mobile device platforms and operating systems, a computer terminal, a display of a client device, a display console of a server, a display console of a monitoring device, a display of a target or subject device, or other display of a computing device. Thus, the exemplary GUIs illustrated in FIGS. 14-18 can be rendered on a display of a mobile device using an attestation application, within a web browser session, on a display console of an attestation server, or on a display of a client device running an attestation application.

Throughout FIGS. 14-18, displays are shown with various icons, folders, panes, command regions, interfaces, windows, tabs, tiles, data entry fields, drop down menus, and buttons that are used to initiate action, invoke routines, monitor and display data related to operational integrity of, monitor resource utilization, or invoke other functionality. The initiated actions include, but are not limited to, viewing events, editing events, inputting calendar preferences, a backward scroll, a forward scroll, and other calendar view navigation inputs and gestures. For brevity, only the differences occurring within the figures, as compared to previous or subsequent ones of the figures, are described below.

In an embodiment, the display used to display the GUIs and dashboards shown in FIGS. 14-18 may be a computer display 2630 shown in FIG. 26, and the console interface may be display interface 2602. According to embodiments of the present invention, a user can interact with the console interface and dashboards using input devices such as, but not limited to, a touch screen, a pointing device, a stylus, a track ball, a touch pad, a mouse, a keyboard, a keypad, a joy stick, a voice activated control system, or other input devices used to provide interaction between a user and a GUI.

Figure 14:
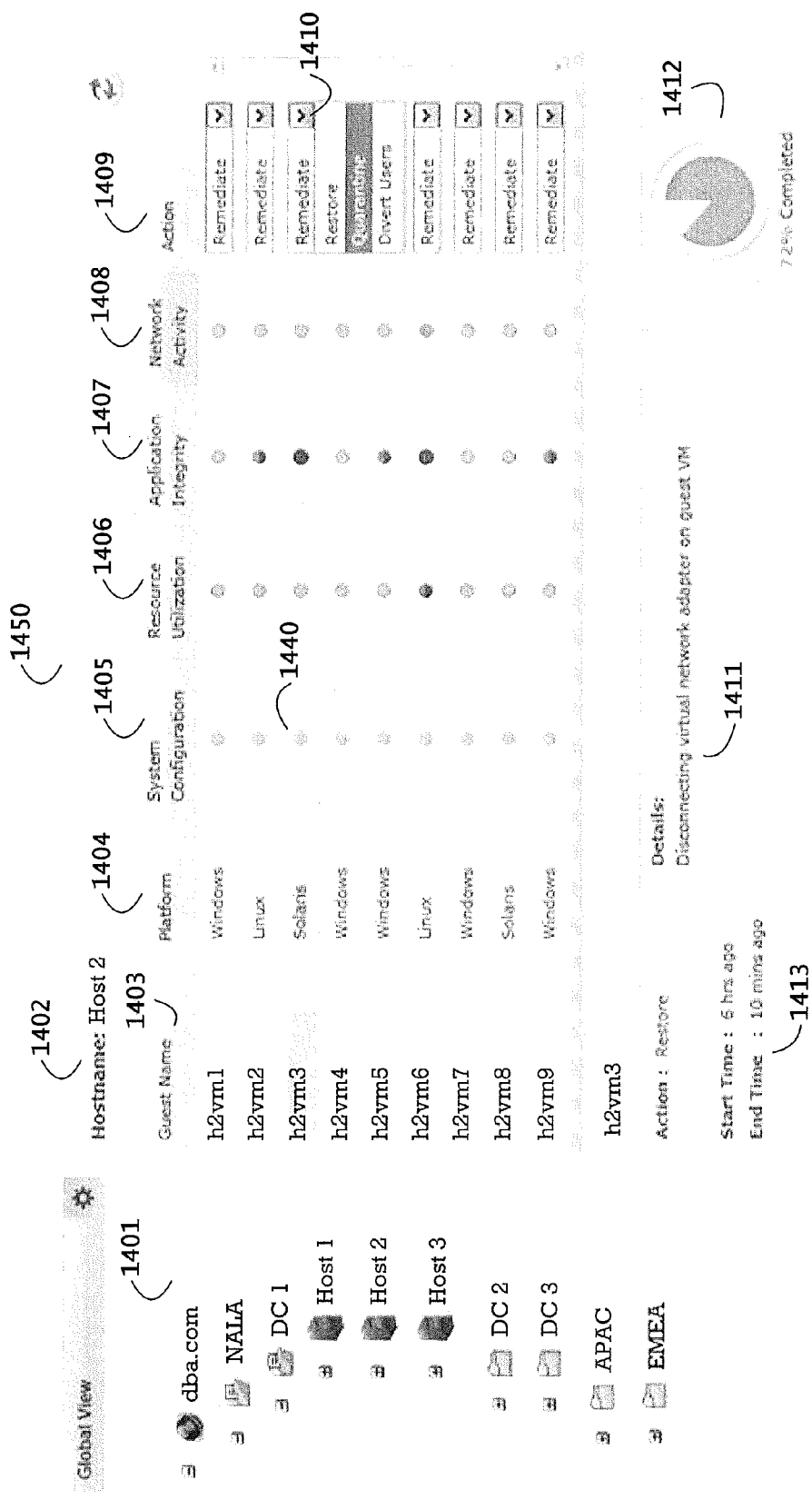

FIG. 14 depicts an exemplary GUI for a data center administration console 1400 including an operational integrity dashboard 1450.

Referring to FIG. 14, the exemplary data center administration console 1400 may visually display as a single pane an operational integrity dashboard or display window 1450 to provide a 'global view' of the data center inventory 1401 (i.e., a 'global view dashboard'). The display window 1450 can include information fields including the global view of the data center inventory 1401 in a hierarchical tree view of resources, a component level view of a resource 1402, a resource name 1403, a resource platform type 1404, integrity metrics for a plurality of trust vectors that include at least the system configuration 1405, resource utilization 1406, application integrity 1407, network activity 1408, a remediation action 1409, a remediation control 1410 that may include at least a restore, quarantine and divert users function, an action summary 1413, a details pane 1411, a status pane 1412, and color coded runtime integrity indicators 1440. The console 1400 can also graphically display risk indicators as integrity indicators 1440 and indications of impact analysis based on a confidence level of received integrity metrics for the trust vectors.

The information fields may be displayed and/or updated in real time or near real time. The color coded runtime integrity indicators 1440 for each displayed trust vector 1405, 1406, 1407 and 1408 may be animated and include audio-visual effects. For example, the integrity indicators 1440 can be animated with location changes, color changes, size changes, cross-fading, blinking, beeping, or vibration (i.e., when displayed on a mobile client device). In embodiments, some or all of the integrity indicators 1440 may be hyperlinked graphics with links to detailed dialog boxes, expanded views, or reports for a drill-down or detailed view of the corresponding trust vector.

Although the integrity dashboard 1450 is shown with specific information fields and labels in a particular arrangement, it is contemplated that other information fields and arrangements are possible. For example, additional trust vectors or a custom filter based perspective view may be displayed, or the dashboard may be embedded as a plug-in control and streamlined in a third party management console.

Figure 15:
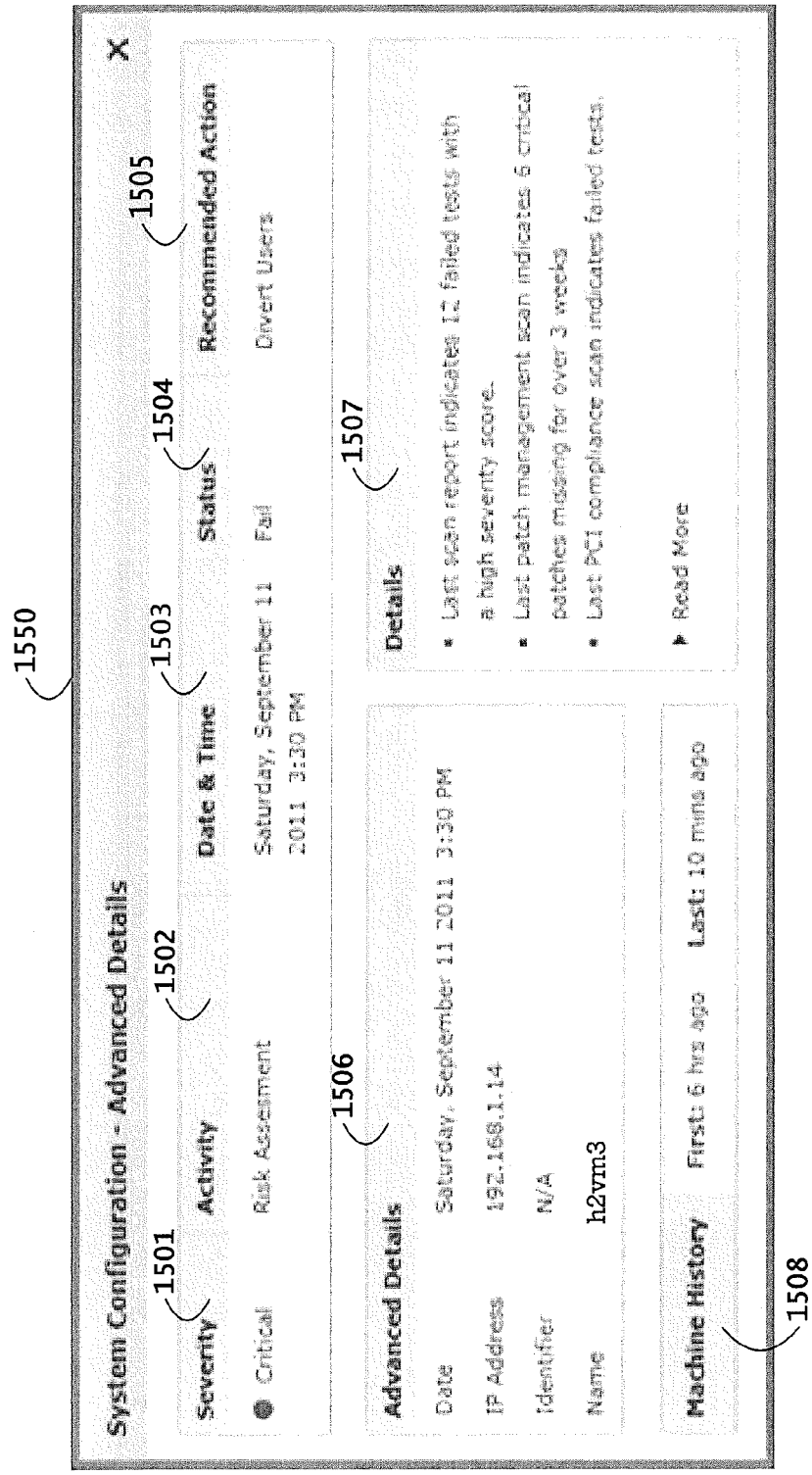

FIG. 15 depicts an exemplary GUI for a runtime operational integrity monitoring console 1500 including a system configuration dashboard 1550.

Referring to FIG. 15, the exemplary runtime operational integrity monitoring console 1500 may visually display a system configuration dashboard or display window 1550 in a single pane. The display window 1550 may include information fields including a severity 1501, a warning or observed activity 1502, a timestamp 1503, an evaluation status 1504, a recommended action 1505, advanced details 1506 that may include a timestamp corresponding to the displayed threat details pane 1507, source location, threat identifier and victim identifier, threat details pane 1507, and machine history 1508 that may pertain to infection history.

The threat details pane 1507 may include a forensic evidence chain, a plurality of detected events that led to the infection diagnosis and threat identification.

Although the system configuration dashboard 1550 is shown with specific information fields and labels in a particular arrangement, it is contemplated that other information fields and arrangements are possible.

Figure 16:
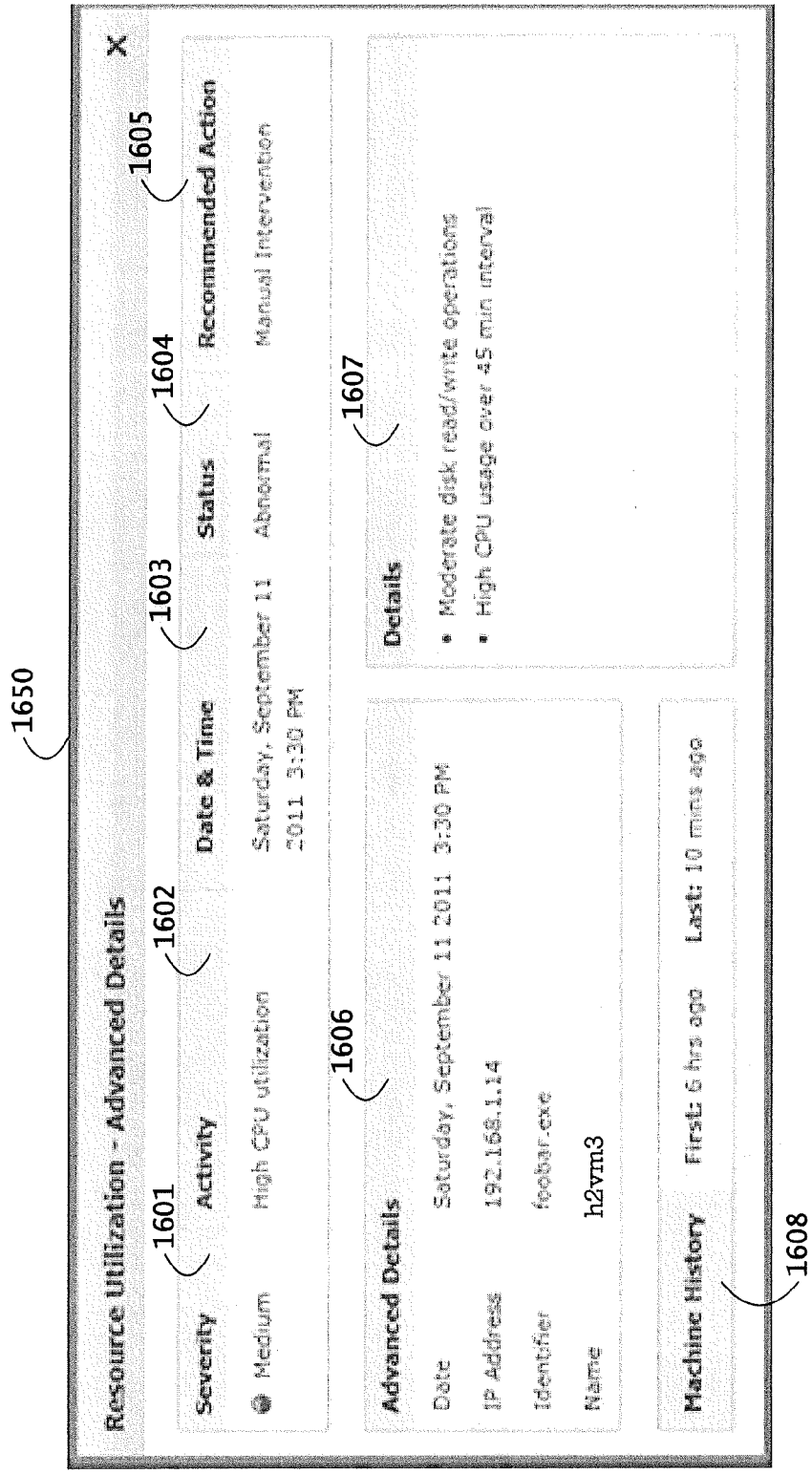

FIG. 16 depicts an exemplary GUI for a runtime operational integrity monitoring console 1600 including a resource utilization dashboard 1650.

Referring to FIG. 16, the exemplary runtime operational integrity monitoring console 1600 may visually display a resource utilization dashboard or display window 1650. The display window 1650 may include information fields including a severity 1601, a warning or observed activity 1602, a timestamp 1603, an evaluation status 1604, a recommended action 1605, advanced details 1606 that may include a timestamp corresponding to the displayed threat details pane 1607, source location, threat (or malware) identifier and victim identifier, threat details pane 1607, and machine history 1608 that may pertain to infection history.

The threat details pane 1607 may include a forensic evidence chain, a plurality of detected events that led to the infection diagnosis and threat identification.

Although the resource utilization dashboard 1650 is shown with specific information fields and labels in a particular arrangement, it is contemplated that other information fields and arrangements are possible.

Figure 17:
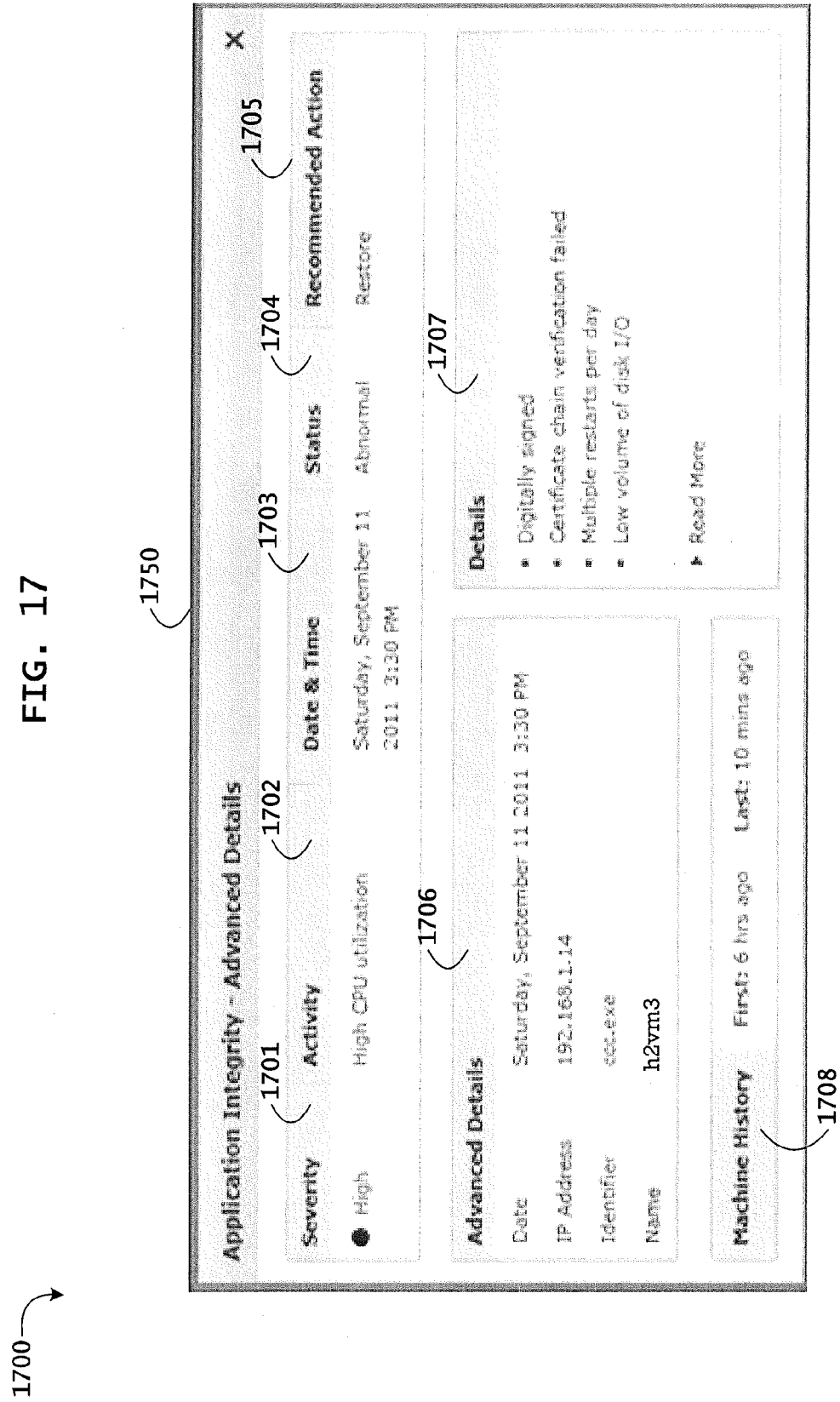

FIG. 17 depicts an exemplary GUI for a runtime operational integrity monitoring console 1700 including an application integrity dashboard 1750.

Referring to FIG. 17, the exemplary runtime operational integrity monitoring console 1700 may visually display an application integrity dashboard or display window 1750. The display window 1750 may include information fields including a severity 1701, a warning or observed activity 1702, a timestamp 1703, an evaluation status 1704, a recommended action 1705, advanced details 1706 that may include a timestamp corresponding to the displayed threat details pane 1707, source location, threat (or malware) identifier and victim identifier, threat details pane 1707, and machine history 1708 that may pertain to infection history.

The threat details pane 1707 may include a forensic evidence chain, a plurality of detected events that led to the infection diagnosis and threat identification.

Although the application integrity dashboard 1750 is shown with specific information fields and labels in a particular arrangement, it is contemplated that other information fields and arrangements are possible.

Figure 18:
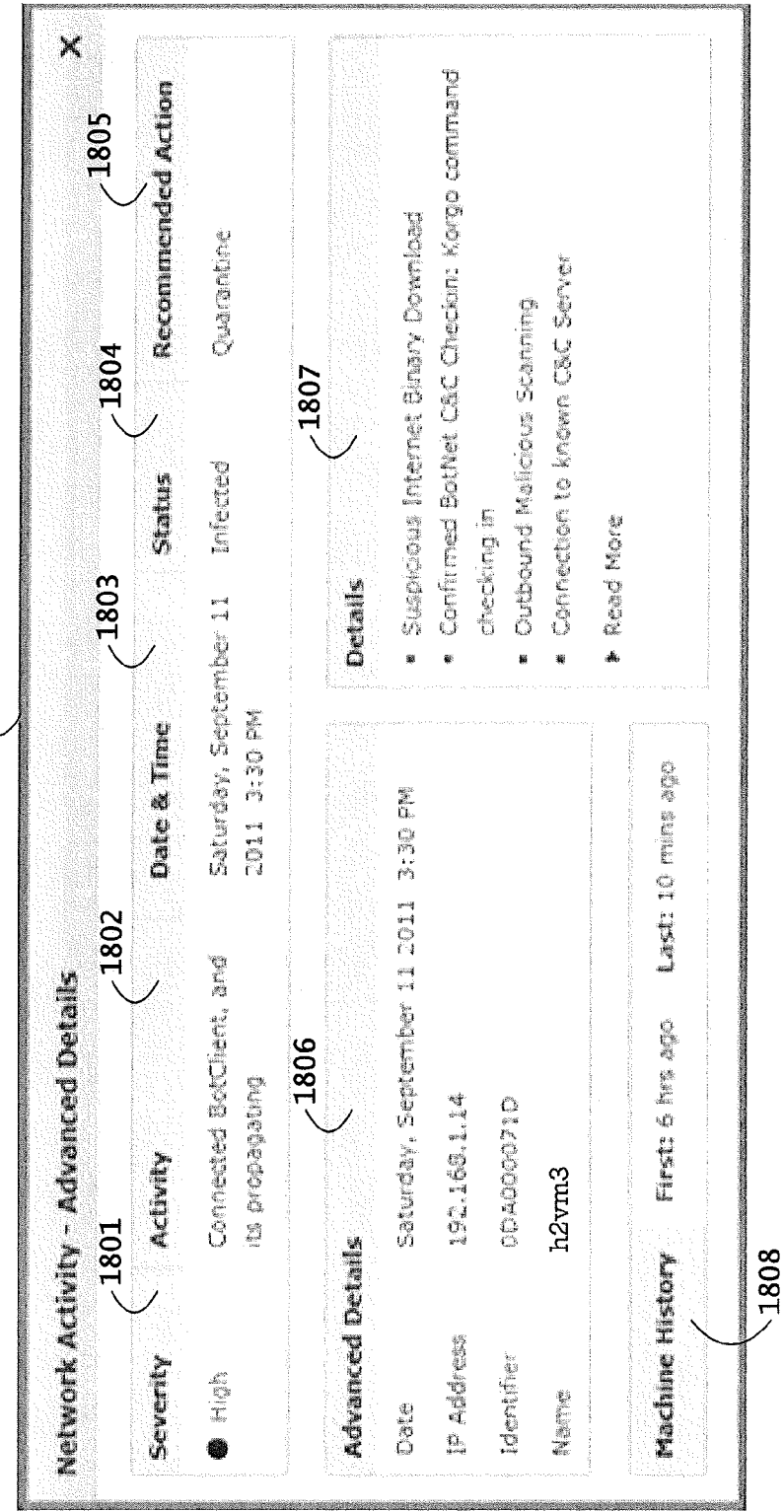

FIG. 18 depicts an exemplary GUI for runtime operational integrity monitoring console 1800 including a network activity dashboard 1850.

As shown in FIG. 18, an exemplary runtime operational integrity-monitoring console 1800 may visually display a network activity dashboard or display window 1850. The display window 1850 may include information fields including a severity 1801, a warning or observed activity 1802, a timestamp 1803, an evaluation status 1804, a recommended action 1805, advanced details 1806 that may include a timestamp corresponding to the displayed threat details pane 1807, source location, threat (or malware) identifier and victim identifier, threat details pane 1807, and machine history 1808 that may pertain to infection history.

The threat details pane 1807 may include a forensic evidence chain, a plurality of detected events that led to the infection diagnosis and threat identification.

Although the network activity dashboard 1850 is shown with specific information fields and labels in a particular arrangement, it is contemplated that other information fields and arrangements are possible.

Methods for Threat Identification and Remediation and Subject Reputation

FIGS. 19-22 are flowcharts illustrating exemplary methods for threat identification and remediation, providing a subject reputation service, and providing network flow level remediation.

The flowcharts depicted in FIGS. 19-22 are described with reference to the embodiments of FIGS. 1-8 and 11. However, the methods 1900-2200 shown in FIGS. 1900-2200 are not limited to those example embodiments. The steps of the methods 1900-2200 shown in FIGS. 19-22 do not necessarily have to occur in the order described below. According to embodiments, some of the steps of the methods 1900-2200 are optional.

Figure 19:

FIG. 19 is a flowchart illustrating an exemplary method for threat identification and remediation. Referring to FIG. 19, the method 1900 may provide threat identification and remediation for an infected device 560 using a trust orchestrator 430, an endpoint trust agent 510, a network analyzer 830 and an endpoint assessment service 820.

In step 1901, raw events 611 from the native device and/or platform instrumentation 610 are received. In an embodiment, the endpoint runtime monitor 620 described with reference to FIG. 6 above receives the raw events 611. After the raw events 611 are received, control is passed to step 1902.

In step 1902, image file and attributes are sent to a trust broker. According to an embodiment, this step is performed by the process monitor 514 described with reference to FIG. 5 above, that is included in the endpoint runtime monitor 620 described with reference to FIG. 6 above. In this embodiment, the process monitor 514 included in the endpoint runtime monitor 620 sends image file and attributes 518 to the trust broker 407 at the trust orchestrator 430 described with reference to FIG. 8 above so that specialized image analysis can be performed. After the image file and attributes 518 are sent, the method 1900 continues with step 1903.

In step 1903, the trust broker validates the image file based on received image attributes before passing control to step 1904. In accordance with an embodiment, the validation in step 1903 can be performed by the trust broker 407 described with reference to FIG. 5 above.

In step 1904, the trust broker (i.e., trust broker 407) sends the received image file to a malware analyzer. In one embodiment, the malware analyzer is malware analyzer 540 described with reference to FIG. 5 above and the malware analyzer is configured to perform specialized static and dynamic image introspection of the received image file.

In step 1905, a trust broker, such as, but not limited to, the trust broker 407, generates and sends, based on a received diagnosis, an image profile to an endpoint process monitor. In an embodiment, this step comprises sending an image profile 519 to the endpoint process monitor 514 described above with reference to FIG. 5. After the image profile is sent, control is passed to step 1906.

In step 1906, the endpoint runtime monitor 620 generates and sends integrity events, such as, but not limited to, integrity events 621, to an integrity processor, such as, but not limited to, the integrity processor 630 described above with reference to FIG. 6.

In step 1907, the endpoint integrity processor 630 may process and map received events to alerts using rulesets 631. In step 1908, the endpoint integrity processor 630 may generate and send warnings 634 using an event correlation matrix 633 to the trust orchestrator 430 as endpoint events 520.

In step 1909, a system event correlator, such as, but not limited to, the system event correlator 410, receives endpoint events 520 from the endpoint integrity processor 630.

In step 1910, the trust broker 407 receives network endpoint integrity measurement and verification reports 821 from an endpoint assessment service 820.

In step 1911, the system event correlator 410 receives temporal events 409 from the trust broker 407.

In step 1912, a system event correlator 410 may correlate the received endpoint and temporal events and generate an integrity profile 420 for the device 560 before passing control to step 1913.

In step 1913, the system event correlator 410 sends an integrity profile 420 of the device 560 to the trust supervisor 846.

In step 1914, the network activity correlator 831 sends infection profiles 831 to a trust supervisor, the trust supervisor 846.

In step 1915, the trust supervisor 846 may process the received integrity and infection profiles for classification of warnings based on forensic confidence for threat identification on the device 560.

In step 1916, the trust supervisor 846 sends to the remediation controller 848 actions 847 to perform on the infected device 560. In step 1917, the remediation controller 848 may process the received action request on the infected device 560 and send directives 849 based on configured thresholds and triggers to system orchestration and policy enforcement point (or network security) services 860.

Figure 20:
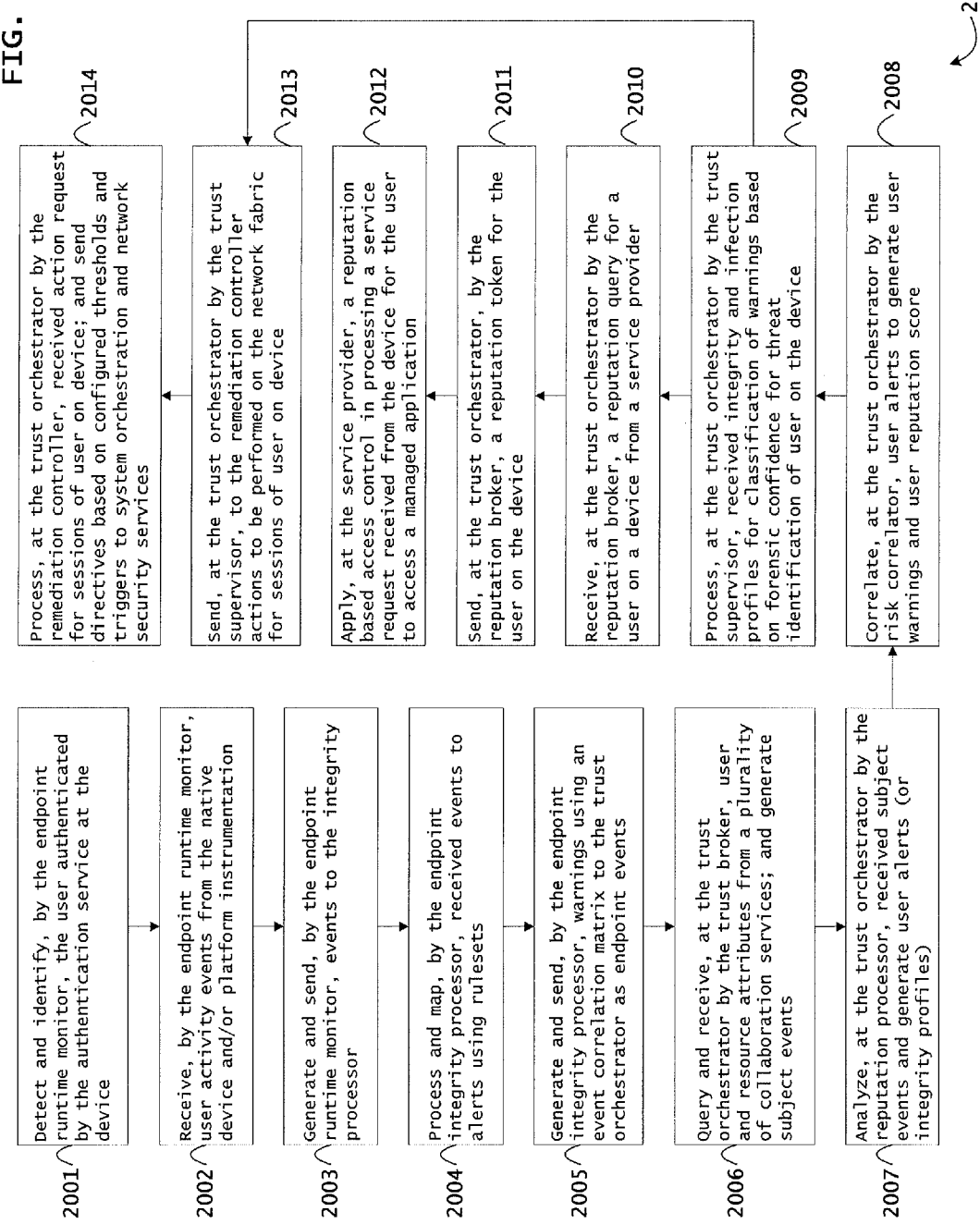

FIG. 20 is a flowchart illustrating an exemplary method for providing a subject reputation service to a service provider. In the example embodiment of FIG. 20, the subject is a user and the method 2000 provides a user reputation service. However, as discussed above with reference to FIGS. 9 and 11, in alternative embodiments, the subject can also be a device, transaction, service, or an organization, such as a company.

In particular, FIG. 20 illustrates the steps by which a method 2000 provides a user reputation service for a service provider. In one embodiment, the service provider is the service provider 1104 described above with reference to FIG. 11 and the method 2000 can use a trust orchestrator, such as, but not limited to, the trust orchestrator 430 described above with reference to FIG. 8.

According to embodiments, steps of the method 2000 can also be performed using an endpoint trust agent, a network analyzer, and a network analyzer, such as, but not limited to, the endpoint trust agent 510, network analyzer 830, and the endpoint assessment service 820 described above with reference to FIG. 8.

In step 2001, an endpoint runtime monitor, such as, but not limited to, the endpoint runtime monitor 620 described above with reference to FIG. 6, receives raw events 611 from the native device and/or platform instrumentation 610, detect and identify the user 1014 authenticated by the authentication service 1103 at the device 560.

In step 2002, the endpoint runtime monitor 620 receives user activity events from the native device and/or platform instrumentation 610. After the user activity events have been received, control is passed to step 2003.

In step 2003, the endpoint runtime monitor 620 may generate and send integrity events 621 to the endpoint integrity processor 630.

In step 2004, the endpoint integrity processor 630 may process and map received events to alerts using rulesets 631.

In step 2005, the endpoint integrity processor 630 may generate and send warnings 634 using an event correlation matrix 633 to the trust orchestrator 430 as endpoint events 520. After the warnings and event correlation matrix have been generated and sent, the method 2000 continues with step 2006.

In step 2006, the trust broker 407 may query and receive user and resource attributes 1121, 1130, 1122, and 1128 from a plurality of collaboration services 904, 903, 902, 901 and generate subject events 1123. In step 2007, the reputation processor 1110 may analyze received subject events 1123 and generate subject alerts 1124 (i.e., user alerts or integrity profiles).

In step 2008, the risk correlator 1111 may correlate received subject alerts 1124, such as user 1014 alerts, to generate user warnings 1126 using the risk correlation matrix 721, and user reputation score 1125 using the reputation score generator 1112.

In step 2009, the trust supervisor 846 may process the received integrity and infection profiles for classification of warnings based on forensic confidence for threat identification of a user 1014 of the device 560. The user 1014 may be associated with the device due to currently being logged into the device 560, running an application on the device 560, or by virtue of having account/user ID privileges to access resources such as files, data, applications, or web pages on the device 560.

In step 2010, the reputation broker 1106 receives a reputation query 1117 for the user 1014 of the device 560 from a service provider 1104.

In step 2011, the reputation broker 1106 sends a reputation token 1118 for the user 1014 of the device 560. In an embodiment, the reputation token 1118 sent in this step includes at least a user reputation score 1125. After the reputation token 1118 is sent, control is passed to step 2012.

In step 2012, the service provider 1104 applies a reputation-based access control 1119 in processing a service request 1116 received from the device 560 for the user 1014 to access a managed application 1105. After the reputation-based access control has been applied, control is passed to step 2013.

In step 2013, the trust supervisor 846 sends to the remediation controller 848 actions 847 to perform on the network fabric for sessions of the user 1014 of the device 560.

In step 2014, the remediation controller 848 may process received action request for sessions of the user 1014 of the device 560 and send directives 849 based on configured thresholds and triggers to system orchestration and policy enforcement point (network security) services 860.

Figure 21:
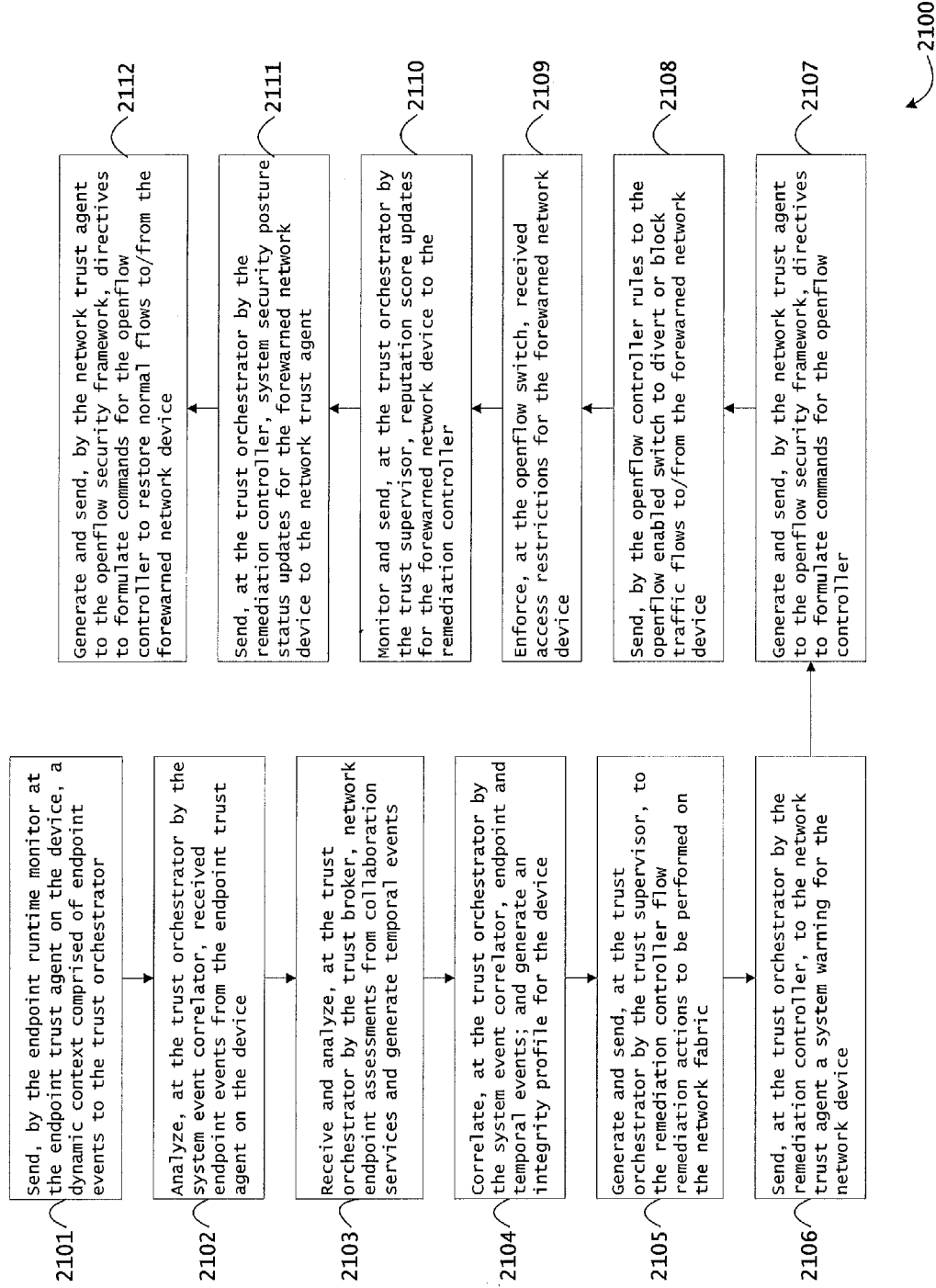

FIG. 21 is a flowchart illustrating steps by which an attestation service for runtime operational integrity of systems executing on a computing platform using a network trust agent, endpoint trust agent and trust orchestration server can be provided. The steps of the method 2100 shown in FIG. 21 do not necessarily have to occur in the order described.

Referring to FIG. 21, the method 2100 can provide network flow level remediation for an infected device 560 at a network element 1216 using a trust orchestrator 1205, an endpoint trust agent 1201, a network trust agent 1209 and collaboration services 1207.

In step 2101, the endpoint runtime monitor 620 at the endpoint trust agent 1201 on the device 560 sends a dynamic context 1204 that may include endpoint events 520 to the trust orchestrator 1205.

In step 2102, the trust orchestrator 430 may analyze received endpoint events 520 from the endpoint trust agent 1201 on the device 560 before passing control to step 2103.

In step 2103, the trust broker 407 receives and analyzes network endpoint assessments (or integrity measurement and verification reports) 821 from an endpoint assessment service (or collaboration services) 820 and generate temporal events 409.

In step 2104, the system event correlator 410 may correlate endpoint 520 and temporal 409 events and generate an integrity profile 420 for the device 560.

In step 2105, the trust supervisor 846 may generate and send to the remediation controller 848 flow remediation actions 847 to perform on the network fabric.

In step 2106, the remediation controller 848 at the trust orchestrator 1205 sends to the network trust agent 1209 a system warning 1208 for the network device 560. In step 2107, the network trust agent 1209 may generate and send to the Open Flow security framework 1211 directives 1210 to formulate commands 1213 for the Open Flow controller 1214.

In step 2108, the OpenFlow controller 1214 sends rules 1215 to the Open Flow enabled network element (switch) 1216 to divert or block traffic flows to/from the forewarned network device 560.

In step 2109, the OpenFlow enabled network element (switch) 1216 may enforce received access restrictions (controls) 1217 for the forewarned network device 560 before control is passed to step 2110.

In step 2110, the trust supervisor 846 may monitor and send reputation score updates 847 for the forewarned network device 560 to the remediation controller 848. In step 2111, the remediation controller 848 at the trust orchestrator 1205 sends system security posture status updates 1208 for the forewarned network device 560 to the network trust agent 1209. After the reputation score updates are monitored and sent, the method 2100 proceeds to step 2112.

In step 2112, the network trust agent 1209 may generate and send to the Open Flow security framework 1211 directives 1210 to formulate commands 1213 for the Open Flow controller 1214 to restore normal flows to/from the forewarned network device 560.

Figure 22:
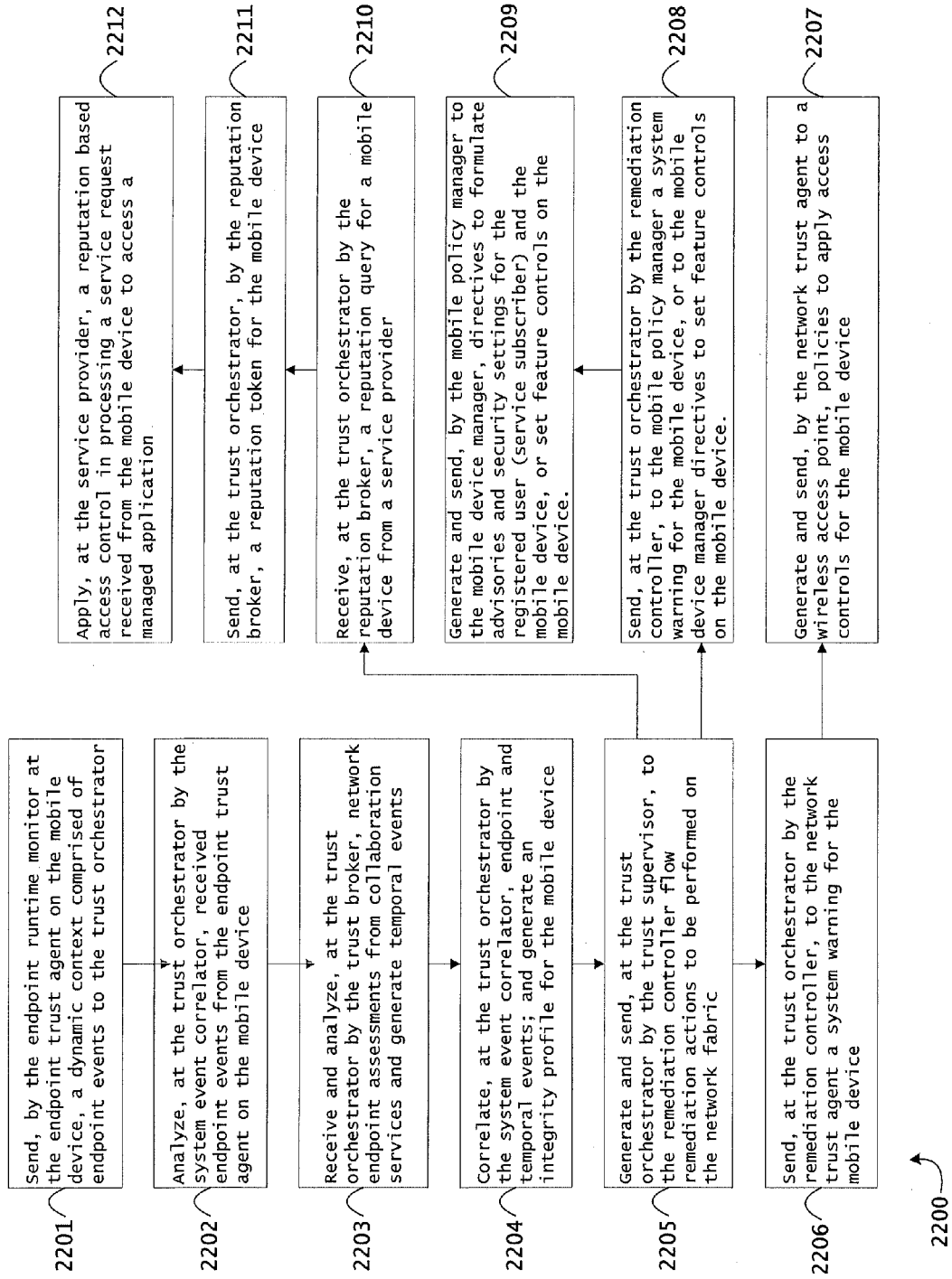

FIG. 22 is a flowchart illustrating a method in accordance with various exemplary embodiments.

Referring to FIG. 22, the method 2200 can provide network flow level remediation for an infected mobile device 560 at a wireless access point 1320 using a trust orchestrator 1310, an endpoint trust agent 1301, a network trust agent 1315 and an endpoint assessment service 1312.

In step 2201, the endpoint runtime monitor 620 at the endpoint trust agent 1301 on the mobile device 560 sends a dynamic context 1304 that may include endpoint events 520 to the trust orchestrator 1310 before passing control to step 2202.

In step 2202, the trust orchestrator 430 may analyze received endpoint events 520 from the endpoint trust agent 1301 on the mobile device 560.

In step 2203, the trust broker 407 receives and analyzes network endpoint assessments (or integrity measurement and verification reports) 821 from an endpoint assessment service (or collaboration services) 820 and generate temporal events 409. After the network endpoint assessments are analyzed and the temporal events are generated, the method 2200 proceeds to step 2204.

In step 2204, the system event correlator 410 may correlate endpoint 520 and temporal 409 events and generate an integrity profile 420 for the mobile device 560.

In step 2205, the trust supervisor 846 may generate and send to the remediation controller 848 flow remediation actions 847 to perform on the network fabric.

In step 2206, the remediation controller 848 at the trust orchestrator 1310 sends to the network trust agent 1209 a system warning 1208 for the mobile device 560 before control is passed to step 2207.

In step 2207, the network trust agent 1209 generates and sends to the wireless access point 1320 policies 1317 to apply access controls 1321 for the mobile device 560, at which point control is passed to step 2208.

In step 2208, the remediation controller 848 at the trust orchestrator 1310 sends to the mobile policy manager 1313 a system warning 1307 for the mobile device 560 or to the mobile device manager 1324 directives 1309 to set feature controls on the mobile device 560.

In step 2209, the mobile policy manager 1313 generate and send to the mobile device manager 1324 directives 1309 to formulate advisories and security settings for the registered user (service subscriber) and the mobile device 560 or set feature controls on the mobile device 560.

In step 2210, the reputation broker 1106 receives a reputation query 1117 for a mobile device 560 from a service provider 1104.

In step 2211, the reputation broker 1106 sends a reputation token 1118 for the device 560 that may include at least a security posture established by the trust supervisor 846 based on the received infection 832 and integrity 420 profiles for the device 560.

In step 2212, the service provider 1104 may apply a reputation-based access control 1119 in processing a service request 1116 received from the device 560 to access a managed application 1105.

Entity Relationship Model and Hierarchical Subject Reputation

FIG. 23 is an entity relationship diagram illustrating exemplary relationships between entities and components used in a system for the calculus of a subject reputation score. For example, the entities and components depicted in the entity model 2300 can be used to generate reputation scores by the system 1100 described above with reference to FIG. 11.

Referring to FIG. 23, the exemplary reputation scoring system 2300 computes a reputation score for a user 1014 that is employed by, a member of, or otherwise associated with an organization 2303. The user 1014 can be associated with the organization temporarily (i.e., as a contractor). The user 1014 uses one or more endpoint devices 560 to perform an online transaction 2304 with a service 2305 that is rendered by an application 2306 and managed by the organization 2303, to participate in an activity 2307. In embodiments, the activity 2307 is categorized as either social 2308 or professional 1409.

According to embodiments, the organization 2303 can be, but is not limited to, a company, a government agency/division, a university or school, a hospital, a non-profit firm, or any other group that needs to secure systems, platforms, mobile computing devices, or other IT assets on behalf of its employees/members (i.e., users 1014 of devices 560). The organization's 2303 IT assets can include, but are not limited to, servers, desktop computers, laptops, tablet computers, multi-function printers/scanners/fax machines, and network devices. The IT assets can be devices 560 owned or leased by the organization and directly controlled by the organization 2303.

The IT assets can include devices 560 owned and managed by users 1014 (i.e., a user-owned mobile computing device in a BYOD environment) or the organization 2303 (i.e., a 'corporate' IT asset owned or leased by the organization 2303). In an embodiment, the reputation scoring system 2300 can operate in a mixed environment of IT assets wherein the organization 2303 owns some devices 560, leases some devices 560, and users 1014 own other devices 560. For example the organization 2303 may own enterprise servers and network devices (not shown), lease laptops, desktop computers/personal computers (PCs), and other endpoint devices 560 for users 1014 and simultaneously allow user 1014-owned mobile computing devices 560 (i.e., smart phones, laptops, and tablets in a BYOD environment) to access the organization's 2303 domain via internal or external networks. The internal networks can be, but are not limited to, an intranet, a LAN, or a WAN. The external networks can be, but are not limited to, an extranet, a wireless data networks such as Wi-Fi, and the Internet.

The servers (not shown) in the reputation scoring system 2300 may be part of a server farm and can be, but are not limited to, application servers hosting applications 2306, file servers, mail servers, database servers, proxy servers, and web servers. These servers can be enterprise servers owned by the organization 2303 or servers under a corporate lease. Alternatively, the servers can also be part of a remote, service-provider managed outsourced virtual data center (i.e., a cloud computing environment). The network devices can be networked storage devices, routers, switches, hubs, and firewalls. These network devices can be part of the organization's 2303 local area network (LAN) or wide area network (WAN).

FIG. 24 is a block diagram illustrating an exemplary hierarchical representation of a subject reputation score. The hierarchical representation 2400 can be used to report reputation scores generated by system 1100 described above with reference to FIG. 11.

Referring to FIG. 24, the exemplary hierarchical representation of a subject reputation score 2400 includes a reputation score 2401, a transaction score 2409, a user score 2407, a service score 2408, a social score 2402, a professional score 2403, a device score 2404, an organization score 2405, and an application score 2406. In the exemplary embodiment of FIG. 24, the organization score 2405 can be, for example a company score 2405.

A reputation score may comprise one or more component scores (as an aggregation), where a component score is illustrated in FIG. 24 below an aggregate score (for example, a service score may be a component score of a transaction score). An aggregate reputation score may provide an enumerated list to annotate component scores included.

Application Event Monitoring Architecture

FIG. 25 is a block diagram illustrating an exemplary computing system architecture 2500 for monitoring application events for trusted execution with layered extensions to native machine instrumentation mechanisms. FIG. 25 is described with continued reference to the embodiments illustrated in FIGS. 4-6. However, FIG. 25 is not limited to those embodiments.

Referring to FIG. 25, the exemplary representation of the architecture 2500 instrumented for trust includes a device 560, an endpoint trust agent 510, native machine instrumentation 610, extended trust instrumentation 2501, a runtime monitor 620, a system event correlator 410, and a trust orchestrator 430.

The runtime monitor 620 subscribes for, and receives, near real time asynchronous notifications of application events 2502 from the extended trust instrumentation 2501. The application events 2502 may include registry, file system, network, storage, input (for example, keyboard), output (for example, screen display), memory (for example, peek or poke) and process operations (for example, thread creation), and usage of any system resource (for example, microphone or camera) by running applications on the target instrumented device 560.

The extended trust instrumentation 2501 may be layered extensions to native machine instrumentation 610, such as, for example, the WINDOWS® Management Instrumentation (WMI) on MICROSOFT™ WINDOWS® platforms.

As will be appreciated by persons skilled in the relevant art, WMI is a set of extensions to the MICROSOFT™ WINDOWS® Driver Model (WDM), which is a framework for device drivers that provides an operating system interface through which instrumented components (i.e., components of an instrumented platform) provide information and notification. WMI is a MICROSOFT™ implementation of the Distributed Management Task Force (DMTF) Web-Based Enterprise Management (WBEM) and the DMTF Common Information Model (CIM) standards. WMI is preinstalled on some MICROSOFT™ WINDOWS® Operating Systems (OSs) and allows scripting languages like Visual Basic Scripting Edition (VBScript) or Windows PowerShell to manage computing devices and platforms running a MICROSOFT™ WINDOWS® OS. Such management can be performed locally (i.e., on the server or platform being managed) or remotely from a computing device external to the managed platform/device.

In certain exemplary embodiments, the runtime monitor 620 may generate and send dynamic expressions or rules as application filters 2503 linked to one or more running instances of applications on the target instrumented device 560.

The application events 2502 and application filters 2503 may be expressed using standards based schema definitions, such as for example the DMTF CIM specification. In a non-limiting embodiment, the CIM schema can be used to provide Trust-as-a-Service (TaaS).

In embodiments, the architecture 2500 can be used with APIs to subscribe for asynchronous application events such as, but not limited to, registry, file system, network, and process operations (e.g., Load Library, Remote Thread Attach, Peek/Poke Memory operations).

Embodiments of the architecture 2500 can include packaging of a TaaS endpoint comprising an endpoint trust sensor with OS updates, such as, but not limited to, MICROSOFT™ WINDOWS®, UNIX, Linux, and Apple OSX updates (i.e., OS and application upgrades and security patches for browsers, business productivity suites, device drivers, and other platform components). By using the architecture 2500, an endpoint trust sensor can measure runtime operational integrity by evaluating risk based on 'actions' and leveraging the native machine instrumentation 610.

In embodiments, the architecture 2500 also enables a network trust sensor to perform signature-less network activity correlation using a threat 'life cycle model' for clustering and classification of malware.

According to embodiments, the architecture 2500 enables trust orchestration for actionable intelligence based on real-time event correlation (i.e., a calculus of risk) by using an API collaboration bus for integration of security intelligence.

Example Computer System Implementation

Although exemplary embodiments have been described in terms of a computing device or instrumented platform, it is contemplated that it may be implemented in software on microprocessors/general purpose computers such as the computer system 2600 illustrated in FIG. 26. In various embodiments, one or more of the functions of the various components may be implemented in software that controls a computing device, such as computer system 2600, which is described below with reference to FIG. 26.

Aspects of the present invention shown in FIGS. 1-25, or any part(s) or function(s) thereof, may be implemented using hardware, software modules, firmware, non-transitory computer readable media having instructions stored thereon, or a combination thereof and may be implemented in one or more computer systems or other processing systems.

FIG. 26 illustrates an example computer system 2600 in which embodiments of the present invention, or portions thereof, may be implemented as computer-readable code. For example, the network systems and architectures of FIGS. 1, 4-6, 8-13 and 25 can be implemented in computer system 2600 using hardware, software, firmware, non-transitory computer readable media having instructions stored thereon, or a combination thereof and may be implemented in one or more computer systems or other processing systems. Hardware, software, or any combination of such may embody any of the modules and components used to implement the architectures and systems 100, 400, 500, 600, 800, 900, 1000, 1100, 1200, 1300 and 2500 of FIGS. 1, 4-6, 8-13 and 25.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 2600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 2604 may be a special purpose or a general-purpose processor device. As will be appreciated by persons skilled in the relevant art, processor device 2604 may also be a single processor in a multi-core/multiprocessor system, such system operating alone, or in a cluster of computing devices operating in a cluster or server farm. Processor device 2604 is connected to a communication infrastructure 2606, for example, a bus, message queue, network, or multi-core message-passing scheme.

The computer system 2600 also includes a main memory 2608, for example, random access memory (RAM), and may also include a secondary memory 2610. Secondary memory 2610 may include, for example, a hard disk drive 2612, removable storage drive 2614. Removable storage drive 2614 may comprise a floppy disk drive, a magnetic tape drive, an optical disk drive, a flash memory, or the like.

The removable storage drive 2614 reads from and/or writes to a removable storage unit 2618 in a well-known manner. Removable storage unit 2618 may comprise a floppy disk, magnetic tape, optical disk, etc. which is read by and written to by removable storage drive 2614. As will be appreciated by persons skilled in the relevant art, removable storage unit 2618 includes a non-transitory computer usable storage medium having stored therein computer software and/or data.

In alternative implementations, secondary memory 2610 may include other similar means for allowing computer programs or other instructions to be loaded into computer system 2600. Such means may include, for example, a removable storage unit 2622 and an interface 2620. Examples of such means may include a program cartridge and cartridge interface (such as that found in video game devices), a removable memory chip (such as an EPROM, or PROM) and associated socket, and other removable storage units 2622 and interfaces 2620 which allow software and data to be transferred from the removable storage unit 2622 to computer system 2300.

The computer system 2600 may also include a communications interface 2624. Communications interface 2624 allows software and data to be transferred between computer system 2600 and external devices. Communications interface 2624 may include a modem, a network interface (such as an Ethernet card), a communications port, a PCMCIA slot and card, or the like. Software and data transferred via communications interface 2624 may be in the form of signals, which may be electronic, electromagnetic, optical, or other signals capable of being received by communications interface 2624. These signals may be provided to communications interface 2324 via a communications path 2626. Communications path 2626 carries signals and may be implemented using wire or cable, fiber optics, a phone line, a cellular phone link, an RF link or other communications channels.

The computer system 2600 may also include a computer display 2630 and a display interface 2602. According to embodiments, the display used to display the GUIs and dashboards shown in FIGS. 14-18 and described above may be the computer display 2630, and the console interface may be display interface 2602.

In this document, the terms "computer program medium," "non-transitory computer readable medium," and "computer usable medium" are used to generally refer to media such as removable storage unit 2618, removable storage unit 2622, and a hard disk installed in hard disk drive 2612. Signals carried over communications path 2626 can also embody the logic described herein. Computer program medium and computer usable medium can also refer to memories, such as main memory 2608 and secondary memory 2610, which can be memory semiconductors (e.g., DRAMs, etc.). These computer program products are means for providing software to computer system 2600.

Computer programs (also called computer control logic) are stored in main memory 2608 and/or secondary memory 2610. Computer programs may also be received via communications interface 2624. Such computer programs, when executed, enable computer system 2600 to implement the present invention as discussed herein. In particular, the computer programs, when executed, enable processor device 2604 to implement the processes of the present invention, such as the stages in the methods illustrated by the flowcharts 1900, 2000, 2100 and 2200 of FIGS. 19-22, discussed above. Accordingly, such computer programs represent controllers of the computer system 2600. Where the invention is implemented using software, the software may be stored in a computer program product and loaded into computer system 2600 using removable storage drive 2614, interface 2620, and hard disk drive 2612, or communications interface 2624.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and commu-

Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Although the invention is illustrated and described herein with reference to specific embodiments, the invention is not intended to be limited to the details shown. Rather, various modifications may be made in the details within the scope and range equivalents of the claims and without departing from the invention.

What is claimed is:

1. A reputation scoring system for generating and displaying a hierarchical representation of a reputation score of a subject, the system comprising:
    a hardware processor;
    a reputation broker configured on the hardware processor to:
        process a query for a reputation score of the subject received at a trust broker from a service provider as a result of a device initiated service transaction; and
        dispatch a request to a trust orchestrator to generate a hierarchical reputation score for the subject as a measured dynamic assessment of the integrity of monitored applications executing on a device of the subject,
    wherein the trust orchestrator is configured to process the received dispatch request for the hierarchical reputation score by:
        initiating a plurality of directed queries to information management systems internal or external to an organization to interrogate attributes associated with the subject;
        analyzing received responses from the plurality of directed queries;
        receiving the generated hierarchical reputation score for the subject based on a calculus of risk; and
        sending the generated hierarchical reputation score for the subject to the reputation broker,
    wherein the trust orchestrator is further configured to:
        receive a reputation token from the reputation broker for the subject in response to the dispatched request; and
        send the reputation token to the service provider as a response to the query for the reputation score.

2. The system of claim 1, further comprising:
    an authentication service configured to authenticate a user to a computing device by performing an authentication process;
    a system event correlator comprising a reputation processor configured to receive subject events from the trust broker including an integrity profile of a subject with subject alerts;
    a risk correlator configured to populate a risk correlation matrix based upon real-time correlation of normalized, collated subject events received in endpoint assessment reports from a plurality of collaboration services;
    a reputation score generator configured to generate the hierarchical reputation score for the subject, the reputation score generator comprising a scoring application module configured to calculate a hierarchical reputation score based upon one or more of a transaction score, a user score, a service score, a social score, a professional score, a device score, an organization score, and an application score;
    a log management application module configured to respond to a subject activity query from the trust broker;
    a role management application system configured to respond to a subject attribute query from the trust broker; and
    an identity management application module configured to respond to the subject attribute query from the trust broker.

3. The system of claim 2, wherein the risk correlator is further configured to receive subject alerts and map the subject alerts to cells in the risk correlation matrix, and
    wherein reputation score generator is further configured to process the subject events and the subject alerts to determine the hierarchical reputation score for the subject.

4. The system of claim 3, wherein the subject events are:
    one or more of assertions about provisioned attributes, endpoint activities associated with the subject, and network level activities associated with the subject; and
    received at the system event correlator as a response to a directed query from log management system, a role management system, the identity management application module, or an inventory management module.

5. The system of claim 2, wherein the reputation token includes at least a reputation score for the subject information and information requested by the service provider to enforce a reputation-based access control to permit or deny a service request to access the managed application.

6. The system of claim 2, wherein the user uses an endpoint device to perform an online transaction or participate in an activity with a service rendered by an application and managed by an organization, and wherein the user is associated with the organization via a membership, employment, contract, or other affiliation.

7. The system of claim 6, wherein the activity is categorized as either social or professional.

8. The system of claim 7, wherein the IT assets include, one or more of the computing device, the endpoint device, a server, a desktop computer, a laptop, a tablet computer, a multi-function printer/scanners/fax machine, and a network device.

9. The system of claim 7, further comprising an inventory management system configured to manage an inventory of the IT assets on behalf of the organization.

10. The system of claim 1, wherein the trust broker is further configured to process received subject attributes such as entitlements, memberships, roles, and activity information; and
   generate and dispatch temporal subject events to the reputation processor.

11. The system of claim 1, wherein subject events represent assertions about the subject that are used to determine a level of security risk in a transaction.

12. The system of claim 11, wherein the subject events include static and dynamic separation of duties, principle of least privilege, observed resource usage patterns by the subject, and observed subject activities on internal networks of an organization and networks external to the organization.

13. The system of claim 1, wherein the query for the reputation score received by the trust broker is preconfigured.

14. The system of claim 13, further comprising an administrative application module configured to render a graphical user interface (GUI) for an administration console comprising a plurality of dashboards on a display,
   wherein a preconfigured query can be customized using the GUI.

15. The system of claim 14, wherein the reputation processor is further configured to calculate risk posed by the subject to a computer system or platform; and
   and the administrative application module is further configured to render the hierarchical representation of the subject reputation score on the display.

16. The system of claim 1, wherein the management systems include information systems hosted by social networking vendors.

17. The system of claim 1, wherein the subject is a computing device, a user, a transaction, an organization, or a service.

18. The system of claim 17, wherein the attributes associated with the subject include one or more of a device geo-location, a device provisioned state, enabled/disabled device functions, a user registration, and an organization registration.

19. The system of claim 17, wherein the hierarchical reputation score comprises an aggregation of a plurality of component scores comprising one or more of a transaction score, a service score, a social score, a professional score, a device score, an organization score, and an application score.

20. The system of claim 19, wherein the hierarchical reputation score comprises an enumerated list with annotated component scores representing granularity and structure of how the subject score will be reported to the service provider.

21. A method of providing real time attestation of a reputation of a subject to a service provider using an endpoint trust agent, and a trust orchestrator including a processor comprising a reputation broker and a trust broker, the method comprising:

receiving, at the trust orchestrator by the reputation broker, from a service provider, a query for a reputation score of a subject as a result of a device initiated service transaction;
   dispatching, at the trust orchestrator by the reputation broker, a request to generate a just-in-time reputation score for a subject as a measured dynamic assessment of the integrity of monitored applications executing on a device of the subject; and
   processing, at the trust orchestrator by the trust broker, the received request to generate the just-in-time reputation score by:
   initiating, by the processor, a plurality of directed queries to external information management systems to interrogate attributes associated with a subject,
   analyzing, by the processor, received responses from the plurality of directed queries and generating a reputation score for a subject based on a calculus of risk,
   sending, the generated reputation score for the subject to the reputation broker, and
   sending, by the reputation broker at the trust orchestrator, as a response to the query for the reputation score, to a service provider, a reputation token for a subject.

22. The method of claim 21, wherein the subject is one or more of:
   a user account;
   a software application;
   a computing system;
   a computing platform; and
   a computing device.

23. The method of claim 21, wherein the interrogation of internal or external information management systems comprises one or more of:
   querying, provisioned identities, roles and entitlements of a subject;
   querying, activity logs attributed to a subject;
   querying, inventory object associations of a subject;
   querying, geo-location based object actions of a subject;
   querying, actions performed on inventory objects by a subject;
   correlating, anomalies in observed actions and provisioned conflicts relating to a principle of least privilege and separation of duties;
   correlating, association of a subject with a plurality of infected systems; and
   correlating, association of a subject with a plurality of infected computing devices.

24. The method of claim 23, wherein the querying of activity logs comprises one or more of:
   security and information events associated with a subject;
   websites visited by a subject;
   online or drive-by downloads initiated by a subject; and
   local device management actions and operations performed by a subject.

* * * * *